US007958715B2

(12) United States Patent
Kinert et al.

(10) Patent No.: US 7,958,715 B2
(45) Date of Patent: Jun. 14, 2011

(54) CHAIN WITH IDENTIFICATION APPARATUS

(75) Inventors: Nathan Kinert, Houston, TX (US); Leon Ellison, Huffman, TX (US); Reinhold Kammann, Wienhausen (DE); Manfred Worms, Nienhagen (DE); Clive Lam, Tomball, TX (US); Guy L. McClung, III, Spring, TX (US)

(73) Assignee: National Oilwell Varco, L.P., Houston, TX (US)

( * ) Notice: Subject to any disclaimer, the term of this patent is extended or adjusted under 35 U.S.C. 154(b) by 362 days.

(21) Appl. No.: 12/317,246

(22) Filed: Dec. 20, 2008

(65) Prior Publication Data

US 2009/0223200 A1 Sep. 10, 2009

Related U.S. Application Data

(63) Continuation-in-part of application No. 11/255,160, filed on Oct. 20, 2005, now Pat. No. 7,484,625, which is a continuation-in-part of application No. 11/059,584, filed on Feb. 16, 2005, now Pat. No. 7,159,654, which is a continuation-in-part of application No. 10/825,590, filed on Apr. 15, 2004, now abandoned.

(51) Int. Cl.
*F16G 15/12* (2006.01)

(52) U.S. Cl. .................................... 59/78; 59/82; 59/93

(58) Field of Classification Search .................. 59/35.1, 59/78, 82, 93; 166/64, 250.01, 255.1; 340/572.7, 340/572.8, 853.1; 702/188
See application file for complete search history.

(56) References Cited

U.S. PATENT DOCUMENTS

| | | | | |
|---|---|---|---|---|
| 4,061,967 | A | 12/1977 | Hall | 324/260 |
| 4,196,418 | A | 4/1980 | Kip et al. | 340/152 T |
| 4,202,490 | A | 5/1980 | Gunkel et al. | 235/449 |
| 4,468,959 | A | 9/1984 | Roberts | 73/151 |
| 4,497,029 | A | 1/1985 | Kiyokawa | 364/474 |
| 4,533,823 | A | 8/1985 | Vittorio | 235/375 |
| 4,578,991 | A | 4/1986 | Nowlin | 73/151 |
| 4,698,631 | A | 10/1987 | Kelly, Jr. et al. | 340/853 |
| 4,701,869 | A | 10/1987 | Callegari, Sr. et al. | 364/562 |
| 4,720,626 | A | 1/1988 | Nishikawa et al. | 235/449 |
| 4,742,470 | A | 5/1988 | Juengel | 364/474 |
| 4,780,599 | A | 10/1988 | Baus | 235/383 |

(Continued)

FOREIGN PATENT DOCUMENTS

EP 1.052.030 4/2000

(Continued)

OTHER PUBLICATIONS

PCT/GB/2006/050331: Int'l Search Report' 3 pp.; mailed Dec. 2, 2007.

(Continued)

*Primary Examiner* — David B Jones
(74) *Attorney, Agent, or Firm* — Conley Rose, P.C.

(57) ABSTRACT

A link member (e.g. a chain link or an elevator link) having a body, the body having two spaced-apart ends, wave-energizable apparatus (one or more) on the link body, and, in one aspect, a wrap or wraps securing the wave-energizable apparatus to the link. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

30 Claims, 31 Drawing Sheets

U.S. PATENT DOCUMENTS

| | | | | |
|---|---|---|---|---|
| 4,818,855 | A | 4/1989 | Mongeon et al. | 235/440 |
| 4,850,009 | A | 7/1989 | Zook et al. | 379/96 |
| 5,099,227 | A | 3/1992 | Geiszler et al. | 340/572 |
| 5,099,437 | A | 3/1992 | Weber | 364/550 |
| 5,107,705 | A | 4/1992 | Wraight et al. | 73/151.5 |
| 5,142,128 | A | 8/1992 | Perkin et al. | 235/375 |
| 5,157,687 | A | 10/1992 | Tymes | 375/1 |
| 5,202,680 | A | 4/1993 | Savage | 340/853.1 |
| 5,221,831 | A | 6/1993 | Geiszler | 235/440 |
| 5,225,996 | A | 7/1993 | Weber | 364/550 |
| 5,360,967 | A | 11/1994 | Perkin et al. | 235/375 |
| 5,491,637 | A | 2/1996 | Kraemer et al. | 700/115 |
| 5,608,199 | A | 3/1997 | Clouse, III et al. | 235/435 |
| 5,621,647 | A | 4/1997 | Kraemer et al. | 364/ 468.22 |
| 5,698,631 | A | 12/1997 | Sigworth et al. | 525/122 |
| 5,956,658 | A | 9/1999 | McMahon | 702/83 |
| 5,973,599 | A | 10/1999 | Nicholson et al. | 340/572.8 |
| 6,333,700 | B1 | 12/2001 | Thomeer et al. | 340/854 |
| 6,347,292 | B1 | 2/2002 | Denny et al. | 702/188 |
| 6,392,317 | B1 | 5/2002 | Hall et al. | 307/90 |
| 6,480,811 | B2 | 11/2002 | Denny et al. | 702/188 |
| 6,604,063 | B2 | 8/2003 | Denny et al. | 702/188 |
| 6,641,434 | B2 | 11/2003 | Boyle et al. | 439/577 |
| 6,670,880 | B1 | 12/2003 | Hall et al. | 336/132 |
| 6,688,396 | B2 | 2/2004 | Floerke et al. | 166/380 |
| 6,759,968 | B2 | 7/2004 | Zierolf | 340/854.8 |
| 6,820,314 | B2 | 11/2004 | Ferguson et al. | 29/25.42 |
| 6,825,754 | B1 | 11/2004 | Rolin | 340/10.34 |
| 6,892,052 | B2 | 5/2005 | Kotola et al. | 455/41.2 |
| 6,923,572 | B2 | 8/2005 | Kano | 374/129 |
| 6,944,547 | B2 | 9/2005 | Womer et al. | 702/7 |
| 7,000,777 | B2 | 2/2006 | Adams et al. | 209/399 |
| 7,587,923 | B1 * | 9/2009 | Garza | 72/367.1 |
| 7,698,922 | B1 * | 4/2010 | Danko et al. | 72/15.3 |
| 2002/0014966 | A1 | 2/2002 | Strassner et al. | 340/572.1 |
| 2002/0035448 | A1 | 3/2002 | Denny et al. | 702/188 |
| 2002/0158120 | A1 | 10/2002 | Zierolf | |
| 2003/0090390 | A1 | 5/2003 | Snider et al. | |
| 2003/0156033 | A1 | 8/2003 | Savage et al. | |
| 2004/0074974 | A1 | 4/2004 | Senba et al. | 235/492 |
| 2004/0088129 | A1 | 5/2004 | Satola | 702/113 |
| 2004/0239521 | A1 | 12/2004 | Zierolf | 340/854.1 |
| 2005/0174241 | A1 | 8/2005 | Olsen | 340/572.8 |
| 2005/0230109 | A1 | 10/2005 | Kammann et al. | 166/255.1 |
| 2005/0230110 | A1 | 10/2005 | Ellison et al. | 166/255.1 |
| 2006/0108113 | A1 | 5/2006 | Scott et al. | 166/255.1 |
| 2006/0108465 | A1 | 5/2006 | Barscevicius et al. | 241/261.2 |
| 2006/0131453 | A1 | 6/2006 | Barscevicius et al. | 241/56 |
| 2006/0243839 | A9 | 11/2006 | Barscevicius et al. | 241/261.2 |

FOREIGN PATENT DOCUMENTS

| | | |
|---|---|---|
| WO | WO 93/15561 | 1/1993 |
| WO | WO 02/06632 | 1/2002 |
| WO | WO 02/092245 | 11/2002 |
| WO | WO 2008/033855 | 3/2008 |

OTHER PUBLICATIONS

International Search Report. PCT/GB2005/050052. mailed Aug. 7, 2005, 3 pp.

Drillstring Identification to Reduce Drillstring Failures. IADC/SPE 17210. Twilhaar et al. pp. 297-300. 1988.

Electronic Identification of Drillstem and Other Components Useed in Harsh Environments Proves Successful. SPE/IADC 25774. Sheoard et al. pp. 915-926. 1993.

MBBS Launches RFID THrough Metal at Expo in Europe. Andrews. 2001.

RFID Right Through the Metal. MBBS. 4 pp.. 2001.

PCT/GB2009/051752 International Search Report (Jun. 7, 2010).

* cited by examiner

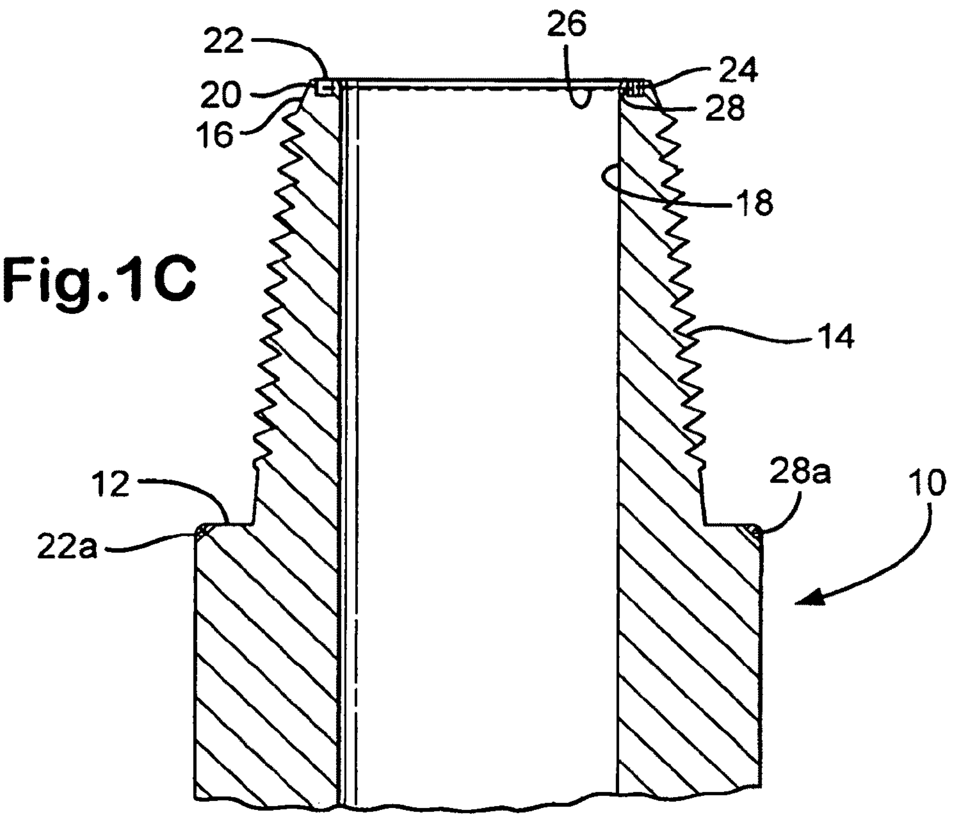
Fig.1C
Fig.1D
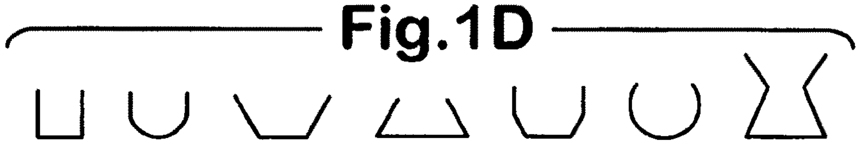
Fig.2
Prior Art
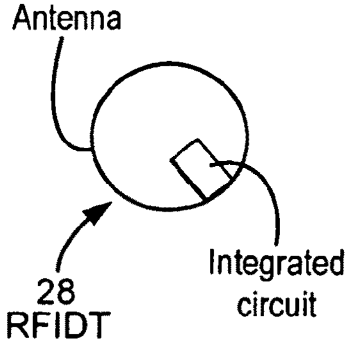
Fig.2A
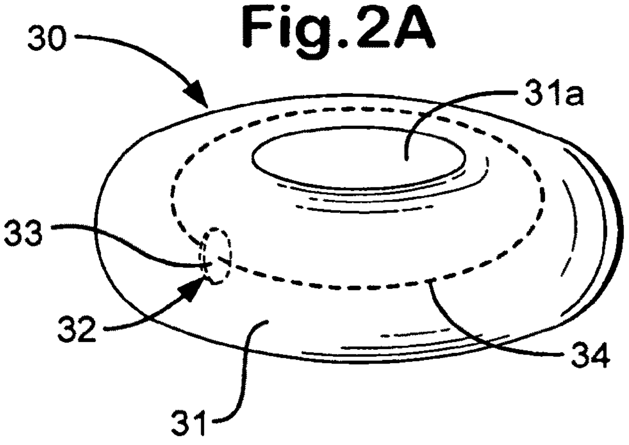

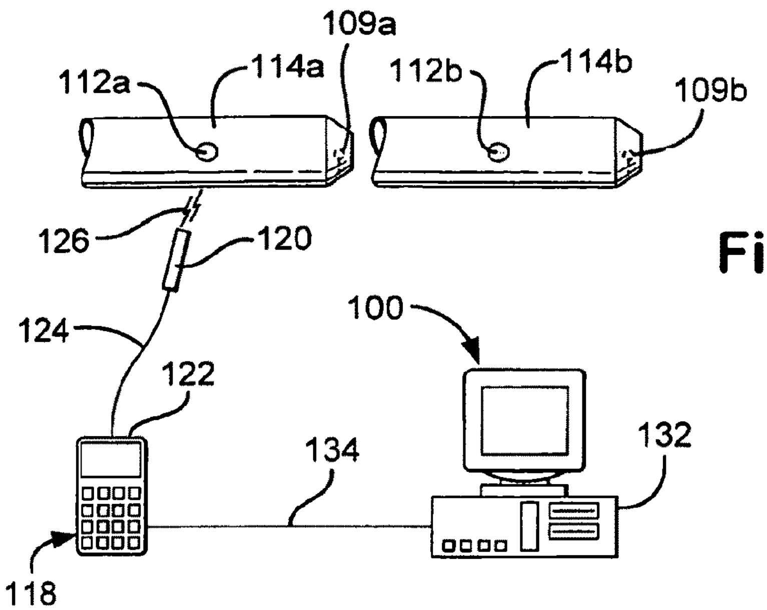
Fig.5A
Fig.5B
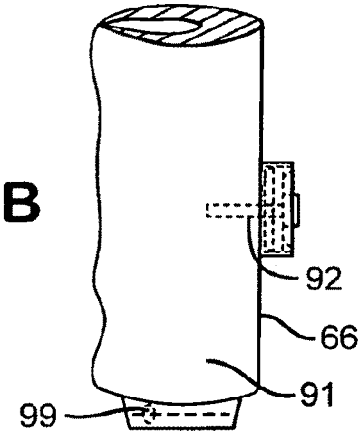
Fig.5C
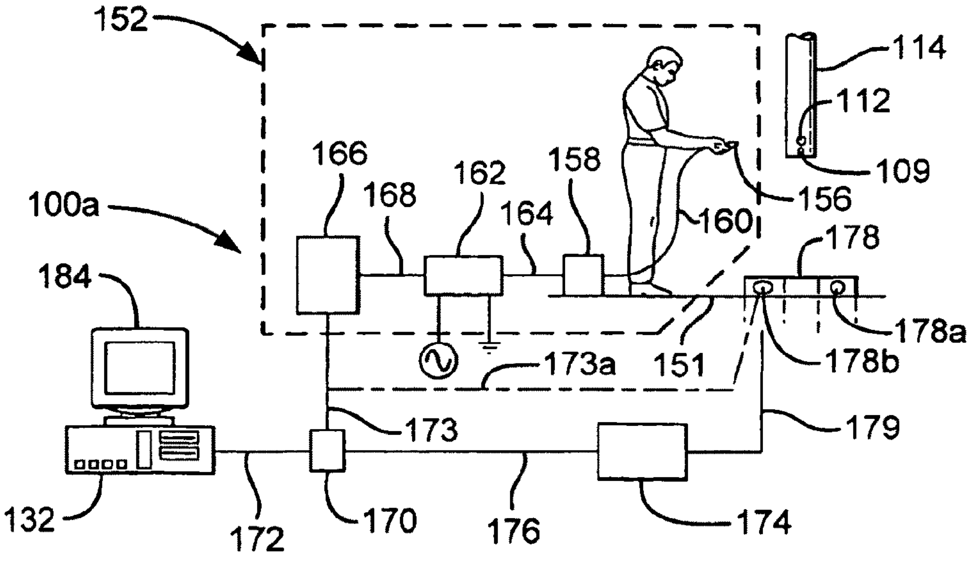

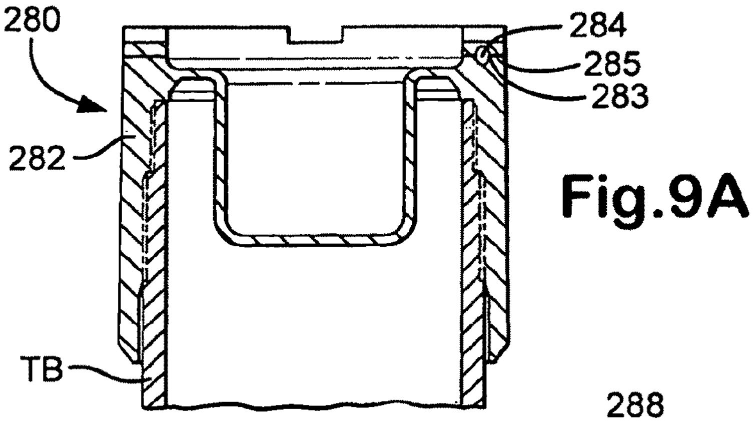
Fig.9A
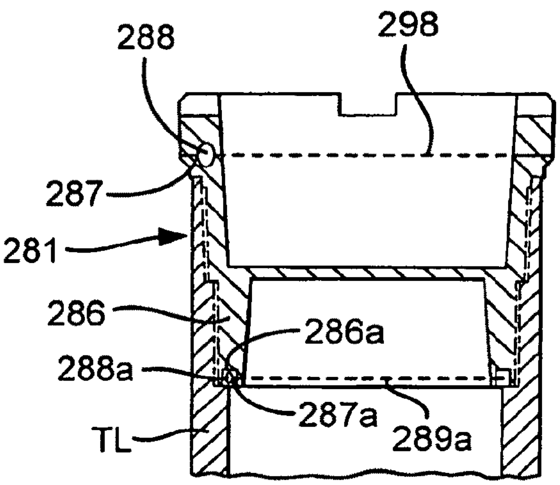
Fig.9B
Fig.10A
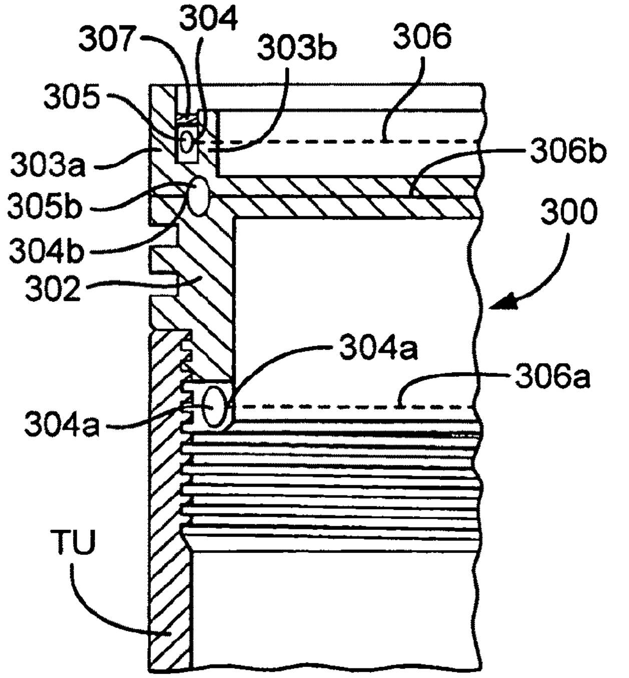
Fig.10B
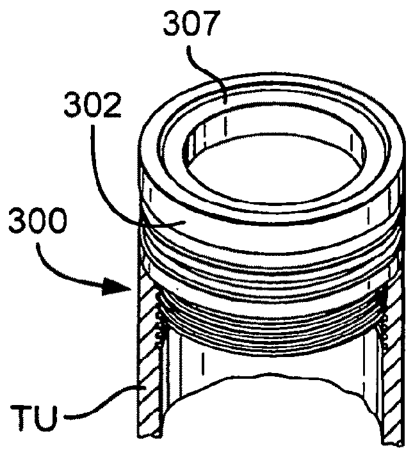

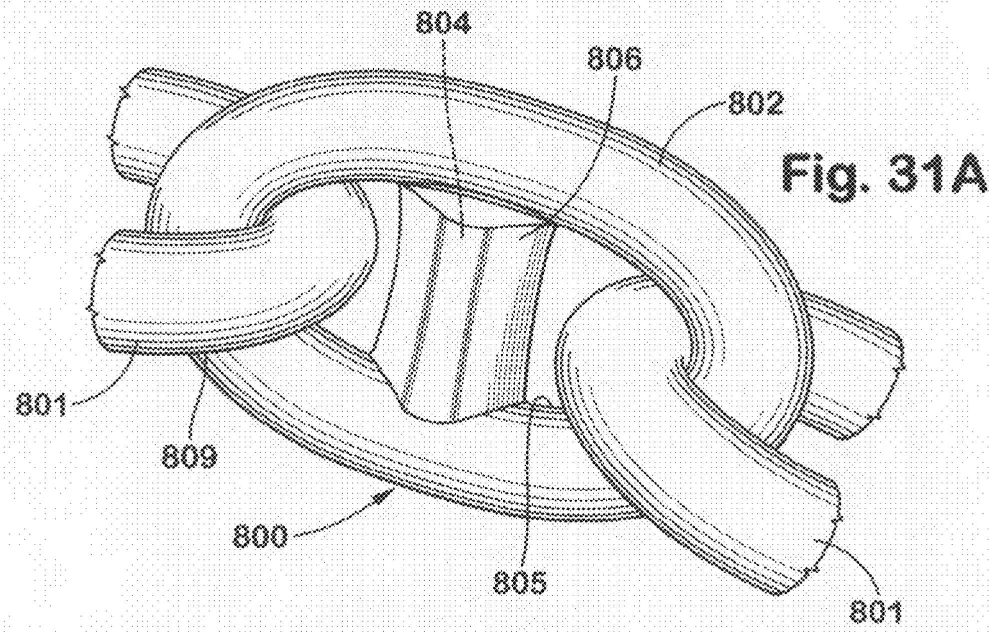
Fig. 31A
Fig. 31B
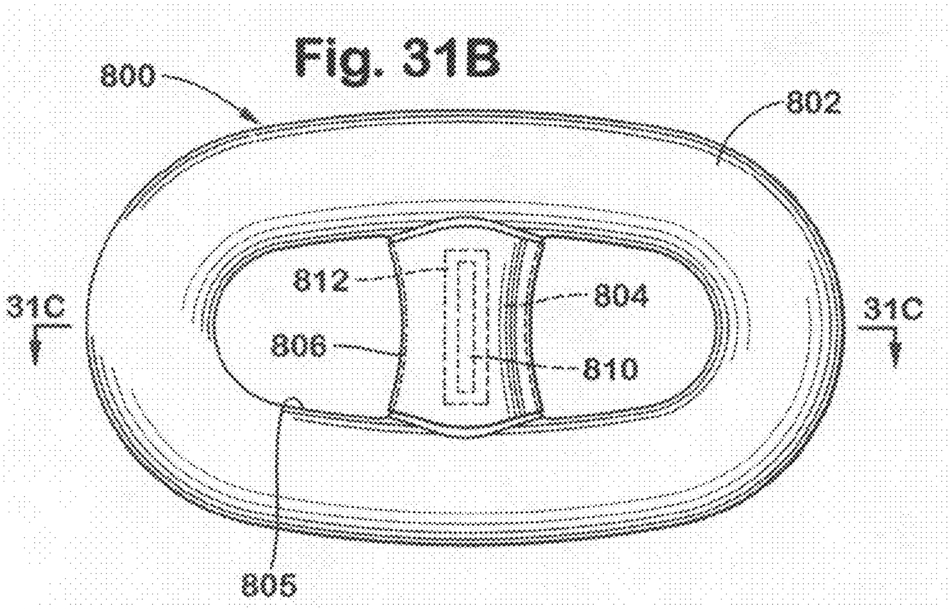
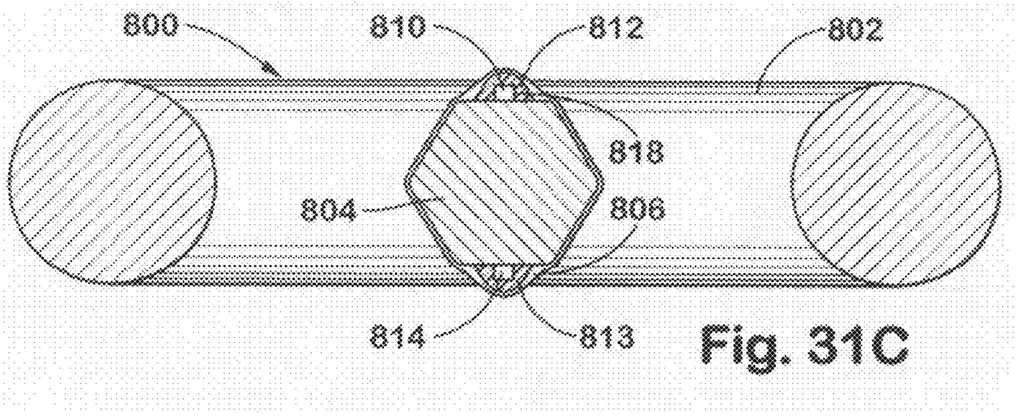
Fig. 31C

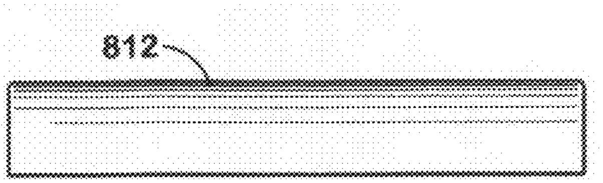
Fig. 32A
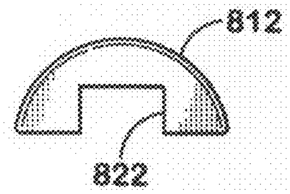
Fig. 32B
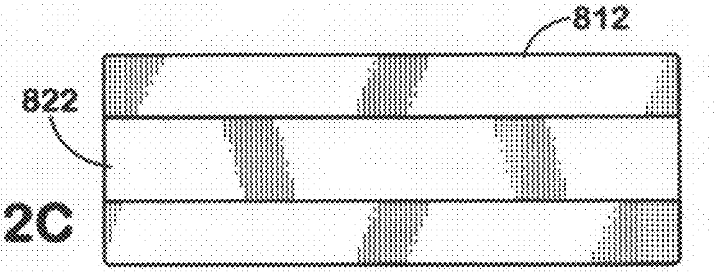
Fig. 32C
Fig. 32E
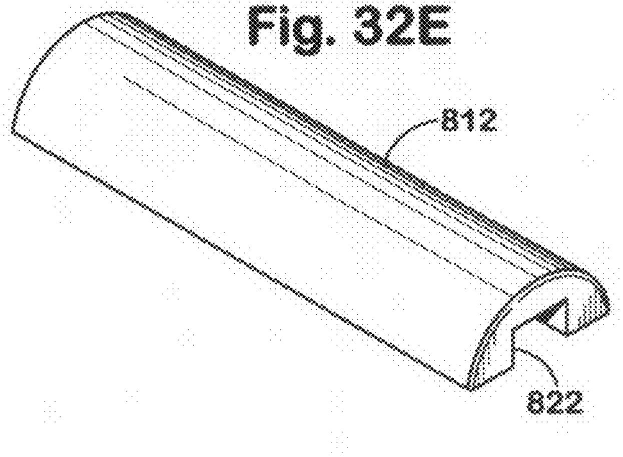
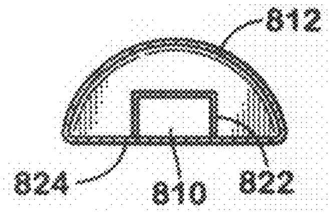
Fig. 32D
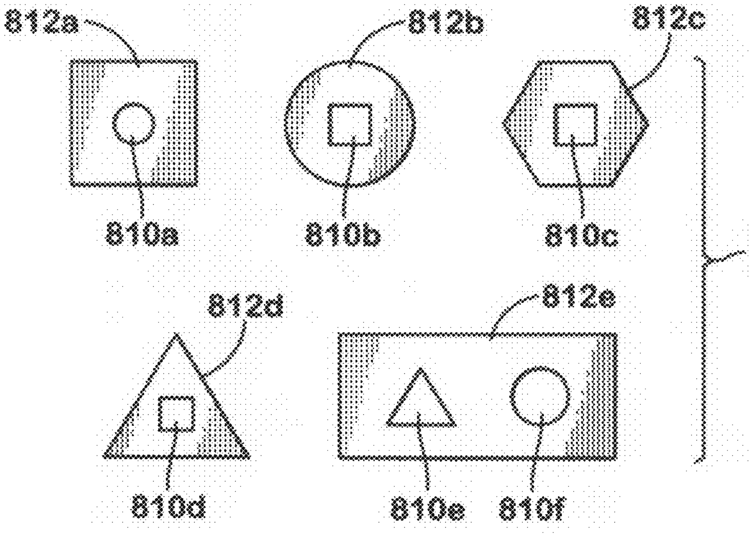
Fig. 33

Fig. 34
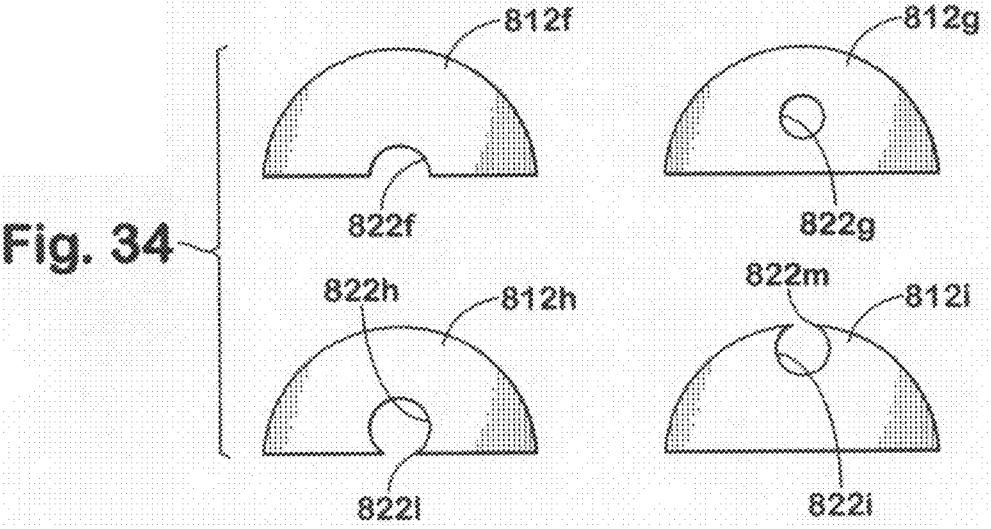
Fig. 35A
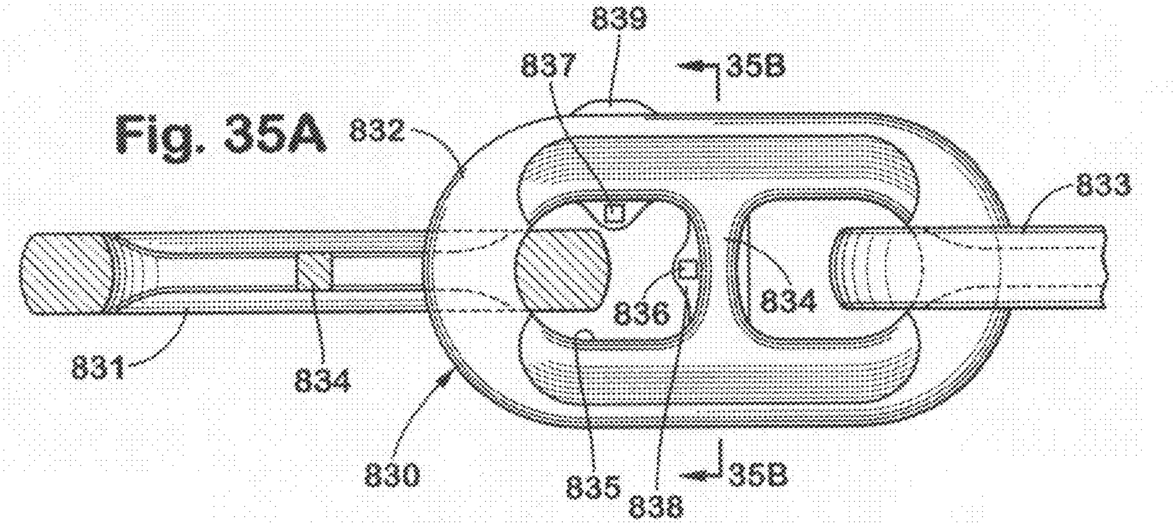
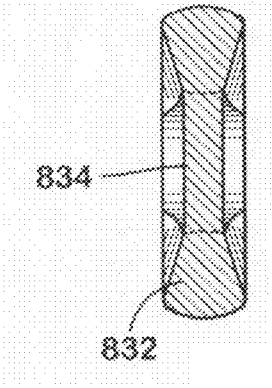
Fig. 35B

Fig. 36A
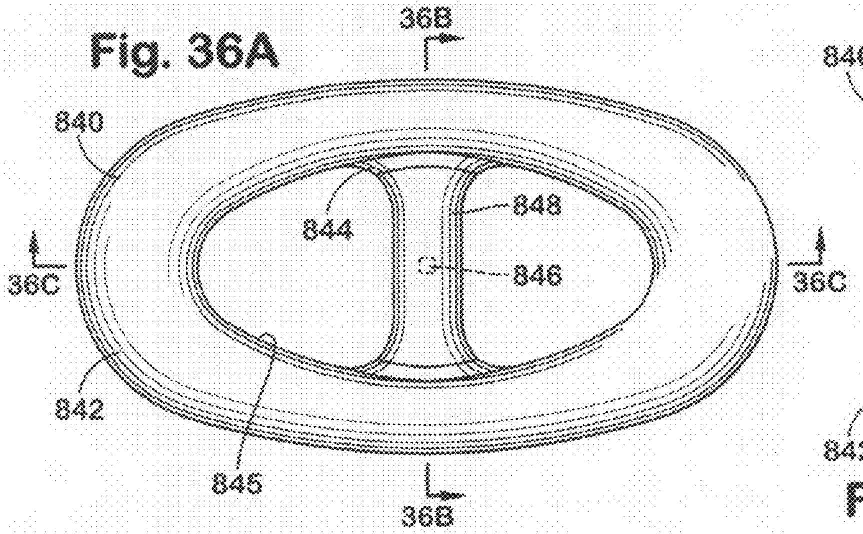
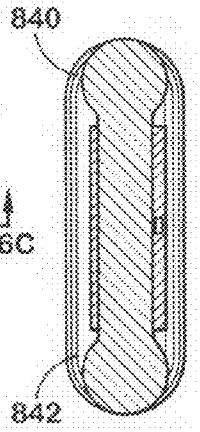
Fig. 36B
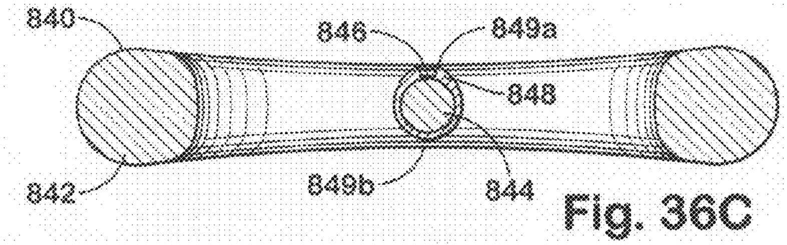
Fig. 36C
Fig. 37A
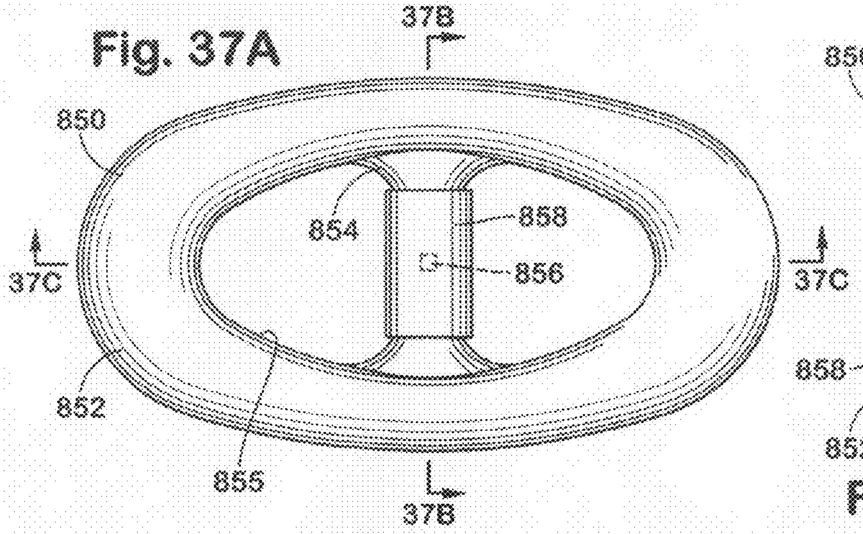
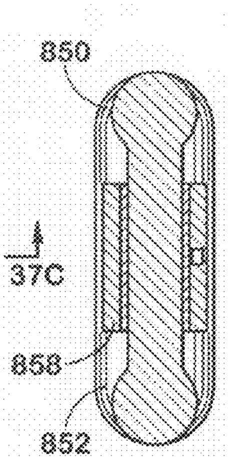
Fig. 37B
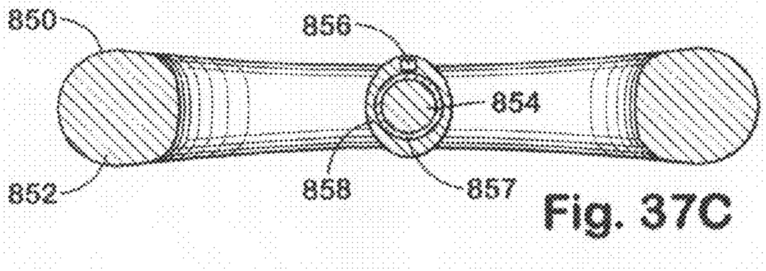
Fig. 37C

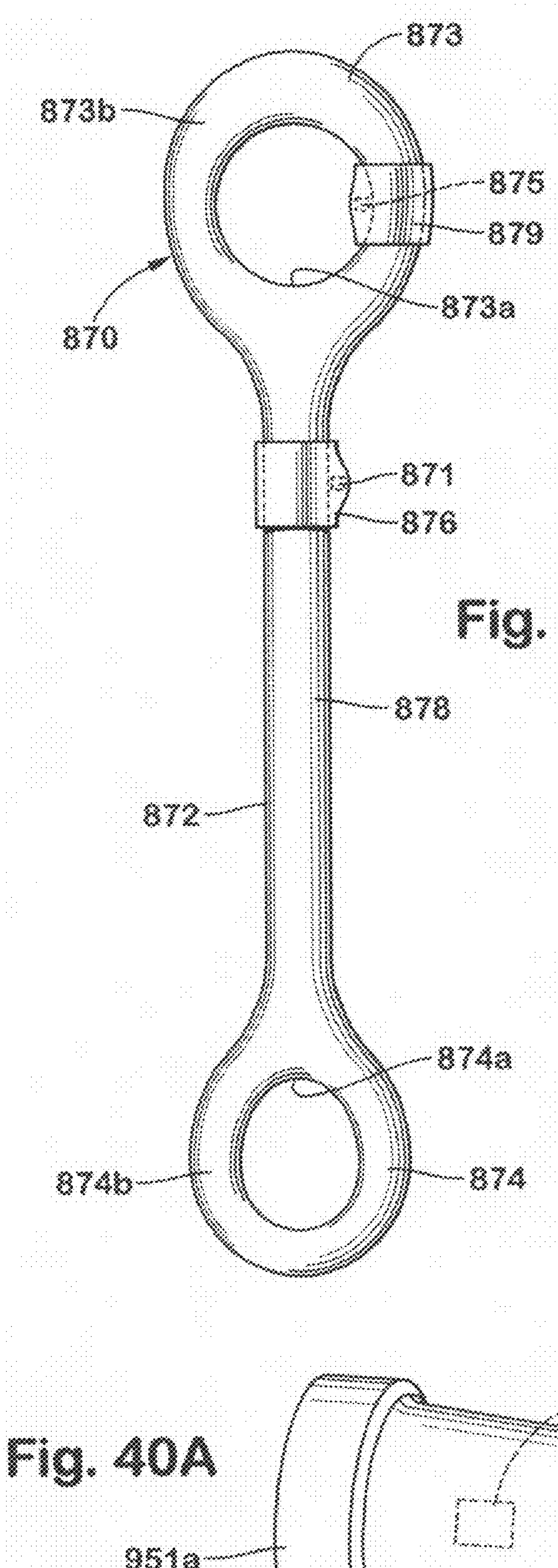
Fig. 39
Fig. 40A

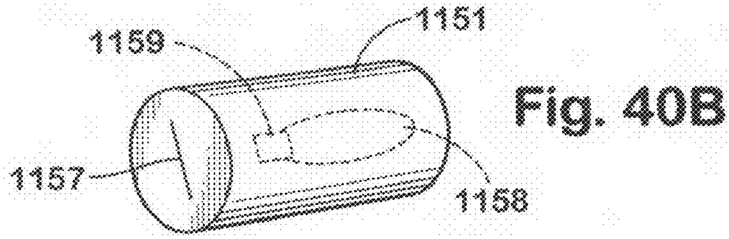
Fig. 40B
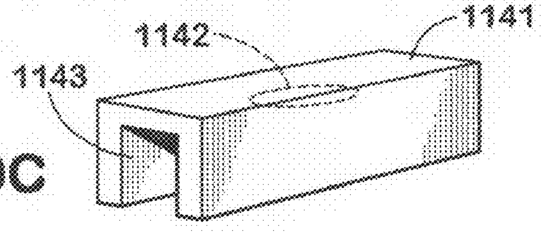
Fig. 40C
Fig. 41A
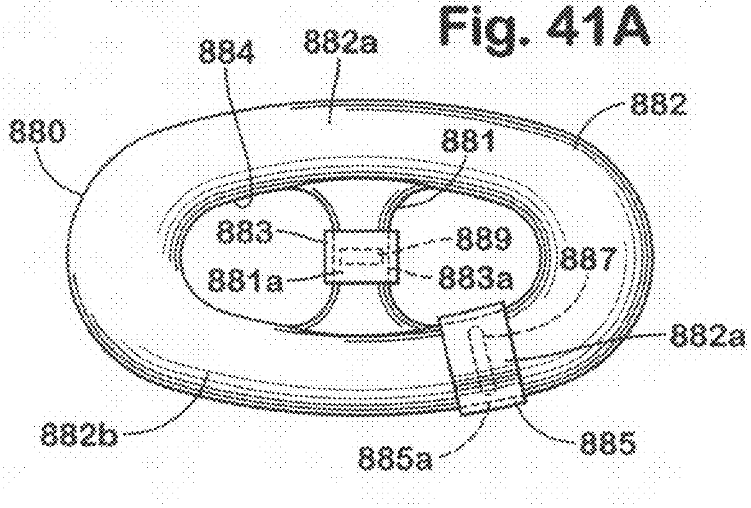
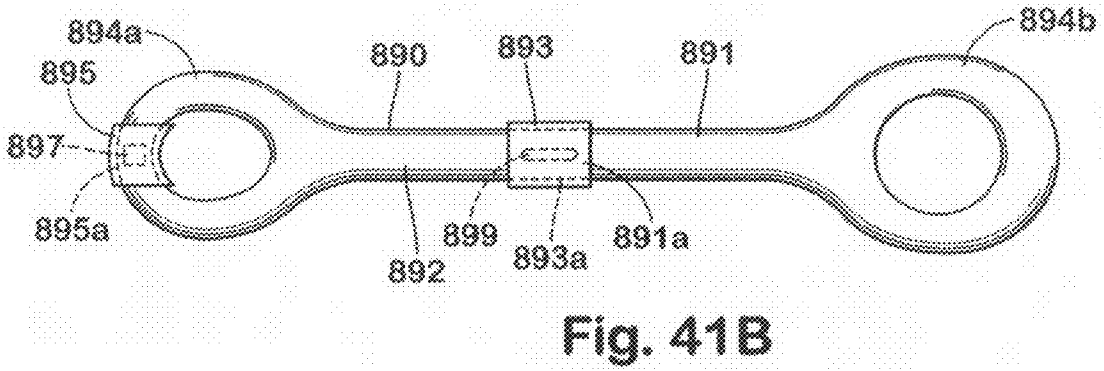
Fig. 41B

CHAIN WITH IDENTIFICATION APPARATUS

CROSS REFERENCE TO RELATED APPLICATIONS

This is a continuation-in-part of U.S. application Ser. No. 11/255,160 filed Oct. 20, 2005 now U.S. Pat. No. 7,484,625, which is a continuation in part of U.S. application Ser. No. 11/059,584 filed Feb. 16, 2005 now U.S. Pat. No. 7,159,654 which is a continuation-in-part of U.S. application Ser. No. 10/825,590 filed Apr. 15, 2004 now abandoned—from all of which the present invention and application claim the benefit of priority under the Patent Laws and all of which are incorporated fully herein for all purposes.

BACKGROUND OF THE INVENTION

1. Field of the Invention

This invention is directed to systems and methods for identifying items; in certain aspects, to chain with wave-energizable identification apparatus thereon; and, in certain aspects to identifying items in the oil and gas industry; and in one particular aspect to identifying tubulars, including, but not limited to, pieces of drill pipe, using radio frequency identification devices and/or sensible indicia.

2. Description of Related Art

The prior art discloses a variety of systems and methods for using surface acoustic wave tags or radio frequency identification tags in identifying items, including items used in the oil and gas industry such as drill pipe. (See e.g. U.S. Pat. Nos. 4,698,631; 5,142,128; 5,202,680; 5,360,967; 6,333,699; 6,333,700; 6,347,292; 6,480,811; and U.S. patent application Ser. Nos. 10/323,536 filed Dec. 18, 2002; 09/843,998 filed Apr. 27, 2001; 10/047,436 filed Jan. 14, 2002; 10/261,551 filed Sep. 30, 2002; 10/032,114 filed Dec. 21, 2001; and 10/013,255 filed Nov. 5, 2001; all incorporated fully herein for all purposes.) In many of these systems a radio frequency identification tag or "RFIDT" is used on pipe at such a location either interiorly or exteriorly of a pipe, that the RFIDT is exposed to extreme temperatures and conditions downhole in a wellbore. Often an RFIDT so positioned fails and is of no further use. Also, in many instances, an RFIDT so positioned is subjected to damage above ground due to the rigors of handling and manipulation.

The present inventors have realized that, in certain embodiments, chain links can be provided with effective identification apparatus; and that substantial usefulness for a tubular identification system can be achieved by divorcing the desire for effective above-ground identification and operation from the goal of downhole accessibility.

BRIEF SUMMARY OF THE PRESENT INVENTION

The present invention discloses, in certain aspects, a link (e.g., but not limited to a chain link or an elevator link) which has: a body; the body having an exterior surface and two spaced-apart ends; wave-energizable identification apparatus (one or a plurality) on the exterior surface of the body; the wave-energizable identification apparatus wrapped in fabric material; the fabric material including heat-resistant non-conducting material; and the wave-energizable identification apparatus wrapped and positioned on the body so that the wave-energizable identification apparatus does not contact the body.

The present invention discloses, in certain aspects, a link (e.g., but not limited to a chain link or an elevator link) with a link body, the link body having a link body exterior surface, two spaced-apart ends (in one particular aspect with an opening at each end), and a link opening through the link body; wave-energizable apparatus (one or a plurality) on the exterior surface of the link body; and a wrap over the wave-energizable apparatus wrapping the wave-energizable identification apparatus wrapped to the link body and/or a mass or other item securing the wave-energizable apparatus to the body.

The present invention discloses, in certain aspects, methods for sensing a wave-energizable apparatus of a member which is a link with a body, the methods including; energizing the wave-energizable identification apparatus by directing energizing energy to it; the wave-energizable identification apparatus upon being energized producing a signal; positioning the link adjacent sensing apparatus; and sensing with the sensing apparatus the signal produced by the wave-energizable apparatus.

The present invention discloses, in certain aspects, a chain link with a link body, the link body having a link body exterior surface, two spaced-apart ends, and a link opening through the link body; a stud connected to the link body and extending across the link opening, the stud having a stud exterior surface; wave-energizable identification apparatus on the stud exterior surface and/or on the body exterior surface; the wave-energizable identification apparatus wrapped in fabric material, the fabric material including heat-resistant non-conducting material; and the wave-energizable identification apparatus wrapped and positioned on the stud so that the wave-energizable identification apparatus does not contact the stud and/or the wave-energizable identification apparatus wrapped and positioned on the body so that the wave-energizable identification apparatus does not contact the body.

In certain aspects, the present invention discloses such a chain in which the identification apparatus is protected by a shield that is applied to and/or connected to the link or the stud.

The present invention, in certain aspects, provides an item, an apparatus, or a tubular, e.g. a piece of drill pipe, with a radio frequency identification tag either affixed exteriorly to the item, apparatus or tubular or in a recess in an end thereof so that the RFIDT is protected from shocks (pressure, impacts, thermal) that may be encountered in a wellbore or during drilling operations. In one particular aspect one or more RFIDT's are covered with heat and/or impact resistant materials on the exterior of an item. In one particular aspect, the present invention discloses systems and methods in which a piece of drill pipe with threaded pin and box ends has one or more circumferential recesses formed in the pin end into which is emplaced one or more radio frequency identification tags each with an integrated circuit and with an antenna encircling the pin end within A recess. The RFIDT (OR RFIDT'S) in a recess is protected by a layer of filler, glue or adhesive, e.g. epoxy material, and/or by a cap ring corresponding to and closing off the recess. Such a cap ring may be made of metal (magnetic; or nonmagnetic, e.g. aluminum, stainless steel, silver, gold, platinum and titanium), plastic, composite, polytetrafluoroethylene, fiberglass, ceramic, and/or cermet. The RFIDT can be, in certain aspects, any known commercially-available read-only or read-write radio frequency identification tag and any suitable known reader system, manual, fixed, and/or automatic may be used to read the RFIDT.

The present invention, in certain aspects, provides an item, apparatus, or tubular, e.g. a piece of drill pipe, with one or more radio frequency identification tags wrapped in heat and impact resistant materials; in one aspect, located in an area 2-3" in length beginning ½ from the 18 degree taper of the pin and drill pipe tool joint so that the RFIDT (or RFIDT's) is protected from shocks (pressure, impacts, thermal) that may be encountered on a rig, in a wellbore, or during wellbore (e.g. drilling or casing) operations. In one particular aspect, the present invention discloses systems and methods in which a piece of drill pie with threaded pin and box ends has one or more radio frequency identification tags each with an integrated circuit and with an antenna encircling the pin end upset area located exteriorly on the pipe, e.g. in an area ½"-2½" from a pin end 18 degree taper. The RFIDT (or RFIDT's) is protected by wrapping the entire RFIDT and antenna in a heat resistant material wrapped around the circumference of the tube body and held in place by heat resistant glue or adhesive, e.g. epoxy material which encases the RFIDT. This material is covered with a layer of impact resistant material and wrapped with multiple layers of wrapping material such as epoxy bonded wrap material. Preferably this wrapping does not exceed the tool joint OD. The RFIDT can be (as can be any disclosed herein), in certain aspects, any known commercially-available read-only or read-write radio frequency identification tag and any suitable know reader system, manual, fixed, and/or automatic may be used to read the RFIDT. Such installation of RFIDT's can be carried out in the field, in a factory, on a rig, with no machining necessary. Optionally, a metal tag designating a unique serial number of each item, apparatus, or length of drill pipe located under the wrap with the RFIDT(s) insures "Traceability" is never lost due to failure of the RFIDT(s). Replacement of failed RFIDT's can be carried out without leaving a location, eliminating expensive transportation or trucking costs. Optionally the wrap is applied in a distinctive and/or a bright color for easy identification. Determining whether an item, apparatus, or a tubular or a length of drill pipe or a drill pipe string is RFID-tagged or not is visibly noticeable, e.g. from a distance once the RFIDT's are in place.

In certain particular aspects an RFIDT is encased in a ring of protective material whose shape and configuration corresponds to the shape of the pin end's recess and the ring is either permanently or removably positioned in the recess. Such a ring may be used without or in conjunction with an amount of protective material covering the ring or with a cap ring that protectively covers the RFIDT. Two or more RFIDT's may be used in one recess and/or there may be multiple recesses at different levels. In other aspects a ring is provided which is emplaceable around a member, either a generally cylindrical circular member or a member with some other shape.

With an RFIDT located in a pipe's pin end as described herein, upon makeup of a joint including two such pieces of pipe, an RFIDT in one pipe's pin end is completely surrounded by pipe material—including that of a corresponding pipe's box end—and the RFIDT is sealingly protected from access by materials flowing through the pipe and from materials exterior to the pipe. The mass of pipe material surrounding the enclosed RFIDT also protects it from the temperature extremes of materials within and outside of the pipe.

In other aspects [with or without an RFIDT in a recess] sensible material and/or indicia are located within a recess and, in one aspect, transparent material is placed above the material and/or indicia for visual inspection or monitoring; and, in one aspect, such sensible material and/or indicia are in or on a cap ring.

A pipe with a pin end recess as described herein can be a piece of typical pipe in which the recess is formed, e.g. by machining or with laser apparatus or by drilling; or the pipe can be manufactured with the recess formed integrally thereof. In certain particular aspects, in cross-section a recess has a shape that is square, rectangular, triangular, semi-triangular, circular, semi-circular, trapezoid, dovetail, or rhomboid.

It has also been discovered that the location of an RFIDT or RFIDT's according to the present invention can be accomplished in other items, apparatuses, tubulars and generally tubular apparatuses in addition to drill pipe, or in a member, device, or apparatus that has a cross-section area that permits exterior wrapping of RFIDT(S) or circumferential installation of antenna apparatus including, but not limited to, in or on casing, drill collars, (magnetic or nonmagnetic) pipe, thread protectors, centralizers, stabilizers, control line protectors, mills, plugs (including but not limited to cementing plugs), and risers; and in or on other apparatuses, including, but not limited to, whipstocks, tubular handlers, tubular manipulators, tubular rotators, top drives, tongs, spinners, downhole motors, elevators, spiders, powered mouse holes, and pipe handlers, sucker rods, and drill bits (all which can be made of or have portions of magnetizable metal or nonmagnetizable metal).

In certain aspects the present invention discloses a rig with a rig floor having thereon or embedded therein or positioned therebelow a tag reader system which reads RFIDT's in pipe or other apparatus placed on the rig floor above the tag reader system. All of such rig-floor-based reader systems, manually-operated reader systems, and other fixed reader systems useful in methods and systems according to the present invention may be, in certain aspects, in communication with one or more control systems, e.g. computers, computerized systems, consoles, and/or control system located on the rig, on site, and/or remotely from the rig, either via lines and/or cables or wirelessly. Such system can provide identification, inventory, and quality control functions and, in one aspect, are useful to insure that desired tubulars, and only desired tubulars, go downhole and/or that desired apparatus, and only desired apparatus, is used on the rig. In certain aspects one or more RFIDT's is affixed exteriorly of or positioned in a recess an item, apparatus, or tubular, e.g., in one aspect, in a box end of a tubular. In certain aspects antennas of RFIDT's according to the present invention have a diameter between one quarter inch to ten inches and in particular aspects this range is between two inches and four inches. Such systems can also be used with certain RFIDT's to record on a read-write apparatus therein historical information related to current use of an item, apparatus or of a tubular member; e.g., but not limited to, that this particular item, apparatus, or tubular member is being used at this time in this particular location or string, and/or with particular torque applied thereto by this particular apparatus.

In other aspects, a pipe with a pin end recess described therein has emplaced therein or thereon a member or ring with or without an RFIDT and with sensible indicia, e.g., one or a series of signature cuts, etchings, holes, notches, indentations, alpha and/or numeric characters, raised portion(s) and/or voids, filled in or not with filler material (e.g. but not limited to, epoxy material and/or nonmagnetic or magnetic metal, composite, fiberglass, plastic, ceramic and/or cermet), which indicia are visually identifiable and/or can be sensed by sensing systems (including, but not limited to, systems using ultrasonic sensing, eddy current sensing, optical/laser sensing, and/or microwave sensing). Similarly it is within the scope of the present invention to provide a cap ring (or a ring to be emplaced in a recess) as described herein (either for closing off a recess or for attachment to a pin end which has no such recess) with such indicia which can be sensed visually or with sensing equipment.

It is within the scope of this invention to provide an item, apparatus, or tubular member as described herein exteriorly affixed (RFIDT(s) and/or with a circular recess as described above with energizable identification apparatus other than or in addition to one or more RFIDT'S; including, for example one or more surface acoustic wave tags ("SAW tags") with its antenna apparatus in the circular apparatus.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious devices, chain links with apparatus for identification and/or for tracking, inventory and control and, in certain aspects, such chain links employing identification device(s), e.g. wave-energizable devices, e.g., one or more radio frequency identification tags and/or one or more SAW tags;

New, useful, unique, efficient, nonobvious devices, systems and methods for apparatus identification, tracking, inventory and control and, in certain aspects, such systems and methods employing identification device(s), e.g. one or more RFIDT and/or one or more SAW tags;

Such systems and methods in which a member is provided with one or more exteriorly affixed RFIDT's and/or one or more recesses into which one or more identification devices are placed;

Such systems and methods in which the member is a cylindrical or tubular member and the recess (or recesses) is a circumferential recess around either or both ends thereof, made or integrally formed therein;

Such systems and methods in which filler material and/or a cap ring is installed permanently or releasably over a recess to close it off and protect identification device(s);

Such systems and methods in which aspects of the present invention are combined in a nonobvious and new manner with existing apparatuses to provide dual redundancy identification;

Such systems and methods in which a sensing-containing member (flexible or rigid) is placed within or on an item; and Such systems and methods which include a system on, in, or under a rig floor, and/or on equipment, for sensing identification device apparatus according to the present invention.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1C is a partial cross-sectional view of the drill pipe of FIG. 1A.

FIG. 1D shows shapes for recesses according to the present invention.

FIG. 2 is a graphical representation of a prior art commercially-available radio frequency identification tag apparatus.

FIG. 2A is a perspective view of a torus according to the present invention.

FIG. 5A is a schematic view of a system according to the present invention.

FIG. 5B is a side view of a tubular according to the present invention.

FIG. 5C is a schematic view of a system according to the present invention.

FIG. 9A is a side cross-section view of a thread protector according to the present invention.

FIG. 9B is a side cross-section view of a thread protector according to the present invention.

FIG. 10A is a side cross-section view of a thread protector according to the present invention.

FIG. 10B is a perspective view of a thread protector according to the present invention.

FIG. 31A is a perspective view of a chain according to the present invention.

FIG. 31B is a top view of a link of the chain of FIG. 31A.

FIG. 31C is a cross-section view along line 31C-31C of FIG. 31B.

FIG. 32A is a cross-section view of a shield according to the present invention.

FIG. 32B is a side view of the shield of FIG. 32A.

FIG. 32C is a bottom view of the shield of FIG. 32A.

FIG. 32D is an end view of the shield of FIG. 32A within a tube.

FIG. 32E is a perspective view of the shield of FIG. 32A.

FIG. 33 shows in cross-section shields according to the present invention.

FIG. 34 shows in cross-section shields according to the present invention.

FIG. 35A is a side view of a chain according to the present invention.

FIG. 35B is a cross-section view along line B-B of FIG. 35A.

FIG. 36A is a top view of a chain link according to the present invention.

FIG. 36B is a cross-section view along line 36B-36B of FIG. 36A.

FIG. 36C is a cross-section view along line 36C-36C of FIG. 36A.

FIG. 37A is a top view of a chain link according to the present invention.

FIG. 37B is a cross-section view along line 37B-37B of FIG. 37A.

FIG. 37C is a cross-section view along line 37C-37C of FIG. 37A.

FIG. 39 is a perspective view of a link according to the present invention.

FIG. 40A is a perspective view of an apparatus according to the present invention.

FIG. 40B is a perspective view of an apparatus according to the present invention.

FIG. 40C is a perspective view of an apparatus according to the present invention.

FIG. 41A is a side view of a link according to the present invention.

FIG. 41B is a side view of a link according to the present invention.

Figure 1A:
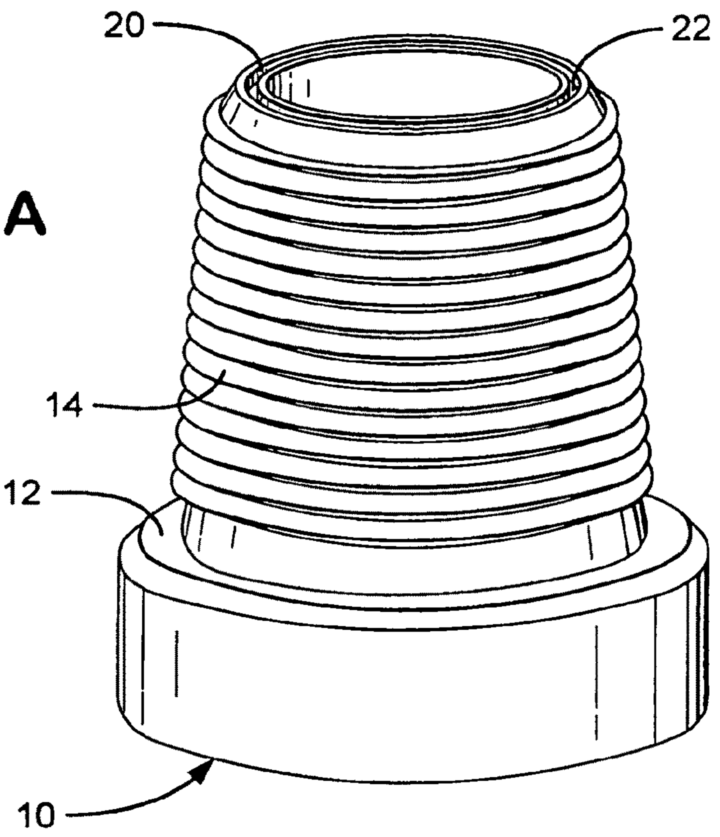
FIG. 1A is a perspective view of a pin end of a drill pipe according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

Figure 1B:
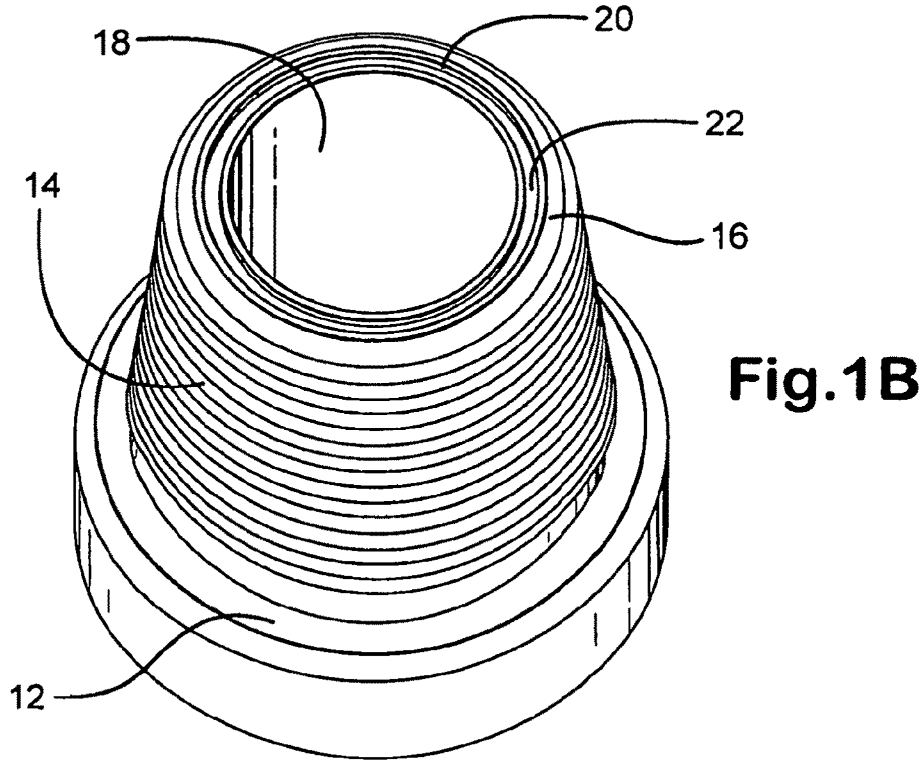
FIG. 1B is a perspective views of a pin end of a drill pipe according to the present invention.

FIGS. 1A-1C show a pin end 10 of a drill pipe according to the present invention which has a sealing shoulder 12 and a threaded end portion 14. A typical flow channel 18 extends through the drill pipe from one end to the other. A recess 20 in the top 16 (as viewed in FIG. 1C) of the pin end 10 extends around the entire circumference of the top 16. This recess 20 is shown with a generally rectangular shape, but it is within the scope of this invention to provide a recess with any desired cross-sectional shape, including, but not limited to, the shapes shown in FIG. 1D. In one aspect an entire drill pipe piece with a pin end 10 is like the tubular shown in FIG. 3A or the drill pipe of FIG. 12B. The recess 20 (as is true for any recess of any embodiment disclosed herein) may be at any depth (as viewed in FIG. 1C) from the end of the pin end and, as shown in FIGS. 1A-1C may, according to the present invention, be located so that no thread is adjacent the recess.

It is within the scope of the present invention to form the recess 20 in a standard piece of drill pipe with a typical machine tool, drill, with a laser apparatus such as a laser cutting apparatus, or with etching apparatus. Alternatively, it is within the scope of the present invention to manufacture a piece of drill pipe (or other tubular) with the recess formed integrally in the pin end (and/or in a box end). The recess as shown in FIG. 1C is about 5 mm wide and 5 mm deep; but it is within the scope of certain embodiments of the present invention to have such a recess that is between 1 mm and 10 mm wide and between 2 mm and 20 mm deep.

A cap ring 22 is installed over the recess 20 which seals the space within the recess 20. This cap ring 22 (as may be any cap ring of any embodiment herein) may be made of any suitable material, including, but not limited to: metal, aluminum, zinc, brass, bronze, steel, stainless steel, iron, silver, gold, platinum, titanium, aluminum alloys, zinc alloys, or carbon steel; composite; plastic, fiberglass, fiber material such as ARAMID™ fiber material; KEVLAR™ or other similar material; ceramic; or cermet. The cap ring 22 may be sealingly installed using glue, adhesive, and/or welding (e.g., but not limited to Tig, Mig, and resistance welding and laser welding processes).

Disposed within the recess 20 beneath the cap ring 22, as shown in FIG. 1C, is an RFIDT device 28 which includes a tag 24 and an antenna 26. The antenna 26 encircles the recess 20 around the pin end's circumference and has two ends, each connected to the tag 24. The RFIDT tag device may be any suitable known device, including, but not limited to the RFID devices commercially available, as in FIG. 2, e.g. from MBBS Company of Switzerland, e.g. its E-Units™ (TAGs) devices e.g., as in FIG. 2. The RFIDT device 28 may be a read-only or a read-write device. It is within the scope of this invention to provide one, two, three or more such devices in a recess 20 (or in any recess of any embodiment herein). Optionally, the RFIDT device (or devices) is eliminated and a recess 20 with a particular varied bottom and/or varied side wall(s) and/or a cap ring with a nonuniform, varied, and/or structured surface or part(s) is used which variation(s) can be sensed and which provide a unique signature for a particular piece of drill pipe (as may be the case for any other embodiment of the present invention). These variations, etc. may be provided by different heights in a recess or different dimensions of projections or protrusions from a recess lower surface or recess side wall surface, by etchings thereon or on a cap ring, by cuts thereon or therein, and/or by a series of notches and/or voids in a recess and/or in a cap ring and/or by sensible indicia. Optionally, instead of the RFIDT device 28 (and for any embodiment herein any RFIDT) a SAW tag may be used and corresponding suitable apparatuses and systems for energizing the SAW tag(s) and reading them.

Figure 2B:
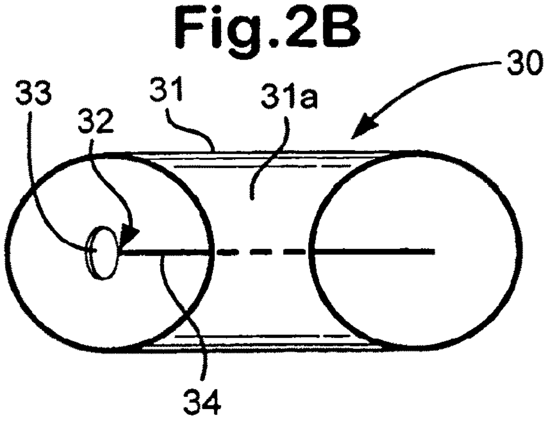
FIG. 2B is a side view partially in cross-section, of the torus of FIG. 2B.

In certain aspects of the present invention with a recess like the recess 20 as described above, a ring or torus is releasably or permanently installed within the recess with or without a cap ring thereover (like the cap ring 22). Such a ring or torus may have one, two, or more (or no) RFIDT's therein. FIGS. 2A and 2B show a torus 30 installable within a recess, like the recess 20 or any recess as in FIG. 1C, which includes a body 31 with a central opening 31*a*. An RFIDT 32 is encased on the body 31. The RFIDT 32 has an integrated circuit 33 and an antenna 34 which encircles the body 31. In certain aspects the body 31 (as may be any body of any torus or ring according to the present invention) is made of metal, plastic, polytetrafluorethylene, fiberglass, composite, ceramic, or of a nonmagnetizable metal. The opening 31*a* (as may be any opening of any torus or ring herein) may be any desired diameter. Optionally, or in addition to the RFIDT device 28, and RFIDT device 28*a* (or devices 28*a*) is affixed exteriorly to the pin end 10 with a multi-layer wrap as described below (see FIGS. 28, 26) [any RFIDT(s) or SAW tag(s) may be used for the RFIDT 28*a*/.

Figure 2C:
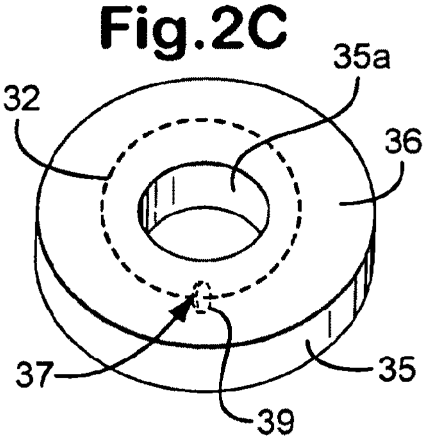
FIG. 2C is a top perspective view of a torus according to the present invention.
Figure 2D:
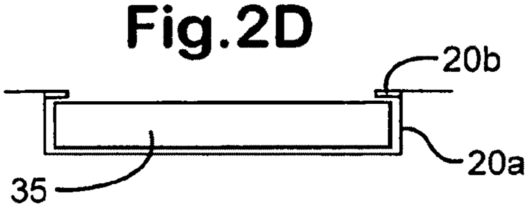
FIG. 2D is a side view in cross-section of a recess according to the present invention with the torus of FIG. 2C therein.

FIGS. 2C and 2D show a torus 35 which has a central opening 35*a*, a body 36 and an RFIDT 37 therein with an antenna 38 that encircles the body 36 and an integrated circuit 39. In one aspect a recess 20*a* in a body for receiving a torus 35 has an upper lip 20*b* (or inwardly inclined edge or edges as shown in FIG. 2D) and the body 36 is made of resilient material which is sufficiently flexible that the torus 35 may be pushed into the recess 20*a* and releasably held therein without adhesives and without a cap ring, although it is within the scope of the present invention to use adhesive and/or a cap ring with a torus 35.

Figure 2E:
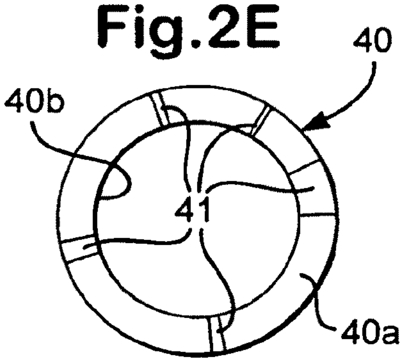
FIG. 2E is a top view in cross-section of a torus according to the present invention.

FIG. 2E shows a torus 40 according to the present invention with a body 40*a* which is insertable into a recess (like the recess 20, the recess 20*a*, or any recess disclosed herein) which has one or more elements 41 therein which serve as strengthening members and/or as members which provide a unique sensible signature for the torus 40 and, therefore, for any pipe or other item employing a torus 40. The torus 40 has a central opening 40*b* and may, according to the present invention, also include one, two or more RFIDT's (not shown).

Figure 2F:
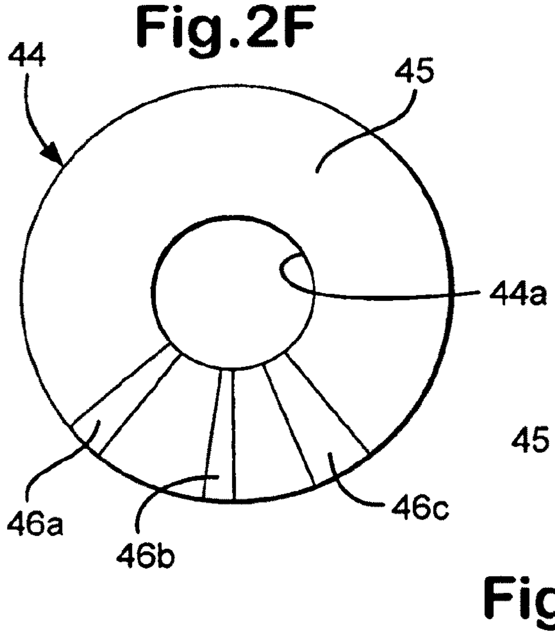
FIG. 2F is a top view of a torus according to the present invention.
Figure 2G:
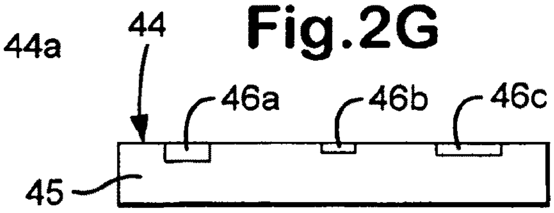
FIG. 2G is a side view of the torus of FIG. 2F.

FIGS. 2F and 2G show a torus 44 according to the present invention insertable into any recess disclosed herein which has a body 45, a central opening 44*a*, and a series of voids 46*a*, 46*b*, and 46*c*. With such a torus 44 made of metal, the voids 46*a*-46*c* can be sensed by any sensing apparatus or method disclosed herein and provide a unique sensible signature for the torus 44 and for any item employing such a torus 44. Any torus described herein may have such a series of voids and any such series of voids may, according to the present invention, contain any desired number (one or more) of voids of any desired dimensions. In one particular aspect, a series of voids provides a barcode which is readable by suitable known barcode reading devices. A torus 44 can be used with or without a cap ring. As desired, as is true of any torus according to the present invention, one, two, or more RFIDT's may be used within or on the torus body. Voids may be made by machining, by drilling, by etching, by laser etching, by hardfacing or using a photovoltaic process.

Figure 2H:
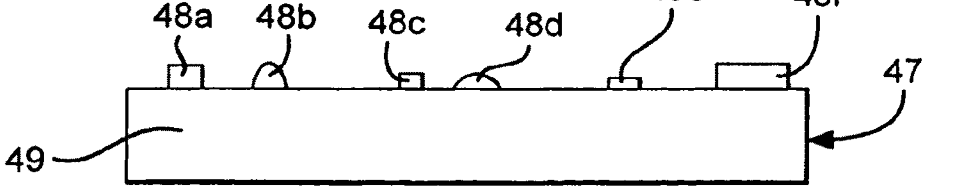
FIG. 2H is a side view of a torus according to the present invention.

FIG. 2H shows a torus 47 according to the present invention useful in any recess of any embodiment herein which has a series of sensible ridges 48*a*-48*f* which can be made by adding material to a torus body 49 [such a torus may have visually readable indicia, e.g. alpha (letter) and/or numeric characters]. Any torus, ring, or cap ring herein may have one or more such ridges and the ridges can have different cross-sections (e.g. as in FIG. 2H) or similar cross-sections and they can be any suitable material, including, but not limited to metal, plastic, epoxy, carbides, and hardfacing. Also, according to the present invention, a cap ring with one or more RFIDT's and/or any other sensible material and/or indicia disclosed herein may be placed around and secured to a tubular's pin end or box end without using a recess.

Figure 2I:
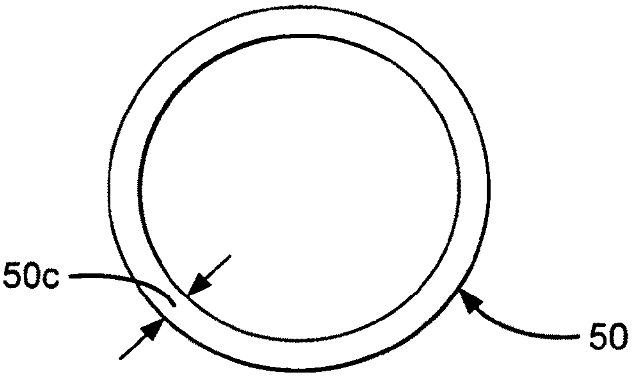
FIG. 2I is a top view of a cap ring according to the present invention.
Figure 2J:
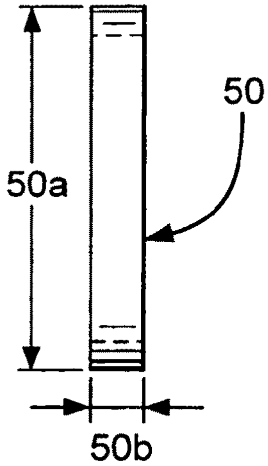
FIG. 2J is a side view of the cap ring of FIG. 2I.
Figure 2K:
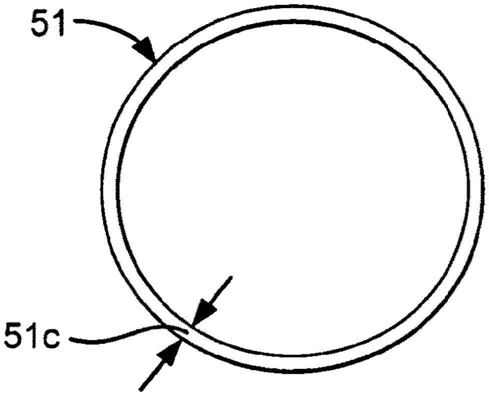
FIG. 2K is a top view of a cap ring according to the present invention.
Figure 2L:
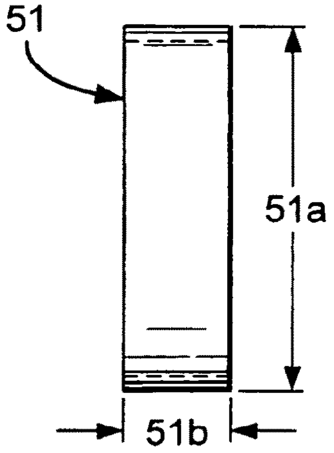
FIG. 2L is a side view of the cap ring of FIG. 2K.
Figure 2M:
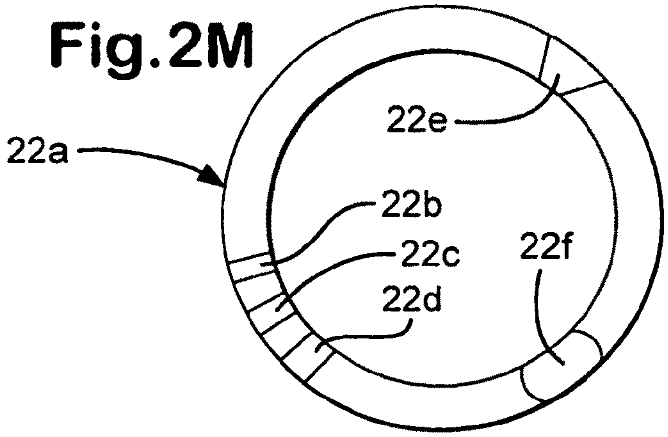
FIG. 2M is a top view of a cap ring according to the present invention.

FIG. 2M shows a cap ring 22*a*, like the cap ring 22, but with sensible indicia 22*b*-22*f* made therein or thereon for sensing by an optical sensing system, an ultrasonic sensing system, an eddy current sensing system, a barcode sensing system, or a microwave sensing system. A cap ring 22*a* may be releasably or permanently installed in or over a recess like any recess disclosed herein. The indicia 22*b*-22*f* may be like any of the indicia or sensible structures disclosed herein.

FIGS. 2I and 2J show a specific cap ring 50 according to the present invention for use with drill pipe having a pin end. The ring 50 has a body with an outer diameter 50*a* of 98 mm, a thickness 50*b* of 5 mm, and a wall thickness 50*c* of 5 mm. FIGS. 2K and 2L show a specific cap ring 51 according to the present invention for use with a drill pipe pin end having an end portion diameter of about four inches. The ring 51 has an outer diameter 51*a* of 98 mm, a thickness 51*b* of 8 to 10 mm, and a wall thickness 51*c* of 3 mm.

Figure 3A:
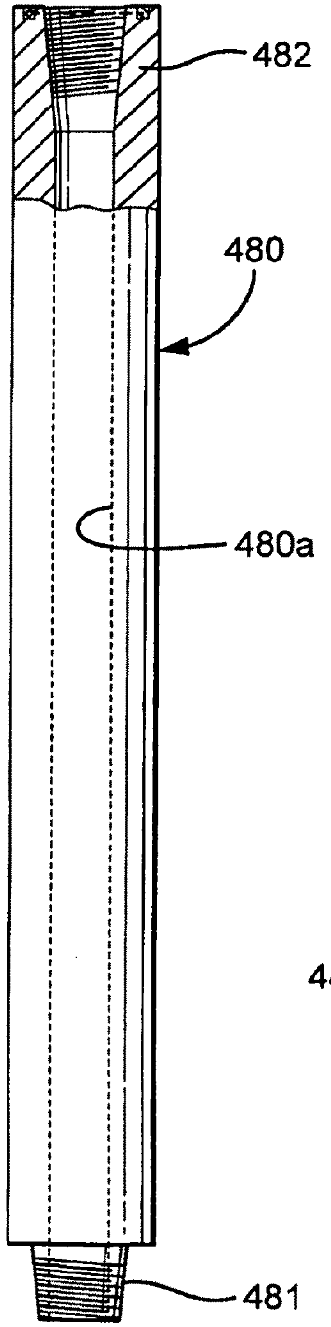
FIG. 3A is a side view, partially in cross-section, of a tubular according to the present invention.
Figure 3B:
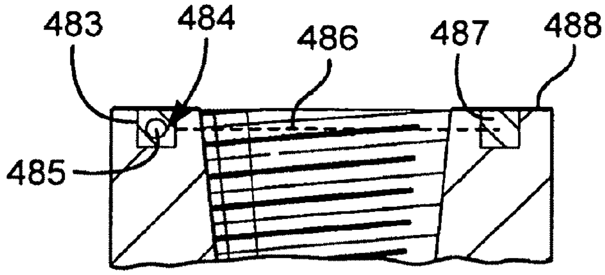
FIG. 3B is an enlarged view of a box end of the tubular of FIG. 3A.
Figure 3C:
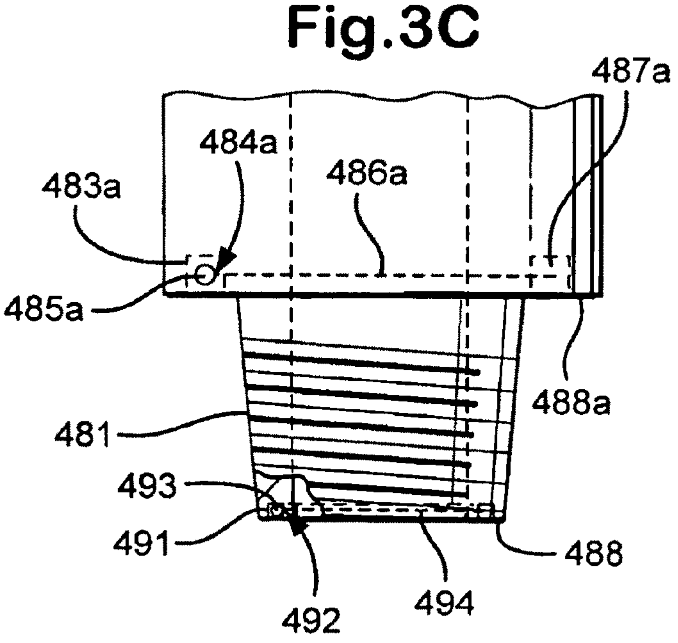
FIG. 3C is an enlarged view of a pin end of the tubular of FIG. 3A.

It is within the scope of the present invention to provide a tubular having a box end and a pin end (each threaded or not) (e.g. casing, riser, pipe, drill pipe, drill collar, tubing), each end with an RFIDT in a recess therein (as any recess described herein) with or without a cap ring (as any described herein). FIGS. 3A-3C show a generally cylindrical hollow tubular member 480 according to the present invention with a flow channel 480*a* therethrough from top to bottom and which has a threaded pin end 481 and a threaded box end 482. The threaded box end 482 has a circumferential recess 483 with an RFIDT 484 therein. The RFIDT has an IC 485 and an antenna 486 which encircles the box end. Optionally, filler material 487 in the recess 483 encases and protects the IC 485 and the antenna 486; and an optional circular cap ring 488 closes off the recess. The RFIDT and its parts and the cap ring may be as any disclosed or referred to herein. Optionally, the tubular member 480 may have a shoulder recess 483*a* with an RFIDT 484*a* with an IC 485*a* and an antenna 486*a*. Filler material 487*a* (optional) encases the RFIDT 484*a* and, optionally, a cap ring 488*a* closes off the recess.

The pin end 481 has a circumferential recess 491 in which is disposed an RFIDT 492 with an IC 493 and an antenna 494 around the pin end. As with the box end, filler material and/or a cap ring may be used with the recess 491. Antenna size is related to how easy it is to energize an IC and, therefore, the larger the antenna, the easier [less power needed and/or able to energize at a greater distance] to energize: and, due to the relatively large circumference of some tubulars, energizing end antennas is facilitated.

Figure 4A:
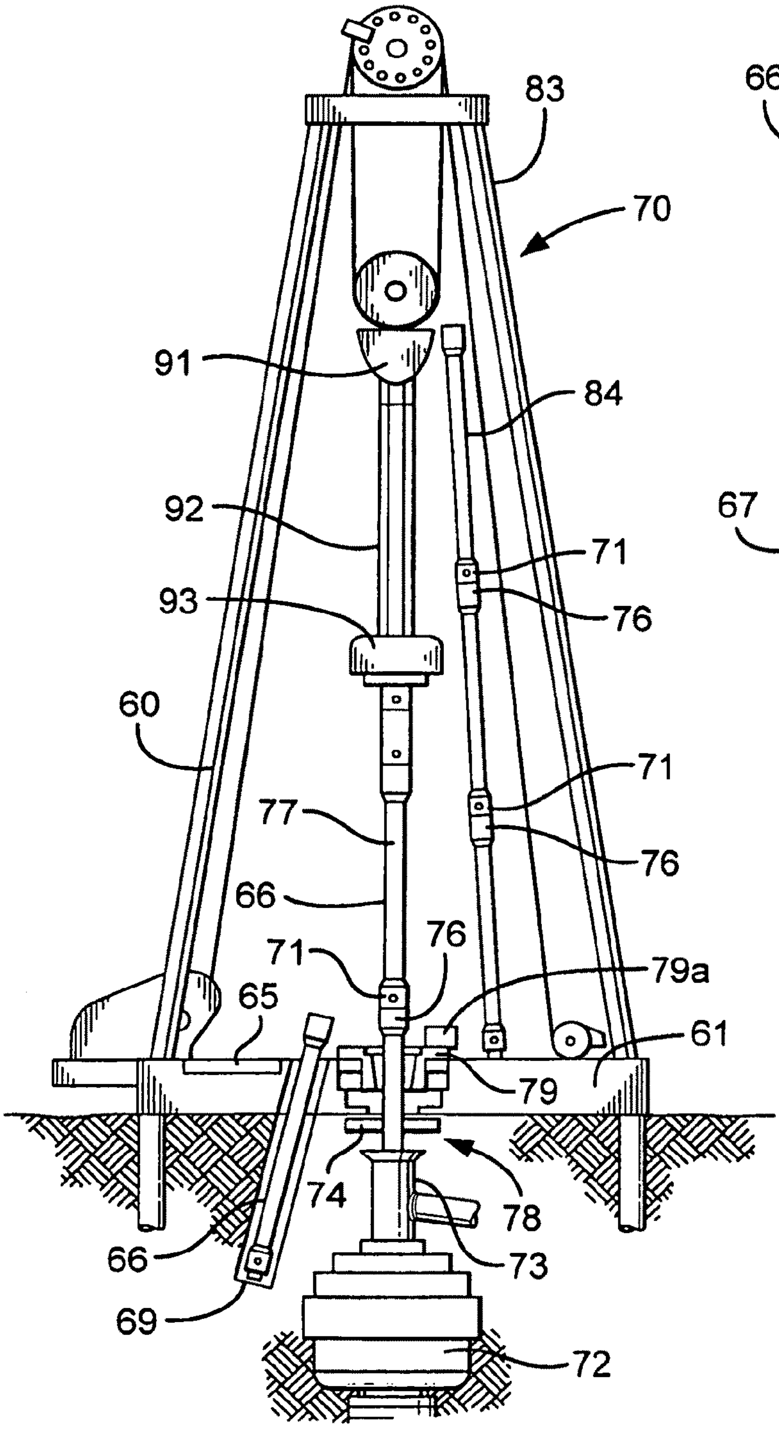
FIG. 4A is a side schematic view of a rig according to the present invention.
Figure 4B:
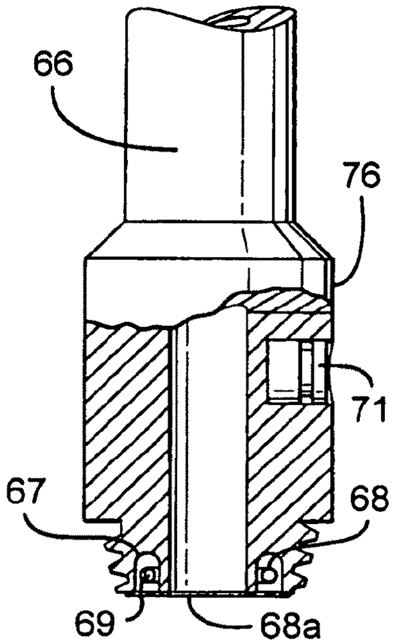
FIG. 4B is a side view partially in cross-section of a tubular according to the present invention.

FIG. 4A shows a system 70 according to the present invention with a rig 60 according to the present invention which has in a rig floor 61*a* reading system 65 (shown schematically) for reading one or more RFIDT's in a drill pipe 66 which is to be used in drilling a wellbore. The reading system 65 incorporates one or more known reading apparatuses for reading RFIDT's, including, but not limited to suitable readers as disclosed in the prior art and readers as commercially available from MBBS Co. of Switzerland. The present invention provides improvements of the apparatuses and systems disclosed in U.S. patent application Ser. No. 09/906,957 filed Jul. 16, 2001 and published on Feb. 7, 2002 as Publication No. 2002/0014966. In an improved system 70 according to the present invention a drill pipe 66 (FIG. 4B) is like the drill pipes 16 in U.S. patent application Ser. No. 09/906,957, but the drill pipe 66 has a recess 67 with a torus 68 therein having at least one RFIDT 69 (shown schematically in FIG. 4B) and a cap ring 68*a* over the torus 68. The drill pipe 66 may be connected with a tool joint 76 to other similar pieces of drill pipe in a drill string 77 (see FIG. 4A) as in U.S. patent application Ser. No. 09/906,957 (incorporated fully herein) and the systems and apparatuses associated with the system 70 (FIG. 4A and FIG. 4C) operate in a manner similar to that of the systems 10 and the system of FIG. 1B of said patent application. Drill string 77 includes a plurality of drill pipes 66 coupled by a plurality of tool joints 76 and extends through a rotary table 78, and into a wellbore through a bell nipple 73 mounted on top of a blowout preventer stack 72. An identification tag (e.g. an RFIDT) 71 is provided on one or more drilling components, such as illustrated in FIG. 4A, associated with the system 70, or the drill pipe 66. An electromagnetic signal generator system 74 that includes an antenna and a signal generator is positioned proximate to an identification tag, for example just below rotary table 78 as illustrated in FIG. 4A. Electromagnetic signal generator system 74 establishes a communications link with an identification tag 71 to energize the antenna, interrogate it, and to convey information relating to the equipment or drill pipe.

The drilling system 70 includes the rig 60 with supports 83, a swivel 91, which supports the drill string 77, a kelly joint 92, a kelly drive bushing 93, and a spider 79 with an RFIDT sensor and/or reader 79*a*. A tool joint 76 is illustrated in FIG. 4A as connecting two drilling components such as drill pipes 66. The identification tag 71 (or the RFIDT 69 read by the system 65) is operated to communicate a response to an incoming electromagnetic signal generated by electromagnetic signal generator system 74 (or by the system 65) that includes information related to the drilling component with the identification tag. The information may be used, for example, to inform an operator of system 70 of a drilling component's identity, age, weaknesses, previous usage or adaptability. According to the teachings of the present invention, this information may be communicated while drill system 70 is in operation. Some or all of the information provided in an identification tag may assist an operator in making a determination of when drilling components need to be replaced, or which drilling components may be used under certain conditions. The electromagnetic signal communicated by an identification tag or RFIDT may provide general inventory management data (such as informing an operator of the drilling components availability on the drilling site, or the drilling component's size, weight, etc.), or any other relevant drilling information associated with the system.

Additional drill string components 84, which are illustrated in FIG. 4A in a racked position, may be coupled to drill pipe 66 and inserted into the well bore, forming a portion of the drill string. One or more of drill string components may also include identification tags or RFIDT's.

Figure 4C:
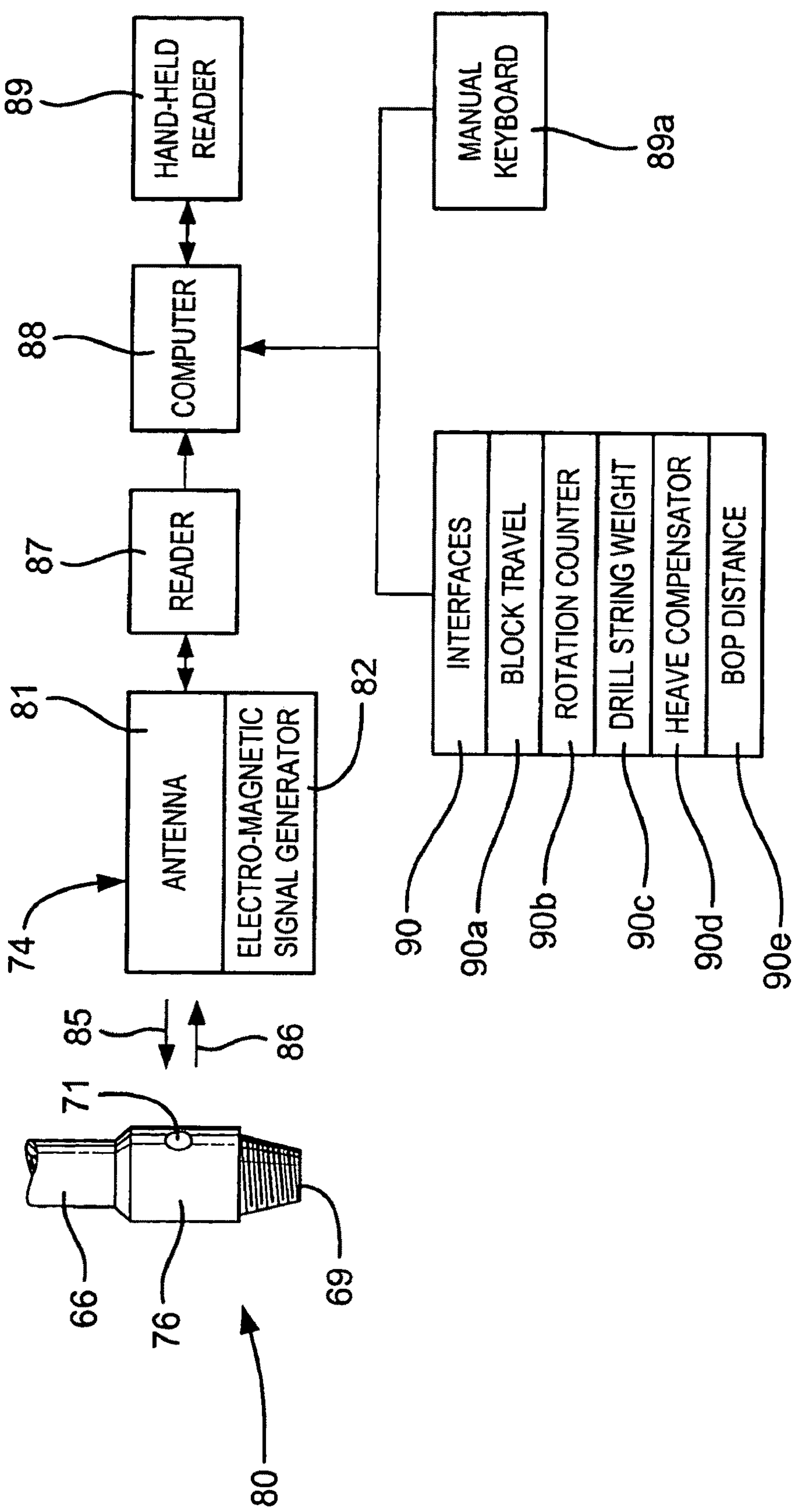
FIG. 4C is a schematic view of the system of FIG. 4A.

FIG. 4C shows typical information that may be included within an identification tag's or RFIDT's, antenna as the antenna cooperates with electromagnetic signal generator 74 and/or the system 65 to transmit an electromagnetic energizing signal 85 to an identification tag 71 (or 69). The electromagnetic signal generators use an antenna to interrogate the RFIDT's for desired information associated with a corresponding pipe or drilling component.

The electromagnetic signal 85 is communicated to an RFIDT that responds to the transmitted electromagnetic signal by returning data or information 86 in an electromagnetic signal form that is received by one of the antennas, and subsequently communicated to a reader 87 which may subsequently process or simply store electromagnetic signal 86. The reader 87 may be handheld, i.e. mobile, or fixed according to particular needs.

The RFIDT's 69 and 71 may be passive (e.g. requiring minimal incident power, for example power density in the approximate range of 15-25 $mW/cm^2$) in order to establish a communications link between an antenna and the RFIDT. "Passive" refers to an identification tag not requiring a battery or any other power source in order to function and to deriving requisite power to transmit an electromagnetic signal from an incoming electromagnetic signal it receives via an antenna. Alternatively, an RFIDT (as may any in any embodiment herein) may include a battery or other suitable power source that would enable an RFIDT to communicate an electromagnetic signal response 86.

Antennas are coupled to reader 87 by any suitable wiring configuration, or alternatively, the two elements may communicate using any other appropriate wireless apparatus and protocol. The reader 87 is coupled to a control system which in one aspect is a computer (or computers) 88 which may include a monitor display and/or printing capabilities for the user. Computer 88 may be optionally coupled to a handheld reader 89 to be used on the rig or remote therefrom. Computer 88 may also be connected to a manual keyboard 89*a* or similar input device permitting user entry into computer 88 of items such as drill pipe identity, drill string serial numbers, physical information (such as size, drilling component lengths, weight, age, etc.) well bore inclination, depth intervals, number of drill pipes in the drill string, and suspended loads or weights, for example.

The computer 88 may be coupled to a series of interfaces 90 that may include one or more sensors capable of indicating any number of elements associated with drill rig derrick 83, such as: a block travel characteristic 90*a*, a rotation counter characteristic 90*b*, a drill string weight 90*c*, a heave compensator 90*d*, and a blowout preventer (BOP) distance sensor 90*e*. A micro-controller may include one or more of these sensors or any other additional information as described in U.S. application Ser. No. 09/906,957. The control system may be or may include a microprocessor based system and/or one or more programmable logic controllers.

A drill pipe 66 with an RFIDT 69 and an RFIDT 71 provides a redundancy feature for identification of the drill pipe 66 so that, in the event one of the RFIDT's fails, the other one which has not failed can still be used to identify the particular drill pipe. This is useful, e.g. when the RFIDT 71, which has relatively more exposure to down hole conditions, fails. Then the RFIDT 69 can still be used to identify the particular piece of drill pipe. It is within the scope of the present invention for any item according to the present invention to have two (or more RFIDT's like the RFIDT 69 and the RFIDT 71. Optionally, or in addition to the RFIDT 69, an RFIDT 69*a* (or RFIDT's 69*a*) may be affixed exteriorly of the pipe 66 with wrap material 69*b* (as described below, e.g. as in FIGS. 25-32).

Figure 5D:
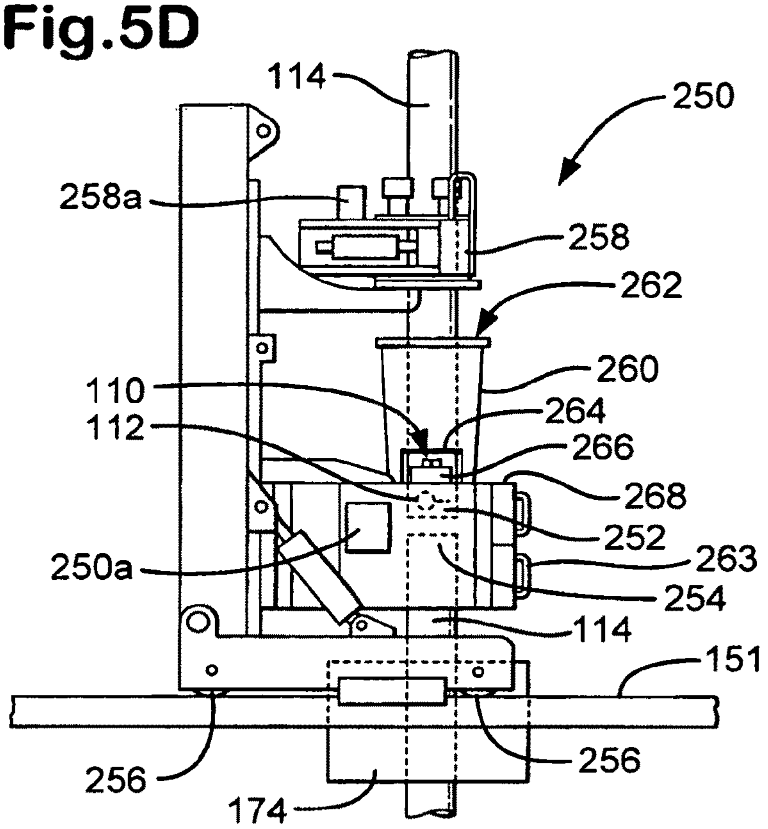
FIG. 5D is a schematic view of a system according to the present invention.

FIGS. 5A-5D present improvements according to the present invention of prior art systems and apparatuses in U.S. Pat. No. 6,480,811 B2 issued Nov. 12, 2002 (incorporated fully herein for all purposes). FIG. 5B shows schematically and partially a drill pipe 91 with an RFIDT 92 (like the identifier assemblies 12, U.S. Pat. No. 6,604,063 B2 or like any RFIDT disclosed herein and with an RFIDT 99, (as any RFIDT disclosed herein in a drill pipe's pin end). It is within the scope of the present invention to provide any oilfield equipment disclosed in U.S. Pat. No. 6,604,063 B2 with two (or more) RFIDT's (e.g., one in an end and one in a side, e.g. like those shown in FIG. 5B).

FIGS. 5A, 5C and 5D show an oilfield equipment identifying apparatus 100 according to the present invention for use with pipe or equipment as in FIG. 5B with two (or more) RFIDT's on respective pieces 114 of oilfield equipment. The RFIDT's may be any disclosed or referred to herein and those not mounted in a recess according to the present invention may be as disclosed in U.S. Pat. No. 6,480,811 B2 indicated by the reference numerals 112*a* and 112*b* on pieces of equipment 114*a* and 114*b* with RFIDT's in recesses according to the present invention shown schematically and indicated by reference numerals 109*a*, 109*b*; and/or one or more RFIDT's may be affixed exteriorly (see e.g., FIGS. 25, 26) to either piece 114 of oilfield equipment. Each of the identifier assemblies 112 and RFIDT's like 109*a*, 109*b* are capable of transmitting a unique identification code for each piece of pipe or oilfield equipment.

The oilfield equipment identifying apparatus 100 with a reader 118 is capable of reading each of the identifier assemblies and RFIDT's. The reader 118 includes a hand-held wand 120, which communicates with a portable computer 122 via a signal path 124. In one embodiment, each identifier assembly 112 includes a passive circuit as described in detail in U.S. Pat. No. 5,142,128 (fully incorporated herein for all purposes) and the reader 118 can be constructed and operated in a manner as set forth in said patent or may be any other reader or reader system disclosed or referred to herein.

In use, the wand 120 of the reader 118 is positioned near a particular one of the identifier assemblies 112 or RFIDT's. A unique identification code is transmitted from the identifier assembly or RFIDT to the wand 120 via a signal path 126 which can be an airwave communication system. Upon receipt of the unique identification code, the wand 120 transmits the unique identification code to the portable computer 122 via the signal path 124. The portable computer 122 receives the unique identification code transmitted by the wand 120 and then decodes the unique identification code, identifying a particular one of the identifier assemblies 112 or RFIDT's and then transmitting (optionally in real time or in batch mode) the code to a central computer (or computers) 132 via a signal path 134. The signal path 134 can be a cable or airwave transmission system.

FIG. 5C shows an embodiment of an oilfield equipment identifying apparatus 100*a* according to the present invention which includes a plurality of the identifier assemblies 112 and/or RFIDT's 109 which are mounted on respective pieces 114 of pipe or oilfield equipment as described above. The oilfield equipment identifying apparatus includes a reader 152, which communicates with the central computer 132. The central computer 132 contains an oilfield equipment database (which in certain aspects, can function as the oilfield equipment database set forth in U.S. Pat. No. 5,142,128). In one aspect the oilfield equipment database in the central computer 132 may function as described in U.S. Pat. No. 5,142,128. In one aspect the oilfield equipment identifying apparatus 100*a* is utilized in reading the identifier assemblies 112 (and/or RFIDT's 109) on various pieces 114 of pipe or oilfield equipment located on a rig floor 151 of an oil drilling rig.

The reader 152 includes a hand-held wand 156 (but a fixed reader apparatus may be used). The hand-held wand 156 is constructed in a similar manner as the hand-held wand 120 described above. The wand 156 may be manually operable and individually mobile. The hand-held wand 156 is attached to a storage box 158 via a signal path 160, which may be a cable having a desired length. Storage box 158 is positioned on the rig floor 151 and serves as a receptacle to receive the hand-held wand 156 and the signal path 160 when the hand-held wand 156 is not in use.

An electronic conversion package 162 communicates with a connector on the storage box 158 via signal path 164, which may be an airway or a cable communication system so that the electronic conversion package 162 receives the signals indicative of the identification code stored in the identifier assemblies 112 and/or RFIDT's, which are read by the hand-held wand 156. In response to receiving such signal, the electronic conversion package 162 converts the signal into a format which can be communicated an appreciable distance therefrom. The converted signal is then output by the electronic conversion package 162 to a buss 166 via a signal path 168. The buss 166, which is connected to a drilling rig local area network and/or a programmable logic controller (not shown) in a well-known manner, receives the converted signal output by the electronic conversion package 162.

The central computer 132 includes an interface unit 170. The interface 170 communicates with the central computer 132 via a signal path 172 or other serial device, or a parallel port. The interface unit 170 may also communicates with the buss 166 via a signal path 173. The interface unit 170 receives the signal, which is indicative of the unique identification codes and/or information read by the hand-held wand 156, from the buss 166, and a signal from a drilling monitoring device 174 via a signal path 176. The drilling monitoring device 174 communicates with at least a portion of a drilling device 178 (FIG. 5D) via a signal path 179. The drilling device 178 can be supported by the rig floor 151, or by the drilling rig. The drilling device 178 can be any drilling device which is utilized to turn pieces 114 of oilfield equipment, such as drill pipe, casing (in casing drilling operations) or a drill bit to drill a well bore. For example, but not by way of limitation, the drilling device 178 can be a rotary table supported by the rig floor 151, or a top mounted drive ("top drive") supported by the drilling rig, or a downhole mud motor suspended by the drill string and supported by the drilling rig. Optionally, the drilling device 178 has at least one RFIDT 178*a* therein or thereon and an RFIDT reader 178*b* therein or thereon. The RFIDT reader 178*a* is interconnected with the other systems as is the reader 152, e.g. via the signal path 173 as indicated by the dotted line 173*a*.

The drilling monitoring device 174 monitors the drilling device 178 so as to determine when the piece 114 or pieces 114 of oilfield equipment in the drill string are in a rotating condition or a non-rotating condition. The drilling monitoring device 174 outputs a signal to the interface unit 170 via the signal path 176, the signal being indicative of whether the piece(s) 114 of oilfield equipment are in the rotating or the non-rotating condition. The central computer 132 may be loaded with a pipe and identification program in its oilfield equipment database which receives and automatically utilizes the signal received by the interface unit 170 from the signal path 176 to monitor, on an individualized basis, the rotating and non-rotating hours of each piece 114 of oilfield equipment in the drill string.

For example, when the drilling device 178 is a downhole mud motor (which selectively rotates the drill string's drill bit while the drill string's pipe remains stationary), the central computer 132 logs the non-rotating usage of each piece 114 of the drill string's pipe. In the case where the drilling device 178 is the downhole mud motor, the central computer 132 has stored therein a reference indicating that the drilling device 178 is the downhole mud motor so that the central computer 132 accurately logs the non-rotating usage of each piece 114 of oilfield equipment included in the drill string that suspends the drilling device 178.

FIG. 5D shows a system 250 according to the present invention for rotating pieces of drill pipe 114 which have at least one identifier assembly 112 and/or one RFIDT in a pin end (or box end, or both) recess according to the present invention to connect a pin connection 252 of the piece 114 to a box connection 254 of an adjacently disposed piece 114 in a well known manner. Each piece 114 may have an RFIDT in its pin end and/or box end. The system 250 includes a reader system 250*a* (shown schematically) for reading the RFIDT in the pin end recess prior to makeup of a joint. The apparatus 250 can be, for example, but not by way of limitation, an Iron Roughneck, an ST-80 Iron Roughneck, or an AR 5000 Automated Iron Roughneck from Varco International and/or apparatus as disclosed in U.S. Pat. Nos. 4,603,464; 4,348,920; and 4,765,401. The reader system 250*a* may be located at any appropriate location on or in the apparatus 250.

The apparatus 250 is supported on wheels 256 which engage tracks (not shown) positioned on the rig floor 151 for moving the apparatus 250 towards and away from the well bore. Formed on an upper end of the apparatus 250 is a pipe spinner assembly 258 (or tong or rotating device) for selectively engaging and turning the piece 114 to connect the pin connection 252 to the box connection 254. Optionally the assembly 258 has an RFIDT reader 258*a*. An optional funnel-shaped mudguard 260 can be disposed below the pipe spinner assembly 258. The mudguard 260 defines a mudguard bore 262, which is sized and adapted so as to receive the piece 114 of oilfield equipment therethrough. The apparatus 250 also may include a tong or a torque assembly or torque wrench 263 disposed below the pipe spinner assembly 258. An opening 264 is formed through the mudguard 260 and communicates with a mudguard bore 262. Optionally an oilfield equipment identifying apparatus 110 includes a fixed mount reader 266 for automating the reading of the RFIDT's and of the identifier assemblies 112, rather than the hand-held wand 156. In one embodiment a flange 268 is located substantially adjacent to the opening 264 so as to position the fixed mount reader 266 through the opening 264 whereby the fixed mount reader 266 is located adjacent to the piece 114 of oilfield equipment when the piece 114 of oilfield equipment is moved and is being spun by the pipe spinner assembly 258. The reader(s) of the apparatus 250 are interconnected with an in communication with suitable control apparatus, e.g. as any disclosed herein. In certain aspects, the fixed mount reader 266 can be located on the apparatus 250 below the pipe spinner assembly 258 and above the torque assembly or torque wrench 263, or within or on the spinner assembly 258; or within or on the torque wrench 263.

Figure 6:
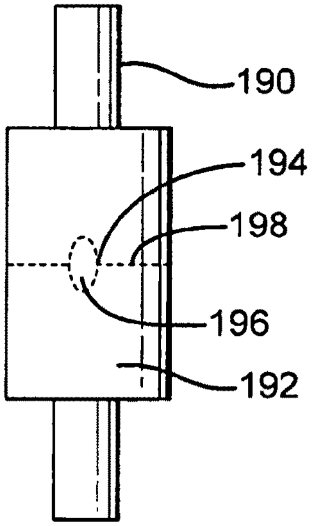
FIG. 6 is a side view of a tubular according to the present invention.

The prior art discloses a variety of tubular members including, but not limited to casing, pipe, risers, and tubing, around which are emplaced a variety of encompassing items, e.g., but not limited to centralizers, stabilizers, and buoyant members. According to the present invention these items are provided with one or more RFIDT's with antenna(s) within and encircling the item and with a body or relatively massive part thereof protecting the RFIDT. FIG. 6 shows schematically a tubular member 190 with an encompassing item 192 having therein an RFIDT 194 (like any disclosed or referred to herein as may be the case for all RFIDT's mentioned herein) with an IC (integrated circuit) or microchip 196 to which is attached an antenna 198 which encircles the tubular member 190 (which is generally cylindrical and hollow with a flow channel therethrough from one end to the other or which is solid) and with which the IC 196 can be energized for reading and/or for writing thereto. In one aspect the RFIDT 194 is located midway between exterior and interior surfaces of the encompassing item 192; while in other aspects it is nearer to one or these surfaces than the other. The encompassing item may be made of any material mentioned or referred to herein. The RFIDT 194 is shown midway between a top and a bottom (as viewed in FIG. 6) of the encompassing item 192; but it is within the scope of this invention to locate the RFIDT at any desired level of the encompassing item 192. Although the encompassing item 192 is shown with generally uniform dimensions, it is within the scope of the present invention for the encompassing item to have one or more portions thicker than others; and, in one particular aspect, the RFIDT (or the IC 196 or the antenna 198) is located in the thicker portion(s). In certain particular aspects the encompassing item is a centralizer, stabilizer, or protector. Optionally, or in addition to the RFIDT 194, one or more RFIDT's 194*a* in wrap material 194*b* may be affixed exteriorly (see e.g., FIGS. 25, 26) of the member 190 and/or of the encompassing item 192.

Figure 7A:
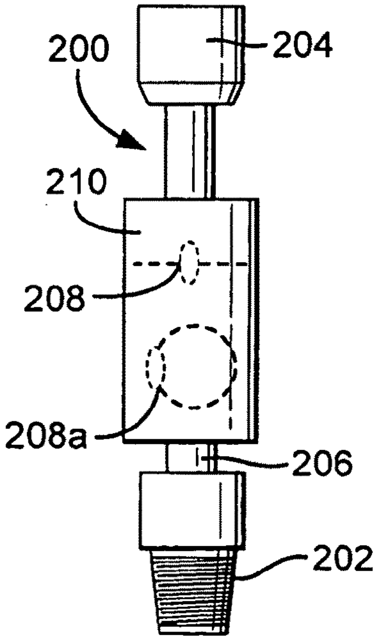
FIG. 7A is a side view of a tubular according to the present invention.
Figure 7B:
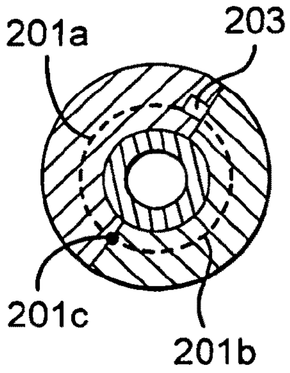
FIG. 7B is a cross-section view of the tubular of FIG. 7B.

FIG. 7A shows a buoyant drill pipe 200 which is similar to such pipes as disclosed in U.S. Pat. No. 6,443,244 (incorporated fully herein for all purposes), but which, as shown in FIG. 7A, has improvements according to the present invention. The drill pipe 200 has a pin end 202 and a box end 204 at ends of a hollow tubular body 206 having a flow channel (not shown) therethrough. A buoyant element 210 encompasses the tubular body 206. Within the buoyant element 210 is at least one RFIDT 208 which may be like and be located as the RFIDT 198, FIG. 6. As shown in FIG. 7B, in one aspect the buoyant member 210 has two halves which are emplaced around the tubular body 206 and then secured together. In such an embodiment either one or both ends of an antenna 201 are releasably connectible to an IC 203 of an RFIDT 208 or two parts of the antenna 201 itself are releasably connectible. As shown in FIG. 7B, antenna parts 201*a* and 201*b* are releasably connected together, e.g. with connector apparatus 201*c*, and an end of the antenna part 201*b* is releasably connected to the IC 203. Alternatively an optional location provides an RFIDT that is entirely within one half of the buoyant member 210, e.g. like the optional RFIDT 208*a* shown in FIG. 7A. The pin end 202 may have any RFIDT therein and/or cap ring according to the present invention as disclosed herein. The two halves of the buoyant member may be held together by adhesive, any known suitable locking mechanism, or any known suitable latch mechanism (as may be any two part ring or item herein according to the present invention).

Figure 8A:
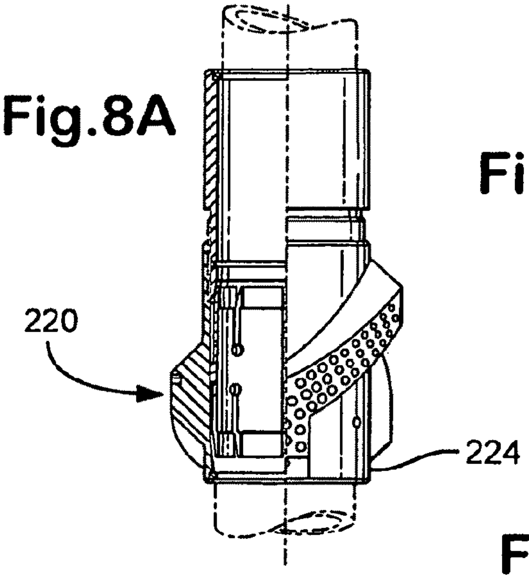
FIG. 8A is a side view of a stabilizer according to the present invention.
Figure 8B:
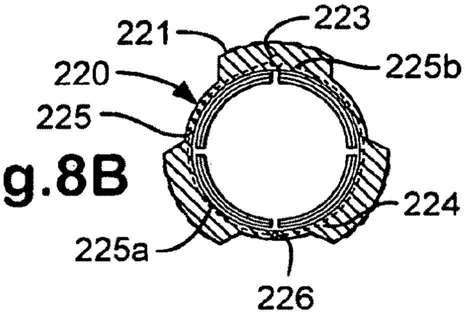
FIG. 8B is a cross-section view of the stabilizer of FIG. 8A.

It is within the scope of the present invention to provide a stabilizer as is used in oil and gas wellbore operations with one or more RFIDT's. FIGS. 8A and 8B show a stabilizer 220 according to the present invention which is like the stabilizers disclosed in U.S. Pat. No. 4,384,626 (incorporated fully herein for all purposes) but which has improvements according to the present invention. An RFIDT 222 (like any disclosed or referred to herein) is embedded within a stabilizer body 224 with an IC 223 in a relatively thicker portion 221 of the body 224 and an antenna 225 that is within and encircles part of the body 224. Parts 225*a* and 225*b* of the antenna 225 are connected together with a connector 226. The stabilizer 220 may, optionally, have a recess at either end with an RFIDT therein as described herein according to the present invention. Optionally, the stabilizer 220 may have one or more RFIDT's located as are the RFIDT's in FIGS. 6 and 7A.

Figure 8C:
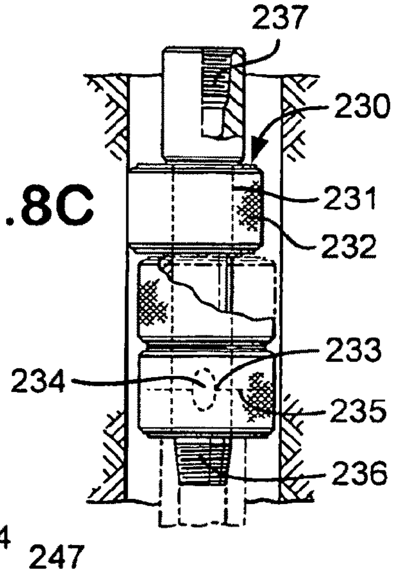
FIG. 8C is a side view of a centralizer according to the present invention.
Figure 8D:
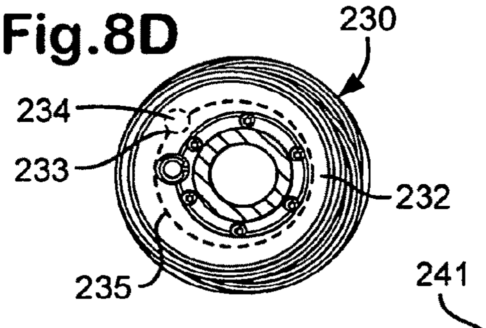
FIG. 8D is a cross-section view of the centralizer of FIG. 8C.

Various stabilizers have a tubular body that is interposed between other tubular members, a body which is not clamped on around an existing tubular members. According to the present invention such stabilizers may have one or more RFIDT's as disclosed herein; and, in certain aspects, have an RFIDT located as are the RFIDT's in FIG. 6, 7A or 8A and/or an RFIDT in an end recess (e.g. pin end and/or box end) as described herein according to the present invention. FIGS. 8C and 8D show a stabilizer 230 according to the present invention which has a tubular body 231 and a plurality of rollers 232 rotatably mounted to the body 231 (as in the stabilizer of U.S. Pat. No. 4,071,285, incorporated fully herein, and of which the stabilizer 230 is an improvement according to the present invention). An RFIDT 233 with an IC 234 and an antenna 235 is disposed within one or the rollers 232. The stabilizer 230 has a pin end 236 and a box end 237 which permit it to be threadedly connected to tubulars at either of its ends. A recess may, according to the present invention, be provided in the pin end 236 and/or the box end 237 and an RFIDT and/or cap ring used therewith as described herein according to the present invention. The antenna 235 is within and encircles part of the roller 232.

Figure 8F:
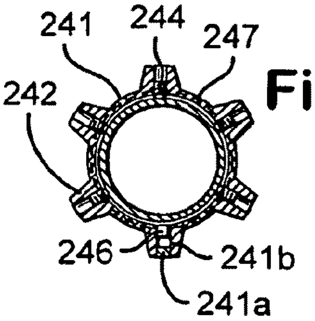
FIG. 8F is a cross-section view of the centralizer of FIG. 8E.
Figure 8E:
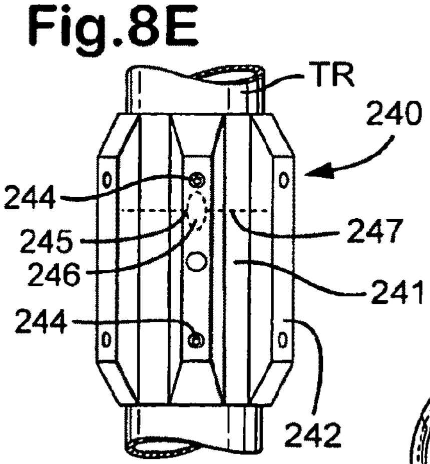
FIG. 8E is a side view of a centralizer according to the present invention.

It is within the scope of the present invention to provide a centralizer with one or more RFIDT's as disclosed herein. A centralizer 240, FIG. 8E, is like the centralizers disclosed in U.S. Pat. No. 5,095,981 (incorporated fully herein), but with improvements according to the present invention. FIGS. 8E and 8F show the centralizer 240 on a tubular TR with a hollow body 241 with a plurality of spaced-apart ribs 242 projecting outwardly from the body 241. A plurality of screws 244 releasably secure the body 241 around the tubular TR. An RFIDT 245 with an IC 246 and an antenna 247 is located within the body 241. Optionally a plug 241*a* (or filler material) seals off a recess 241*b* in which the IC 246 is located. Optionally, or in addition to the RFIDT 245 one or more RFIDT's 245*a* are affixed exteriorly of the centralizer 240 under multiple layers of wrap material 245*b* (see, e.g., FIGS. 25, 26)

Figure 8G:
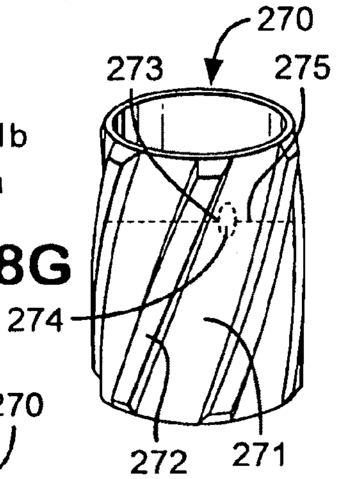
FIG. 8G is a side view of a centralizer according to the present invention.
Figure 8H:
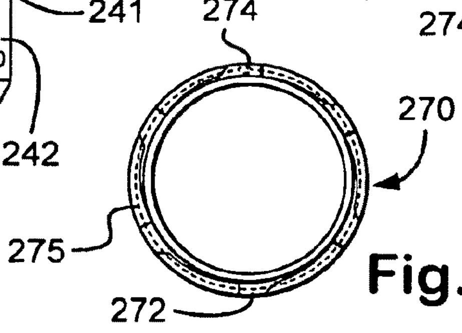
FIG. 8H is a cross-section view of the centralizer of FIG. 8E.

FIGS. 8G and 8H show a centralizer 270 according to the present invention which is like centralizers (or stabilizers) disclosed in U.S. Pat. No. 4,984,633 (incorporated fully herein for all purposes), but which has improvements according to the present invention. The centralizer 270 has a hollow tubular body 271 with a plurality of spaced-apart ribs 272 projecting outwardly therefrom. An RFIDT 273 with an IC 274 and an antenna 275 (dotted circular line) is disposed within the body 271 with the IC 274 within one of the ribs 272 and the antenna 275 within and encircling part of the body 271. Optionally, or in addition to the RFIDT 273, one or more RFIDT's 273*a* is affixed exteriorly to the centralizer 270 under layers of wrap material 273*b* (see, e.g. FIGS. 25, 26).

Figure 11:
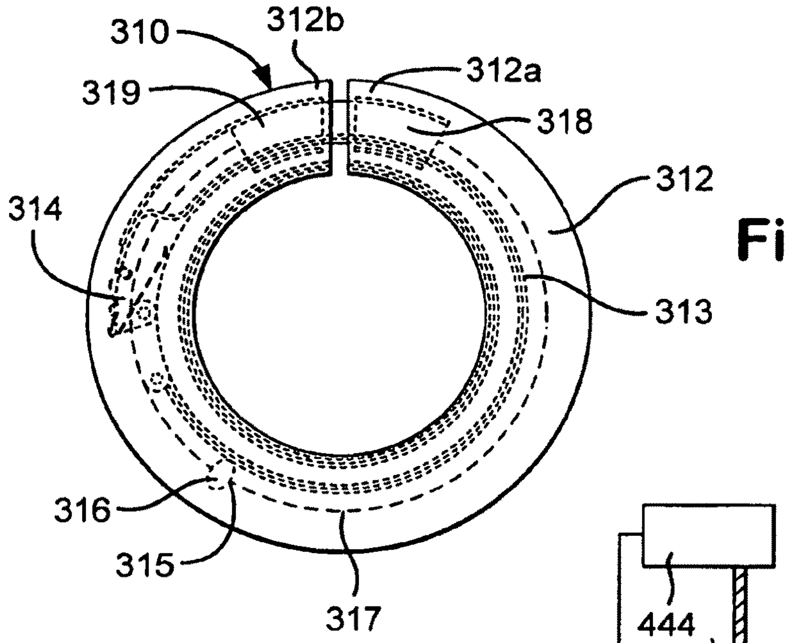
FIG. 11 is a cross-section view of a thread protector according to the present invention.

Often thread protectors are used at the threaded ends of tubular members to prevent damage to the threads. It is within the scope of the present invention to provide a thread protector, either a threaded thread protector or a non-threaded thread protector, with one or more RFIDT's as disclosed herein. FIGS. 9A, 10A, and 11 show examples of such thread protectors.

FIGS. 9A and 9B and 10A and 10B show thread protectors like those disclosed in U.S. Pat. No. 6,367,508 (incorporated fully herein), but with improvements according to the present invention.

A thread protector 280, FIG. 9A, according to the present invention protecting threads of a pin end of a tubular TB has an RFIDT 283 within a body 282. The RFIDT 283 has an IC 284 and an antenna 285. A thread protector 281, FIG. 9B, according to the present invention protecting threads of a box end of a tubular TL has a body 286 and an RFIDT 287 with an IC 288 and an antenna 298 within the body 286. Both the bodies 282 and 286 are generally cylindrical and both antennas 285 and 298 encircle a part of their respective bodies. Optionally the thread protector 281 has an RFIDT 287*a* within a recess 286*a* of the body 286. The RFIDT 287*a* has an IC 288*a* and an antenna 289*a*. Optionally, any thread protector herein may be provided with a recess according to the present invention as described herein with an RFIDT and/or torus and/or cap ring according to the present invention (as may any item according to the present invention as in FIGS. 6-8G). Optionally, or in addition to the RFIDT 283, one or more RFIDT's 283*a* is affixed exteriorly (see, e.g., FIGS. 25, 26) to the thread protector 280 under layers of wrap material 283*b*.

FIGS. 10A and 10B show a thread protector 300 according to the present invention which is like thread protectors disclosed in U.S. Pat. No. 6,367,508 B1 (incorporated fully herein), but with improvements according to the present invention. The thread protector 300 for protecting a box end of a tubular TU has a body 302 with upper opposed spaced-apart sidewalls 303*a*, 303*b*. An RFIDT 304 with an IC 305 and an antenna 306 is disposed between portions of the two sidewalls 303*a*, 303*b*. Optionally, an amount of filler material 307 (or a cap ring as described above) is placed over the RFIDT 304. Optionally, or as an alternative, an RFIDT 304*a* is provided within the body 302 with an IC 305*a* and an antenna 306*a*. Optionally, or as an alternative, an RFIDT 304*b* is provided within the body 302 with an IC 305*b* and an antenna 306*b*.

A variety or prior art thread protectors have a strap or tightening apparatus which permits them to be selectively secured over threads of a tubular. FIG. 11 shows a thread protector 310 according to the present invention which is like the thread protectors disclosed in U.S. Pat. No. 5,148,835 (incorporated fully herein), but with improvements according to the present invention. The thread protector 310 has a body 312 with two ends 312*a* and 312*b*. A strap apparatus 313 with a selectively lockable closure mechanism 314 permits the thread protector 310 to be installed on threads of a tubular member. An RFIDT 315 with an IC 316 and an antenna 317 is disposed within the body 312. The antenna 317 may be connected or secured to, or part of, the strap apparatus 313 and activation of the lockable closure mechanism 314 may complete a circuit through the antenna. In one aspect the antenna has ends connected to metallic parts 318, 319 and the antenna is operational when these parts are in contact. The bodies of any thread protector according to the present invention may be made of any material referred to herein, including, but not limited to, any metal or plastic referred to herein or in the patents incorporated by reference herein.

Figure 12B:
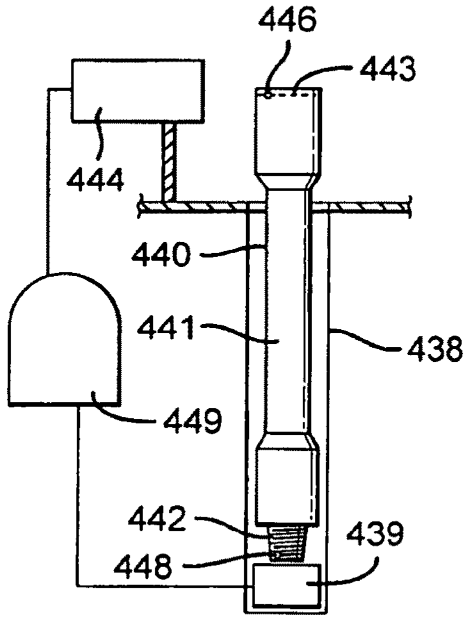
FIG. 12B is an enlarged view of part of the system of FIG. 12A.
Figure 12A:
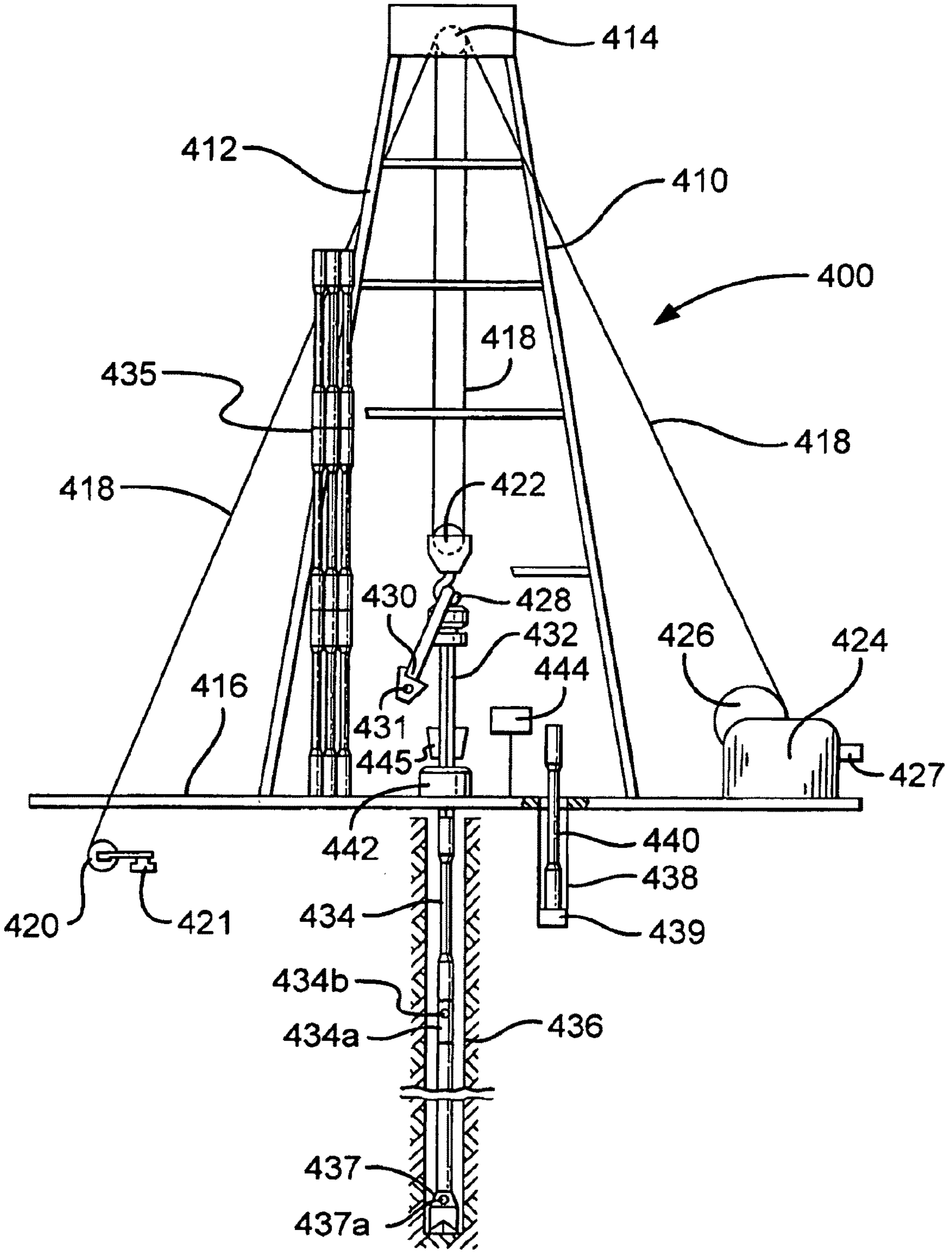
FIG. 12A is a schematic side view of a drilling rig system according to the present invention.

FIG. 12A shows a system 400 according to the present invention which has a rig 410 that includes a vertical derrick or mast 412 having a crown block 414 at its upper end and a horizontal rig floor 416 at its lower end. Drill line 418 is fixed to deadline anchor 420, which is commonly provided with hook load sensor 421, and extends upwardly to crown block 414 having a plurality of sheaves (not shown). From block 414, drill line 418 extends downwardly to traveling block 422 that similarly includes a plurality of sheaves (not shown). Drill line 418 extends back and forth between the sheaves of crown block 414 and the sheaves of traveling block 422, then extends downwardly from crown block 414 to drawworks 424 having rotating drum 426 upon which drill line 418 is wrapped in layers. The rotation of drum 426 causes drill line 418 to be taken in or out, which raises or lowers traveling block 422 as required. Drawworks 424 may be provided with a sensor 427 which monitors the rotation of drum 426. Alternatively, sensor 427 may be located in crown block 414 to monitor the rotation of one or more of the sheaves therein. Hook 428 and any elevator 430 is attached to traveling block 422. Hook 428 is used to attach kelly 432 to traveling block 422 during drilling operations, and elevators 430 are used to attach drill string 434 to traveling block 422 during tripping operations. Shown schematically the elevator 430 has an RFIDT reader 431 (which may be any reader disclosed or referred to herein and which is interconnected with and in communication with suitable control apparatus, e.g. as any disclosed herein, as is the case for reader 439 and a reader 444. Drill string 434 is made up of a plurality of individual drill pipe pieces, a grouping of which are typically stored within mast 412 as joints 435 (singles, doubles, or triples) in a pipe rack. Drill string 434 extends down into wellbore 436 and terminates at its lower end with bottom hole assembly (BHA) 437 that typically includes a drill bit, several heavy drilling collars, and instrumentation devices commonly referred to as measurement-while-drilling (MWD) or logging-while-drilling (LWD) tools. A mouse hole 438, which may have a spring at the bottom thereof, extends through and below rig floor 416 and serves the purpose of storing next pipe 440 to be attached to the drill string 434. With drill pipe according to the present invention having an RFIDT 448 in a pin end 442, an RFIDT reader apparatus 439 at the bottom of the mouse hole 438 can energize an antenna of the RFIDT 448 and identify the drill pipe 440. Optionally, if the drill pipe 440 has an RFIDT in a box end 443, an RFIDT reader apparatus can energize an antenna in the RFIDT 446 and identify the drill pipe 440. Optionally, the drill bit 437 has at least one RFIDT 437*a* (any disclosed herein) (shown schematically). Optionally, or in addition to the RFIDT 448, the drill pipe 440 has one or more RFIDT's 448*a* affixed exteriorly to the drill pipe 440 (see, e.g., FIGS. 25, 26) under wrap layers 448*b*.

During a drilling operation, power rotating means (not shown) rotates a rotary table (not shown) having rotary bushing 442 releasably attached thereto located on rig floor 416. Kelly 432, which passes through rotary bushing 442 and is free to move vertically therein, is rotated by the rotary table and rotates drill string 434 and BHA 437 attached thereto. During the drilling operation, after kelly 432 has reached its lowest point commonly referred to as the "kelly down" position, the new drill pipe 440 in the mouse hole 438 is added to the drill string 434 by reeling in drill line 418 onto rotating drum 426 until traveling block 422 raises kelly 432 and the top portion of drill string 434 above rig floor 416. Slips 445, which may be manual or hydraulic, are placed around the top portion of drill string 434 and into the rotary table such that a slight lowering of traveling block 422 causes slips 444 to be firmly wedged between drill string 434 and the rotary table. At this time, drill string 434 is "in-slips" since its weight is supported thereby as opposed to when the weight is supported by traveling block 422, or "out-of-slips". Once drill string 434 is in-slips, kelly 432 is disconnected from string 434 and moved over to and secured to new pipe 440 in mouse hole 438. New pipe 440 is then hoisted out of mouse hole 438 by raising traveling block 422, and attached to drill string 434. Traveling block 422 is then slightly raised which allows slips 445 to be removed from the rotary table. Traveling block 422 is then lowered and drilling resumed. "Tripping-out" is the process where some or all of drill string 434 is removed from wellbore 436. In a trip-out, kelly 432 is disconnected from drill string 434, set aside, and detached from hook 428. Elevators 430 are then lowered and used to grasp the uppermost pipe of drill string 434 extending above rig floor 416. Drawworks 424 reel in drill line 418 which hoists drill string 434 until the section of drill string 434 (usually a "triple") to be removed is suspended above rig floor 416. String 434 is then placed in-slips, and the section removed and stored in the pipe rack. "Tripping-in" is the process where some or all of drill string 434 is replaced in wellbore 436 and is basically the opposite of tripping out. In some drilling rigs, rotating the drill string is accomplished by a device commonly referred to as a "top drive" (not shown). This device is fixed to hook 428 and replaces kelly 432, rotary bushing 442, and the rotary table. Pipe added to drill string 434 is connected to the bottom of the top drive. As with rotary table drives, additional pipe may either come from mouse hole 438 in singles, or from the pipe racks as singles, doubles, or triples. Optionally, drilling is accomplished with a downhole motor system 434*a* which has at least one RFIDT 434*b* (shown schematically in FIG. 12A)

As shown in FIG. 12B, the reader apparatus 439 is in communication with a control apparatus 449 (e.g. any computerized or PLC system referred to or disclosed herein) which selectively controls the reader apparatus 439, receives signals from it and, in certain aspects, processes those signals and transmits them to other computing and/or control apparatus. Similarly when the optional reader apparatus 444 is used, it also is in communication with the control apparatus 449 and is controlled thereby. With a reader at the pin end and a reader at the box end, the length of the piece of drill pipe be determined and/or its passage beyond a certain point. In one aspect the reader apparatus 439 is deleted and the reader apparatus 444 reads the RFIDT (or RFIDT's) in and/or on the drill pipe 440 as the drill pipe 440 passes by the reader apparatus 444 as the drill pipe 440 is either lowered into the mouse hole 438 or raised out of it. The reader apparatus 444 may be located on or underneath the rig floor 416. It is within the scope of the present invention to use a reader apparatus 439 and/or a reader apparatus 444 in association with any system's mouse hole or rat hole (e.g., but not limited to, systems as disclosed in U.S. Pat. Nos. 5,107,705; 4,610,315; and in the prior art cited therein), and with so-called "mouse hole sleeves" and mouse hole scabbards" as disclosed in, e.g. U.S. Pat. Nos. 5,351,767; 4,834,604; and in the prior art references cited in these two patents. With respect to the drilling operation depicted in FIG. 12A (and, any drilling operation referred to herein according to the present invention) the drilling may be "casing drilling" and the drill pipe can be casing.

Figure 13A:
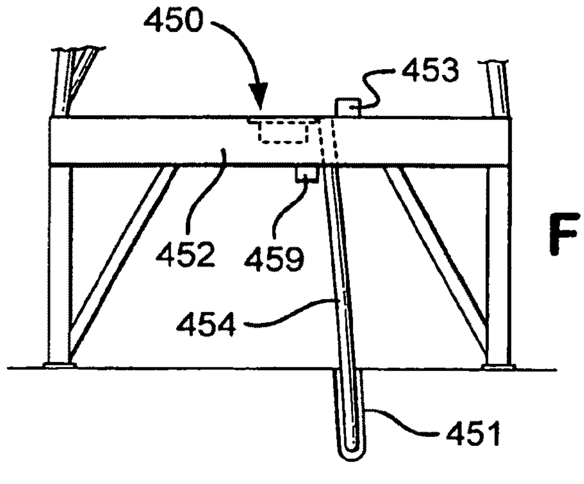
FIG. 13A is a side view of a system according to the present invention.
Figure 13B:
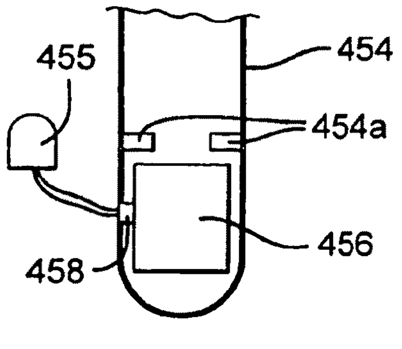
FIG. 13B is a side view of part of the system of FIG. 13A.

FIGS. 13A and 13B show a system 450 according to the present invention which has a mouse hole 451 associated with a rig 452 (shown partially). The mouse hole 451 includes a mouse hole scabbard 454 (shown schematically, e.g. like the one in U.S. Pat. No. 4,834,604, but with improvements according to the present invention). The mouse hole scabbard 454 includes an RFIDT reader apparatus 456 (like any such apparatus described or referred to herein) with connection apparatus 458 via which a line or cable 459 connects the reader apparatus 456 to control apparatus 455 (shown schematically, like any described or referred to herein). It is within the scope of the present invention to provide, optionally, reader apparatuses (E.G. other than adjacent the pipe or adjacent a mouse hole, or tubular preparation hole) 453 and/or 459 on the rig 452. Optionally, one or more antenna energizers are provided on a rig and reader apparatuses are located elsewhere. According to the present invention a scabbard can be made of nonmagnetic metal, plastic, polytetrafluoroethylene, fiberglass or composite to facilitate energizing of an RFIDT's antenna of an RFIDT located within the scabbard. Optionally a scabbard may be tapered to prevent a pipe end from contacting or damaging the reader apparatus 456 and/or, as shown in FIG. 13B, stops 454*a* may be provided to achieve this.

Figure 14A:
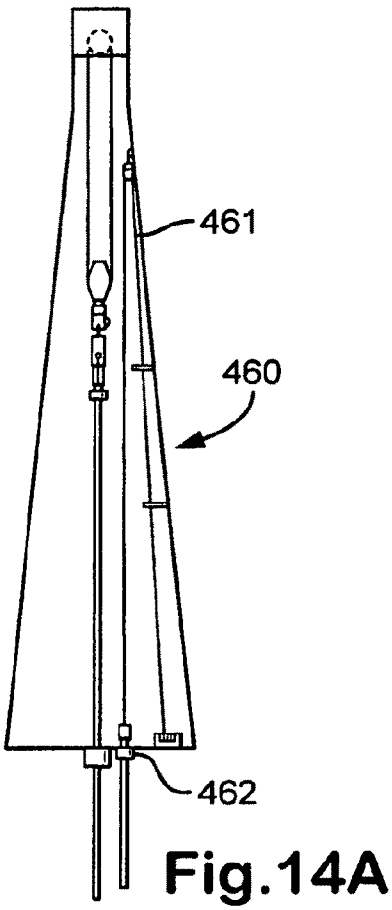
FIG. 14A is a schematic view of a system according to the present invention with a powered mouse hole.
Figure 14C:
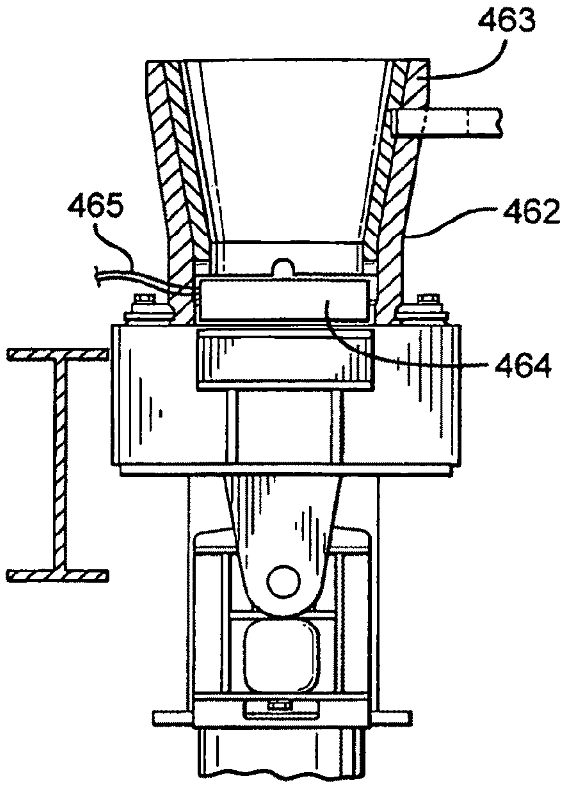
FIG. 14C is a cross-section view of part of the powered mouse hole of FIGS. 14 A and B.
Figure 14B:
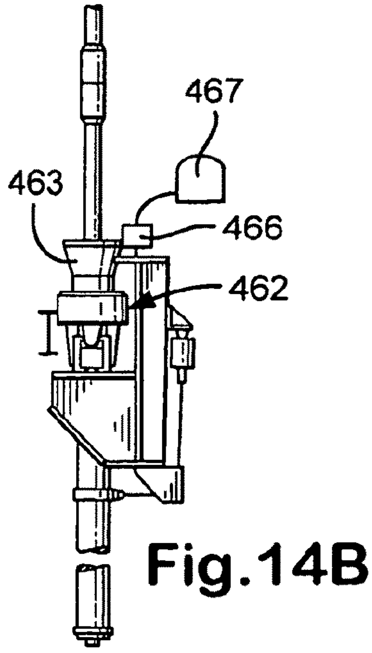
FIG. 14B is a side view of the powered mouse hole of FIG. 14A.

Various prior art systems employ apparatuses known as "powered mouse holes" or "rotating mouse hole tools". It is within the scope of the present invention to improve such systems with an RFIDT reader apparatus for identifying a tubular within the powered mouse hole. FIGS. 14A-14C show a system 460 according to the present invention which includes a rig system 461 and a powered mouse hole 462. The powered mouse hole 462 is like the powered mouse hole disclosed in U.S. Pat. No. 5,351,767 (incorporated fully herein for all purposes) with the addition of an RFIDT reader apparatus. The powered mouse hole 462 has a receptacle 463 for receiving an end of a tubular member. An RFIDT reader apparatus 464 is located at the bottom of the receptacle 463 (which may be like any RFIDT reader apparatus disclosed or referred to herein). A line or cable 465 connects the RFIDT reader apparatus 464 to control apparatus (not shown; like any disclosed or referred to herein). Optionally as shown in FIG. 14B, an RFIDT reader apparatus 466 in communication with control apparatus 467 is located adjacent the top of the receptacle 463.

Figure 14D:
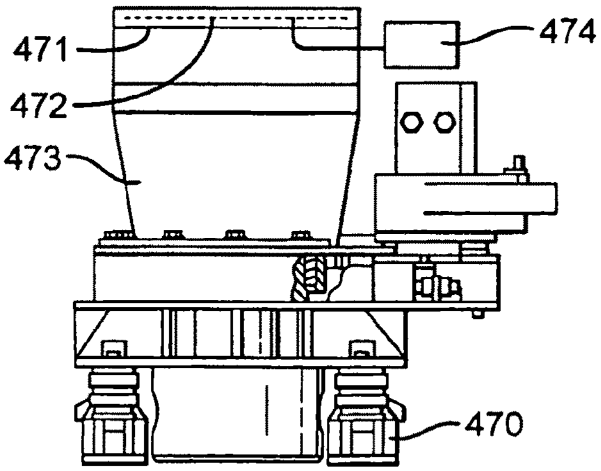
FIG. 14D is a side view of a powered mouse hole tool according to the present invention.

FIG. 14D shows a rotating mouse hole tool 470 which is like the PHANTOM MOUSE™ tool commercially-available from Varco International (and which is co-owned with the present invention), but the tool 470 has an upper ring 471 on a circular receptacle 473 (like the receptacle 463, FIG. 14C). The upper ring 471 has an energizing antenna 472 for energizing an RFIDT on a tubular or in an end of a tubular placed into the receptacle 473. The antenna 472 encircles the top of the receptacle 473. The antenna 472 is connected to reader apparatus 474 (like any disclosed or referred to herein) which may be mounted on the tool 470 or adjacent thereto.

Figure 15A:
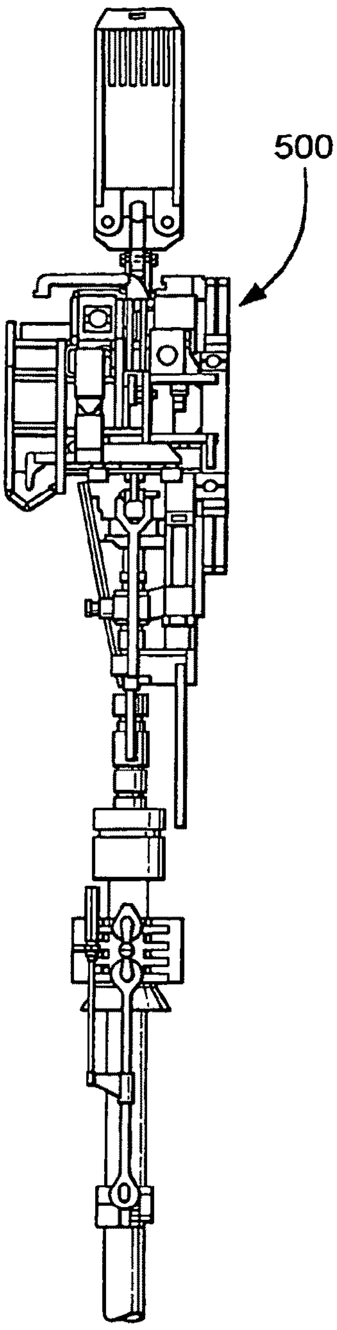
FIG. 15A is a side view of a top drive according to the present invention.
Figure 15B:
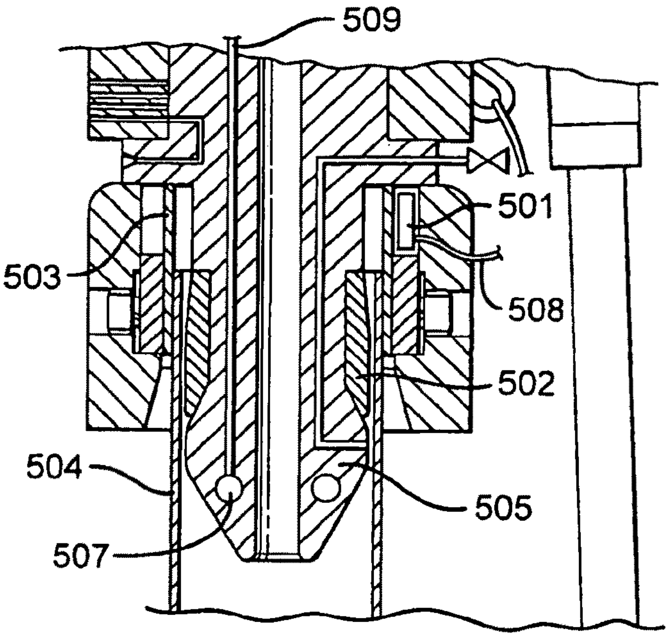
FIG. 15B is an enlarged view of part of the top drive of FIG. 15A.

The prior art discloses a wide variety of top drive units (see, e.g., U.S. Pat. Nos. 4,421,179; 4,529,045; 6,257,349; 6,024,181; 5,921,329; 5,794,723; 5,755,296; 5,501,286; 5,388,651; 5,368,112; and 5,107,940 and the references cited therein). The present invention discloses improved top drives which have one, two, or more RFIDT readers and/or antenna energizers. It is within the scope of the present invention to locate an RFIDT reader and/or antenna energizer at any convenient place on a top drive from which an RFIDT in a tubular can be energized and/or read and/or written to. Such locations are, in certain aspects, at a point past which a tubular or a part thereof with an RFIDT moves. FIGS. 15A and 15B show a top drive system 500 according to the present invention which is like the top drives of U.S. Pat. No. 6,679,333 (incorporated fully herein), but with an RFIDT reader 501 located within a top drive assembly portion 502. The reader 501 is located for reading an RFIDT 503 on or in a tubular 504 which is being held within the top drive assembly portion 502. Alternatively, or in addition to the reader 501, an RFIDT reader 507 is located in a gripper section 505 which can energize and read the RFIDT 503 as the gripper section moves into the tubular 504. In particular aspects, the tubular is a piece of drill pipe or a piece of casing. Appropriate cables or lines 508, 509, respectively connect the readers 501, 507 to control apparatus (not shown, as any described or referred to herein).

Figure 16A:
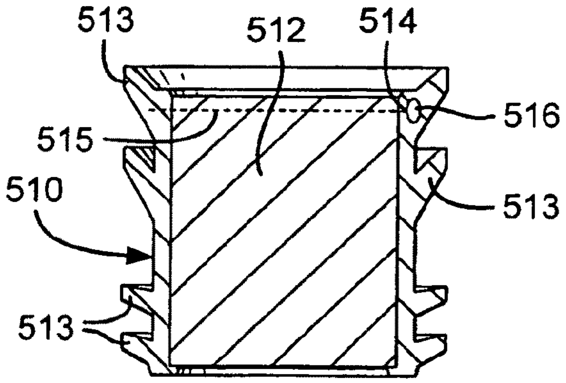
FIG. 16A is a side cross-section view of a plug according to the present invention.

It is within the scope of the present invention to provide a cementing plug (or pipeline pig) with one or more RFIDT's with an antenna that encircles a generally circular part or portion of the plug or pig and with an IC embedded in a body part of the plug or pig and/or with an IC and/or antenna in a recess (as any recess described or referred to herein) and/or with one or more RFIDT's affixed exteriorly of the plug or pig. FIG. 16A shows a cementing plug 510 according to the present invention with a generally cylindrical body 512 and exterior wipers 513 (there may be any desired number of wipers). An RFIDT 514 is encased in the body 512. An antenna 515 encircles part of the body 512. The body 512 (as may be any plug according to the present invention) may be made of any known material used for plugs, as may be the wipers 513. An IC 516 of the RFIDT 514 is like any IC disclosed or referred to herein. Optionally a cap ring (not shown) may be used over the recess 515 as may be filler material within the recess. Optionally, or in addition to the RFIDT 514, one or more RFIDT's 514*a* is affixed exteriorly to the plug 510 under wrap layers 514*b* (see, e.g. FIGS. 25, 26). One or more such RFIDT's may be affixed to the plug 520.

Figure 16B:
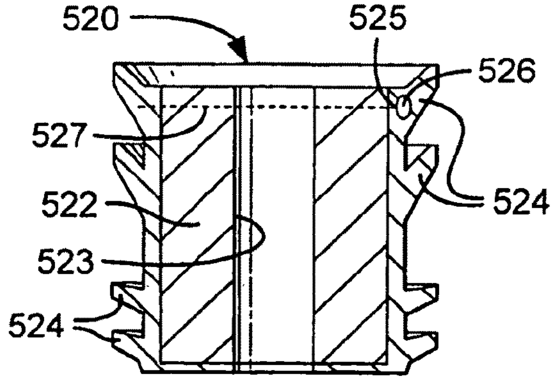
FIG. 16B is a side cross-section view of a plug according to the present invention.

FIG. 16B shows a cementing plug 520 according to the present invention which has a generally cylindrical body 522 with a bore 523 therethrough from top to bottom. A plurality of wipers 524 are on the exterior of the body 522. An RFIDT 525 has an IC 526 encased in the body 522 and an antenna 527 that encircles part of the body 522. Both antennas 515 and 527 are circular as viewed from above and extend around and within the entire circumference of their respective bodies. It is within the scope of the present invention to have the RFIDT 514 and/or the RFIDT 525 within recesses in their respective bodies (as any recess disclosed herein or referred to herein) with or without a cap ring or filler.

Figure 17A:
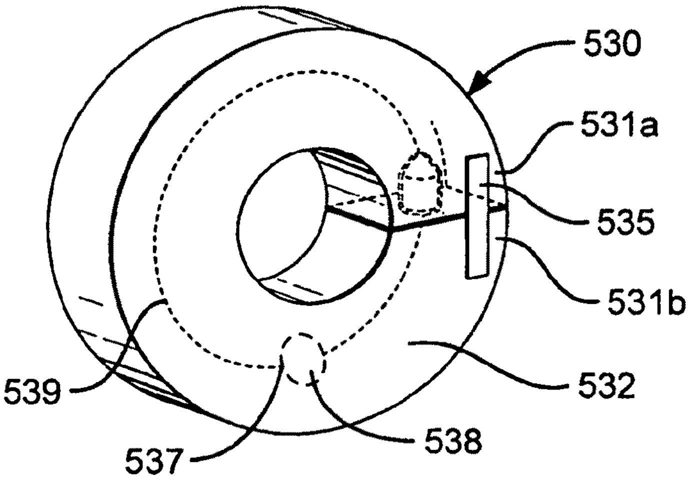
FIG. 17A is a perspective view of a portable RFIDT bearing ring according to the present invention.
Figure 17B:
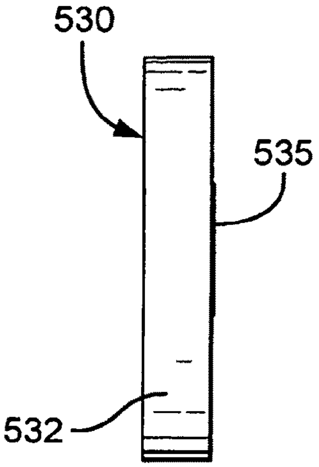
FIG. 17B is a side view of the ring of FIG. 17A.
Figure 17C:
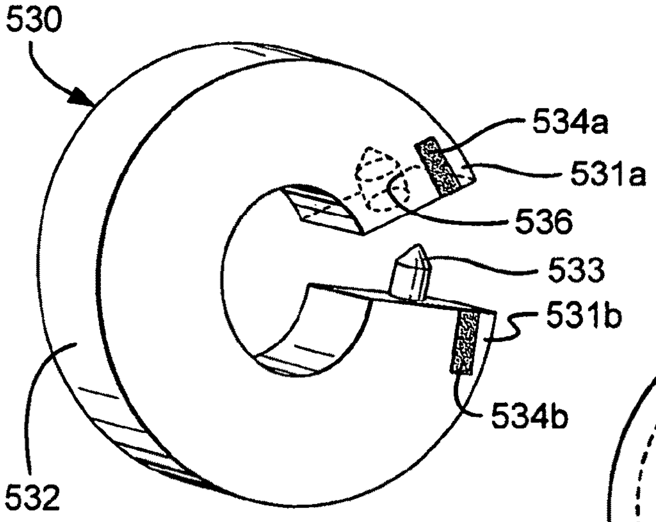
FIG. 17C is a perspective view of the ring of FIG. 17A with the ring opened.
Figure 17D:
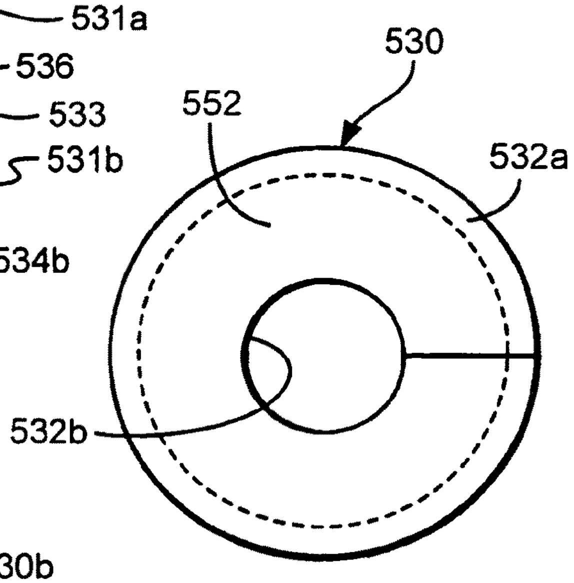
FIG. 17D is a top view of a ring according to the present invention.

FIGS. 17A-17D show a portable ring 530 which has a flexible body 532 made, e.g. from rubber, plastic, fiberglass, and/or composite which has two ends 531*a*, 531*b*. The end 531*a* has a recess 536 sized and configured for receiving and holding with a friction fit a correspondingly sized and configured pin 533 projecting out from the end 531*b*. The two ends 531*a*, 531*b* may be held together with any suitable locking mechanism, latch apparatus, and/or adhesive. As shown, each end 531*a*, 531*b* has a piece of releasably cooperating hook-and-loop fastener material 534*a*, 534*b*, respectively thereon (e.g. VELCRO™ material) and a corresponding piece of such material 535 is releasably connected to the pieces 534*a*, 534*b* (FIG. 17C) to hold the two ends 531*a*, 531*b* together. The body 532 encases an RFIDT 537 which has an IC 538 and an antenna 539. Ends of the antenna 539 meet at the projection 533-recess 536 interface and/or the projection 533 is made of antenna material and the recess 536 is lined with such material which is connected to an antenna end. Optionally, as shown in FIG. 17D the ring 530 may include one or more (one shown) protective layers 532*a*, e.g. made of a durable material, e.g., but not limited to metal, KEVLAR™ material or ARAMID™ material. A hole 532*b* formed when the two ends 531*a*, 531*b* are connected together can be any desired size to accommodate any item or tubular to be encompassed by the ring 530. The ring 530 may have one, two or more RFIDT's therein one or both of which are read-only; or one or both of which are read-write. Such a ring may be releasably emplaceable around a member, e.g., but not limited to, a solid or hollow generally cylindrical member. Any ring or torus herein according to the present invention may have an RFIDT with an antenna that has any desired number of loops (e.g., but not limited to, five, ten, fifteen, twenty, thirty or fifty loops), as may be the case with any antenna of any RFIDT in any embodiment disclosed herein.

Figure 17E:
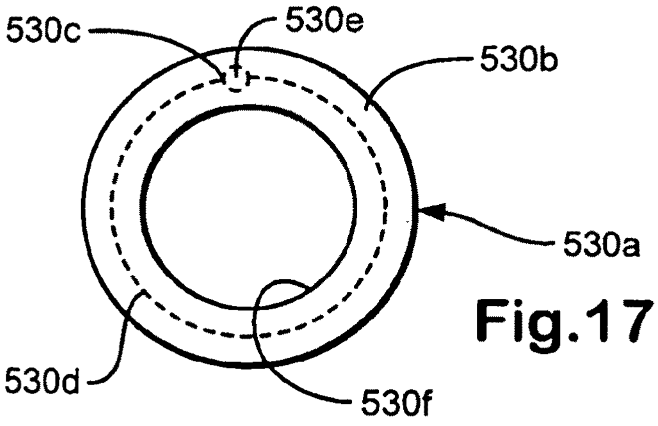
FIG. 17E is a top view of a ring according to the present invention.

FIG. 17E shows a portable ring 530*a*, like the ring 530 but without two separable ends. The ring 530*a* has a body 530*b* made of either rigid or flexible material and with a center opening 530*f* so it is releasably emplaceable around another member. An RFIDT 530*c* within the body 530*b* has an IC 530*e* and an antenna 530*d*.

Figure 18B:
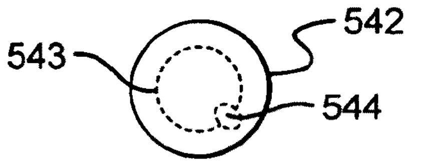
FIG. 18B is a bottom view of the whipstock of FIG. 18A.
Figure 18A:
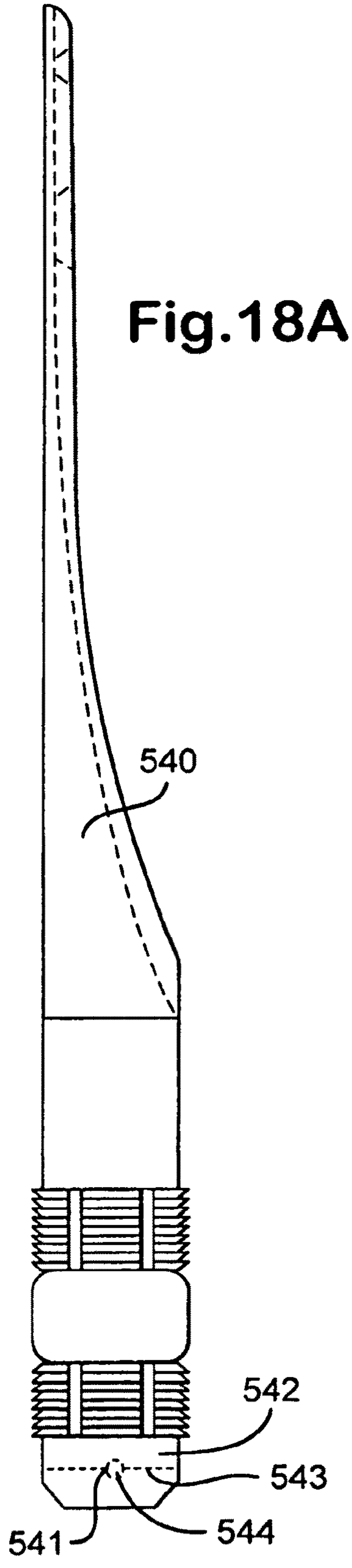
FIG. 18A is a side view of a whipstock according to the present invention.

It is within the scope of the present invention to provide a whipstock with one or more RFIDT's with an RFIDT circular antenna that encircles a generally circular part of a generally cylindrical part of a whipstock. FIGS. 18A and 18B show a whipstock 540 like a whipstock disclosed in U.S. Pat. No. 6,105,675 (incorporated fully herein for all purposes), but with an RFIDT 541 in a lower part 542 of the whipstock 540. The RFIDT 541 has an antenna 543 and an IC 544 (each like any as disclosed or referred to herein). Optionally, or in addition to the RFIDT 541, one or more RFIDT's 541*a* is affixed exteriorly to the whipstock 540 under wrap layers 541*b* (see, e.g., FIGS. 25, 26).

Figure 19:
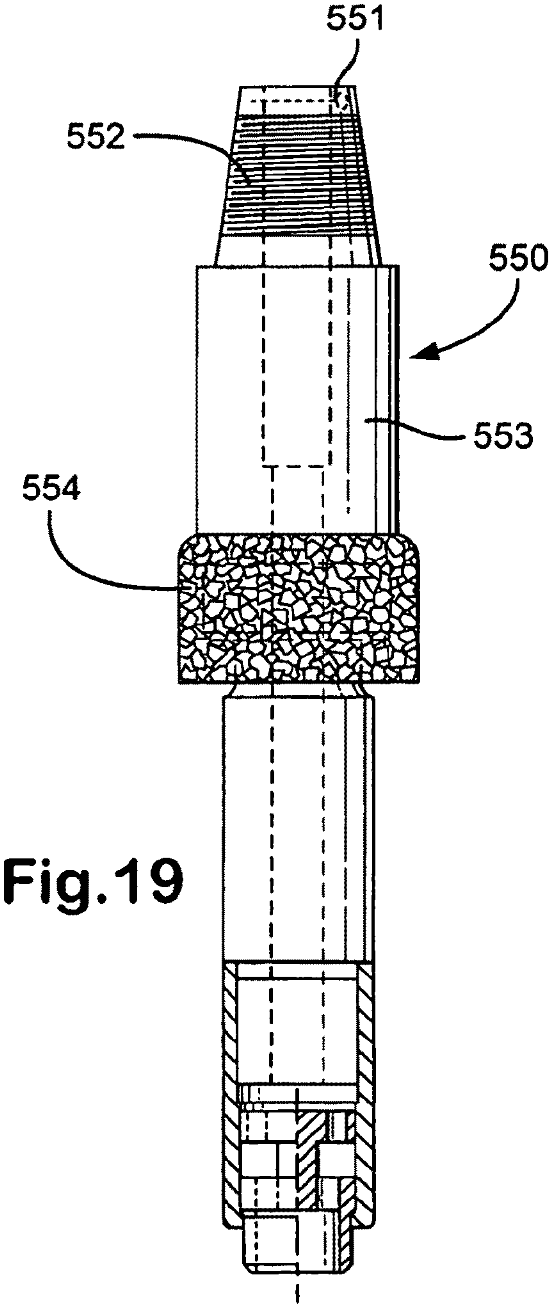
FIG. 19 is a side view of a mill according to the present invention.

An RFIDT 551 (as any disclosed herein) may, according to the present invention, be provided in a generally cylindrical part of a mill or milling tool used in downhole milling operations. Also with respect to certain mills that have a tubular portion, one or both ends of such a mill may have one or more RFIDT's therein according to the present invention. FIG. 19 shows a mill 550 which is like the mill disclosed in U.S. Pat. No. 5,620,051 (incorporated fully herein), but with an RFIDT 551 in a threaded pin end 552 of a body 553 of the mill 550. The RFIDT 551 may be emplaced and/or mounted in the pin end 552 as is any similar RFIDT disclosed herein. Optionally an RFIDT may be emplaced within a milling section 554.

Figure 25:
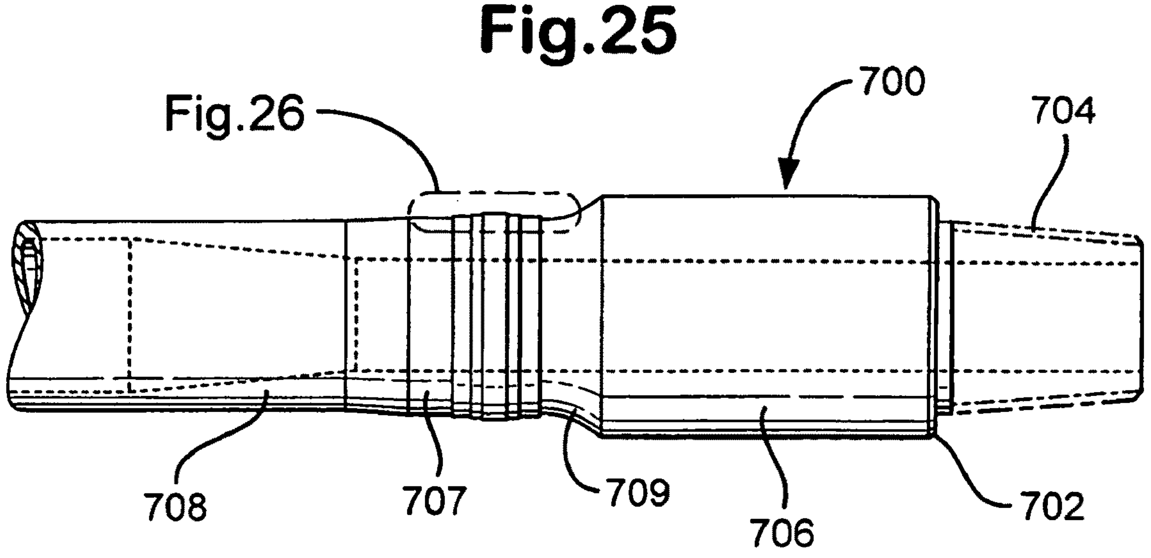
FIG. 25 is a side view of a tubular according to the present invention.
Figure 26:
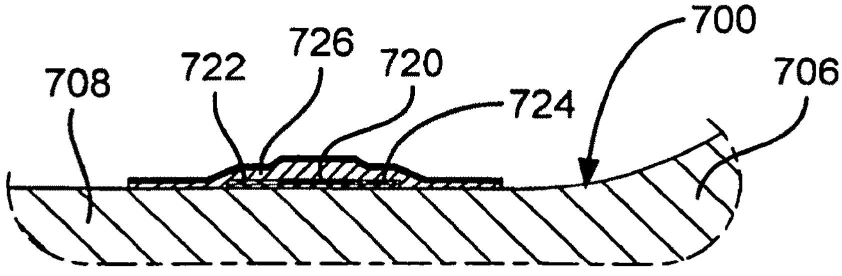
FIG. 26 is an enlargement of part of FIG. 25.

Optionally, or in addition to the RFIDT 551, one or more RFIDT's 551*a* may be affixed exteriorly of the mill 550 under wrap layers 551*b* (see, e.g., FIGS. 25, 26).

Figures 20A, 20B:
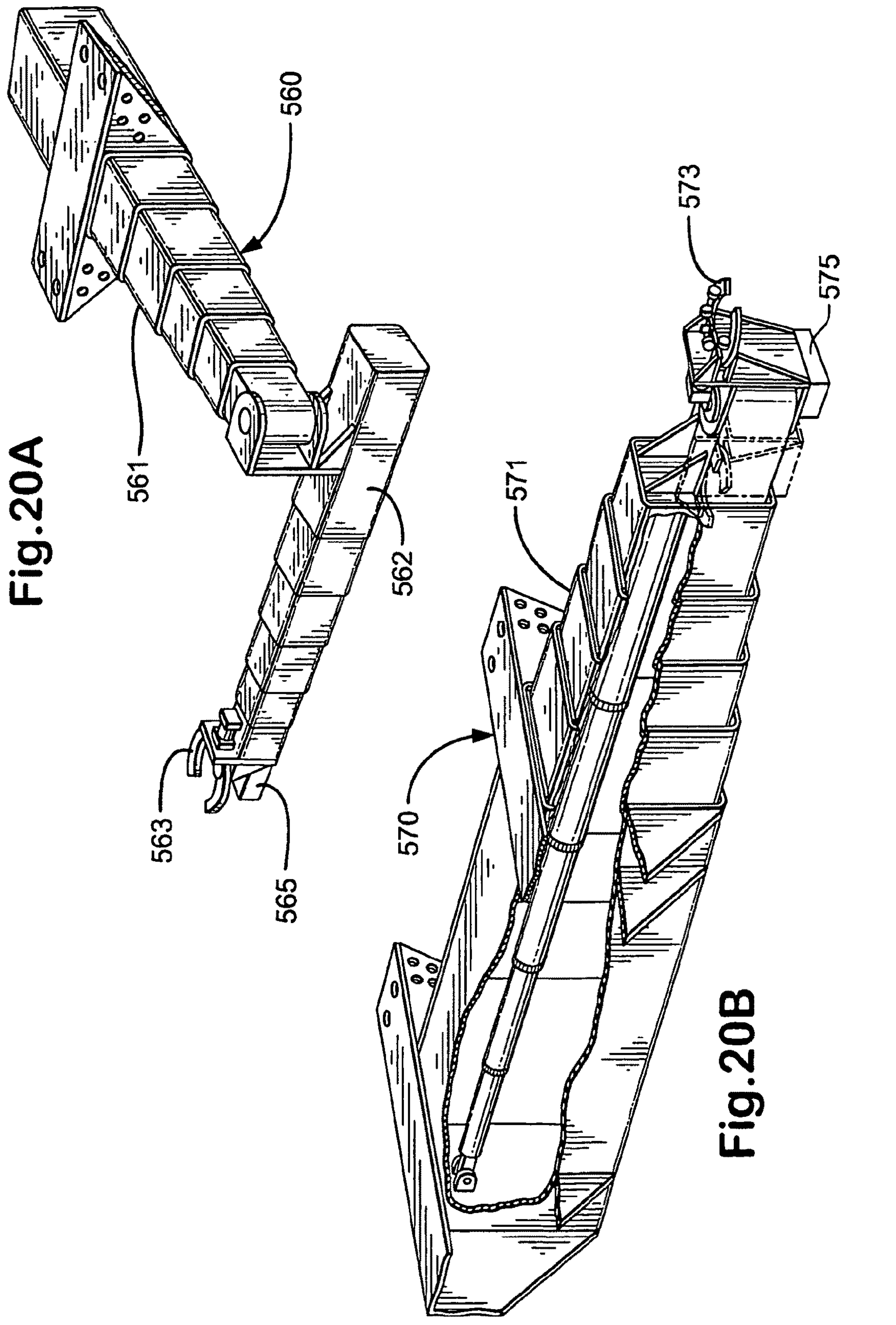
FIG. 20A is a perspective views of a pipe manipulator according to the present invention.
FIG. 20B is a perspective views of a pipe manipulator according to the present invention.

The prior art discloses a variety of pipe handlers and pipe manipulators, some with gripping mechanisms for gripping pipe. It is within the scope of the present invention to provide a pipe handler with an RFIDT reader for reading an RFIDT in a tubular member which is located in one of the embodiments of the present invention as described herein. Often an end of a tubular is near, adjacent, or passing by a part of a pipe handler. An RFIDT on or in a tubular according to the present invention can be sensed by an RFIDT reader apparatus and a signal can be transmitted therefrom to control apparatus regarding the tubular's identity or other information stored in the RFIDT. FIGS. 20A and 20B show pipe manipulators 560 and 570 (which are like pipe manipulators disclosed in U.S. Pat. No. 4,077,525 (incorporated fully herein), but with improvements according to the present invention] which have movable arms 561, 562, (pipe manipulator 560) and movable arm 571 (pipe manipulator 570). Each manipulator has a pipe gripper 563, 573. Each manipulator has an RFIDT reader apparatus—apparatus 565 on manipulator 560 and apparatus 575 on manipulator 570. Optionally, such a reader apparatus is located on a gripper mechanism.

Figure 21:
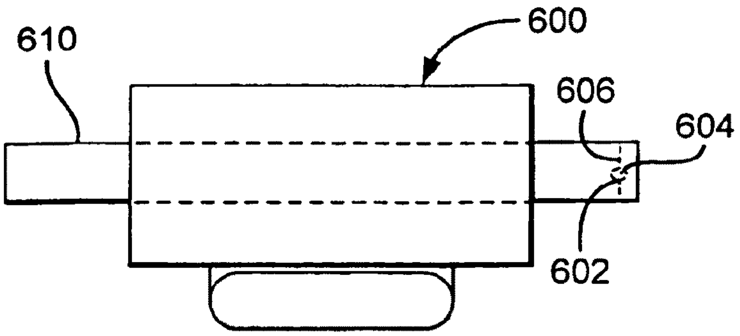
FIG. 21 is a schematic view of a system according to the present invention.

FIG. 21 shows a tubular inspection system 600 [which may be any known tubular inspection system, including those which move with respect to a tubular and those with respect to which a tubular moves, including, but not limited to those disclosed in U.S. Pat. Nos. 6,622,561; 6,578,422; 5,534,775; 5,043,663; 5,030,911; 4,792,756; 4,710,712; 4,636,727; 4,629,985; 4,718,277; 5,914,596; 5,585,565; 5,600,069; 5,303,592; 5,291,272; and Int'l Patent Application WO 98/16842 published Apr. 23, 1998 and in the references cited therein] which is used to inspect a tubular 610 (e.g., but not limited to pipe, casing, tubing, collar) which has at least one RFIDT 602 with an IC 604 and an antenna 606 and/or at least one RFIDT 602*a* affixed exteriorly thereof according to the present invention. The tubular 610 may be any tubular disclosed herein and it may have any RFIDT, RFIDT's, recess, recesses, cap ring, and/or sensible material and/or indicia disclosed herein.

Figure 22:
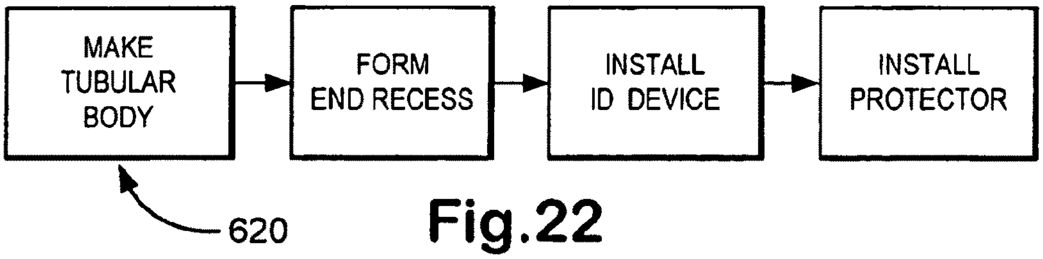
FIG. 22 is a schematic view of a system according to the present invention.

FIG. 22 shows schematically a method 620 for making a tubular member according to the present invention. A tubular body is made—"MAKE TUBULAR BODY"—using any suitable known process for making a tubular body, including, but not limited to, known methods for making pipe, drill pipe, casing, risers, and tubing. An end recess is formed—"FORM END RECESS"—in one or both ends of the tubular member. An identification device is installed in the recess—"INSTALL ID DEVICE" (which may be any identification apparatus, device, torus ring or cap ring according to the present invention). Optionally, a protector is installed in the recess—"INSTALL PROTECTOR" (which may be any protector according to the present invention).

Figure 23:
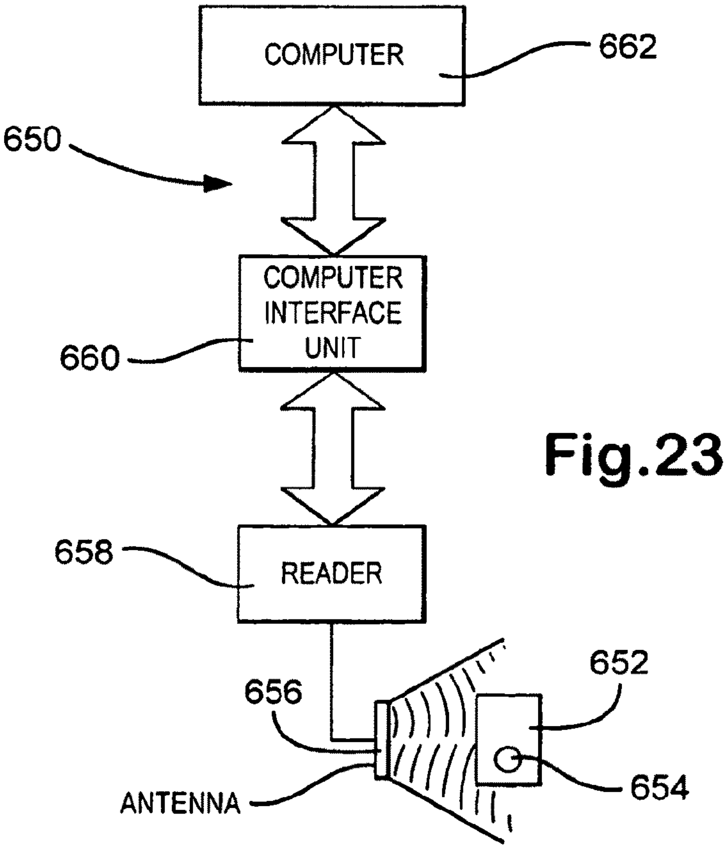
FIG. 23 is a schematic view of a system according to the present invention.

FIG. 23 shows schematically a system 650 according to the present invention which is like the systems described in U.S. Pat. No. 4,698,631 but which is for identifying an item 652 according to the present invention which has at least one end recess (as any end recess disclosed herein) and/or within a ring or torus according to the present invention with at least one SAW tag identification apparatus 654 in the recess(es) and/or ring(s) or torus(es) and/or with an exteriorly affixed RFIDT according to the present invention.

The system 650 (as systems in U.S. Pat. No. 4,698,631) has an energizing antenna apparatus 656 connected to a reader 658 which provides radio frequency pulses or bursts which are beamed through the antenna apparatus 656 to the SAW tag identification apparatus 654. The reader 658 senses responsive signals from the apparatus 654. In one aspect the responsive signals are phase modulated in accord with code encoded in the apparatus 654. The reader 658 sends received signals to a computer interface unit 660 which processes the signals and sends them to a computer system 662.

Figure 24:
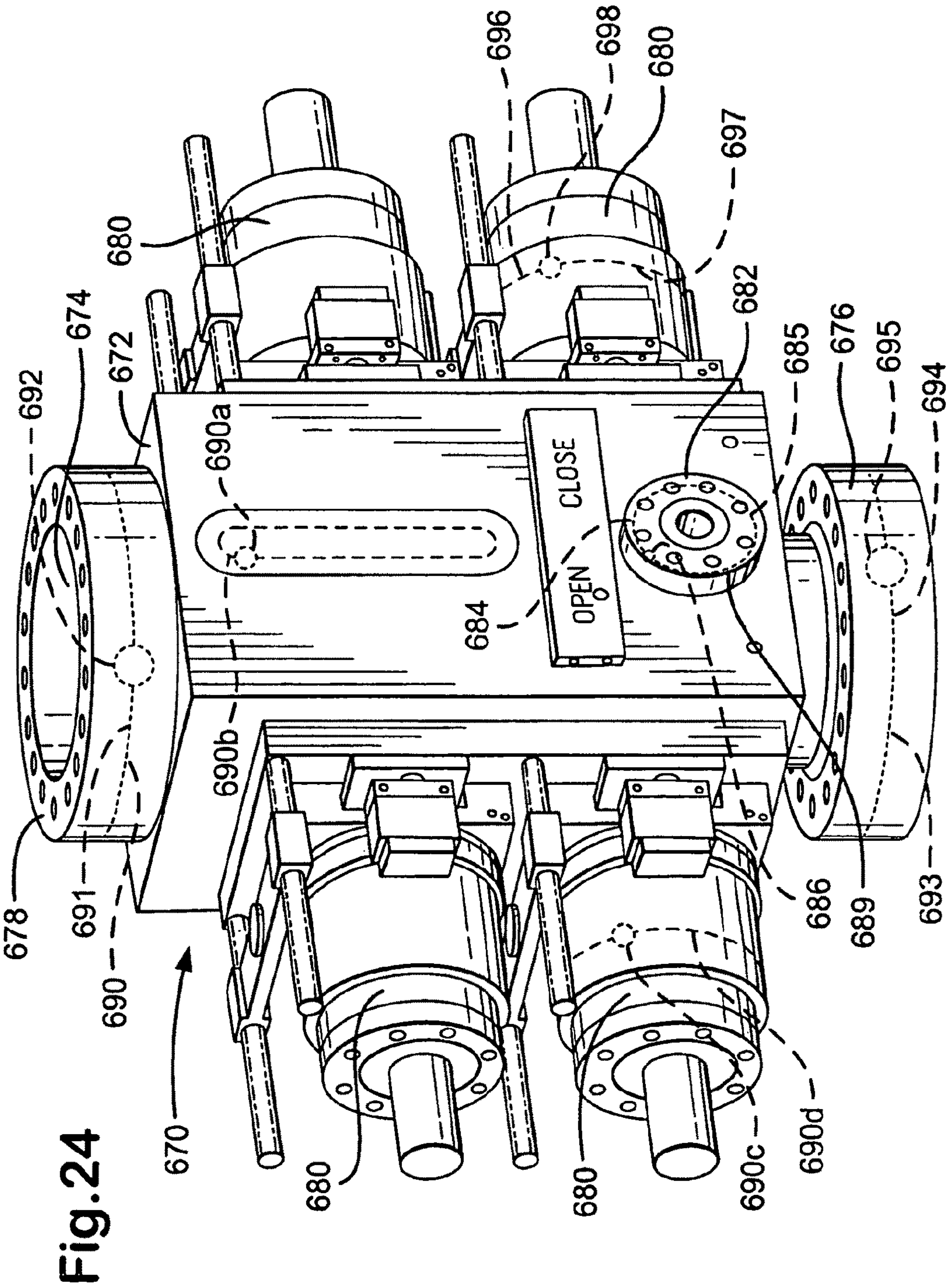
FIG. 24 is a perspective view of a blowout preventer according to the present invention.

It is within the scope of the present invention to provide a blowout preventer according to the present invention with one or more wave-energizable identification apparatuses, e.g. in a flange, side outlet, and/or door or bonnet or a blowout preventer. FIG. 24 shows a blowout preventer 670 according to the present invention which has a main body 672, a flow bore 674 therethrough from top to bottom, a bottom flange 676, a top flange 678, a side outlet 682, and four ram-enclosing bonnets 680. An RFIDT 690 (like any disclosed herein) has an antenna 691 encircling and within the top flange 678 with an IC 692 connected thereto. An RFIDT 692 (like any disclosed herein) has an antenna 694 encircling and within the bottom flange 676 with an IC 695. An RFIDT 696 (like any disclosed herein) has an antenna 697 encircling and within a bonnet 680 with an IC 698. An RFIDT 684 (like any disclosed herein) has an antenna 685 encircling and within a flange 689 of the side outlet 682, with an IC 686. Optionally, or in addition to the other RFIDT's at least one RFIDT 690*a* is affixed exteriorly to the blowout preventer 670 under wrap layers 690*b* (see, e.g., FIG. 25, 26) and/or at least one RFIDT 690*c* is affixed exteriorly to the blowout preventer 270 under wrap layers 690*d* (see, e.g., FIG. 25, 26).

FIGS. 25 and 26 show a tool joint 700 according to the present invention with RFIDT apparatus 720 according to the present invention applied exteriorly thereto. The tool joint 700 has a pin end 702 with a threaded pin 704, a joint body portion 706, an upset area 707 and a tube body portion 708. The joint body portion 706 has a larger OD than the tube body portion 708. The "WELDLINE' is an area in which the tool joint is welded (e.g. inertia welded) by the manufacturer to the upset area.

Although RFIDT's encased in a non-conductor or otherwise enclosed or protected can be emplaced directly on a tubular (or other item or apparatus according to the present invention, as shown in FIGS. 25 and 26 the RFIDT's to be applied to the tool joint 700 are first enclosed within non-conducting material, e.g. any suitable heat-resistant material, e.g., but not limited to, RYTON (Trademark) fabric membrane wrapping material, prior to emplacing them on the tool joint 700. In one particular aspect, one, two, three, or four wraps, folds, or layers of commercially available RYT-WRAP (Trademark) material commercially from Tuboscope, Inc. a related company of the owner of the present invention is used which, in one particular aspect, includes three layers of RYT-WRAP (Trademark) fabric membrane material adhered together and encased in epoxy. As shown, three RFIDT's 720 are wrapped three times in the RYT-WRAP (Trademark) material 722 so that no part of any of them will contact the metal of the tool joint 700. In one aspect such a wrapping of RYT-WRAP (Trademark) material includes RYTON (Trademark) fabric membrane material with cured epoxy wrapped around a tubular body (initially the material is saturated in place with liquid epoxy that is allowed to cure).

Figure 27:
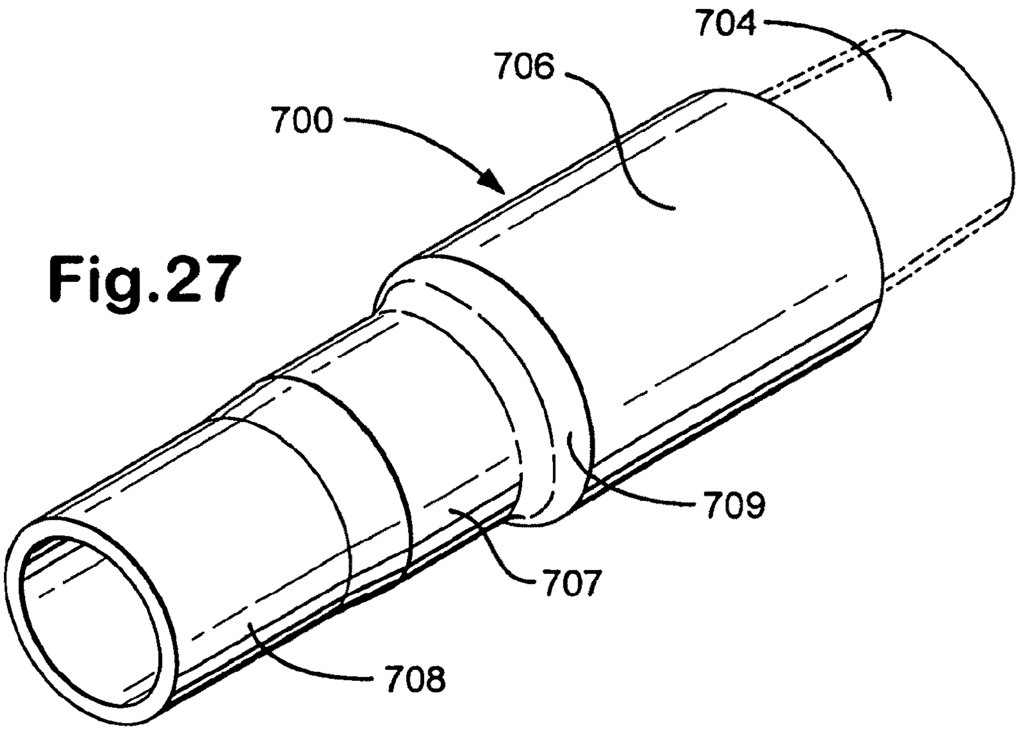
FIG. 27 is a perspective view of a tubular according to the present invention.

Prior to emplacing the wrapped RFIDT's 720 on the tool joint 700, the area to which they are to be affixed is, preferably, cleaned using suitable cleaning materials, by buffing, and/or by sandblasting as shown in FIG. 27. Any desired number of RFIDT's 720 may be used. As shown in FIG. 29A, in this embodiment three RFIDT's 720 are equally spaced apart around the exterior of the tool joint 700.

According to the present invention, RFIDT's may be applied exteriorly to any item, apparatus, or tubular at any exterior location thereon with any or all of the layers and/or wraps disclosed herein. In the particular tool joint 700 as disclosed in FIG. 25, the RFIDT's 720 are applied about two to three inches from a thirty-five degree taper 709 of the joint body portion 706 to reduce the likelihood of the RFIDT's contacting other items, handling tools, grippers, or structures that may contact the portion 706.

Optionally, as shown in FIG. 26, either in the initial layers or wraps which enclose the RFIDT's 720 or in any other layer or wrap, an identification tag 724 is included with the RFIDT's, either a single such tag or one tag for each RFIDT. In one aspect the tag(s) 724 are plastic or fiberglass. In another aspect the tag(s) 724 are metal, e.g. steel, stainless steel, aluminum, aluminum alloy, zinc, zinc alloy, bronze, or brass. If metal is used, the tag(s) 724 are not in contact with an RFIDT.

Figure 28:
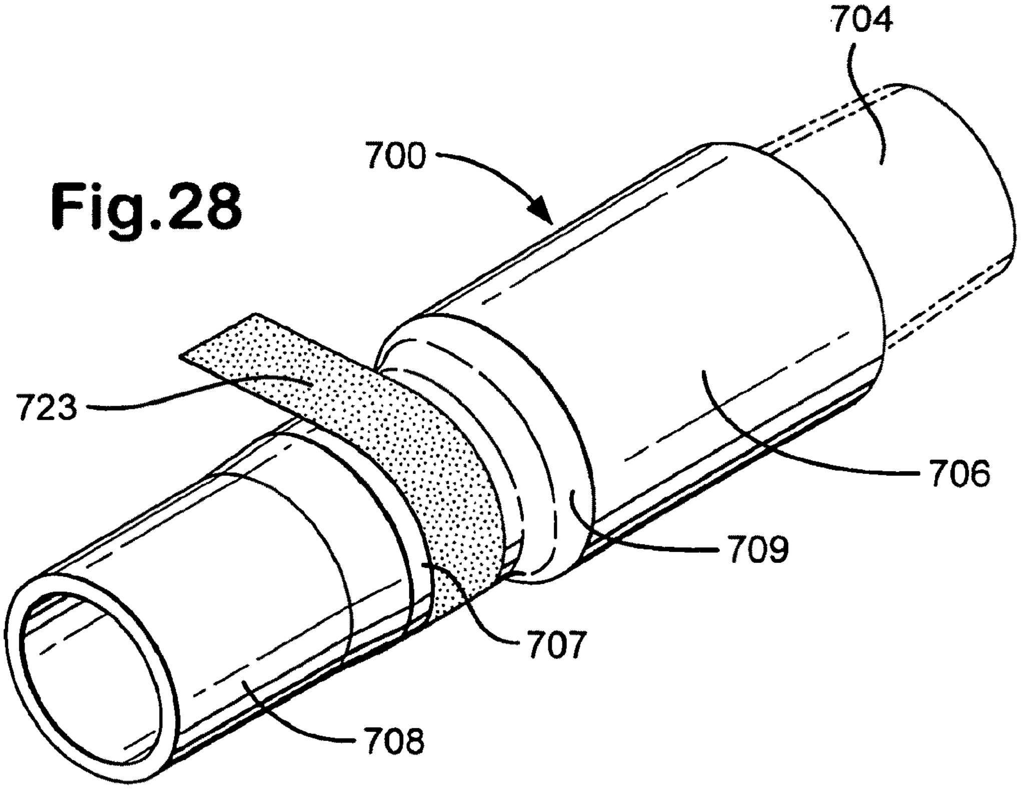
FIG. 28 is a perspective view of a tubular according to the present invention.

As shown in FIG. 28, an adhesive may be applied to the tool joint 700 to assist in securing a layer 723, "FOLDED MEMBRANE," (e.g., a double layer of RYT-WRAP (Trademark) wrap material.

Figure 29:
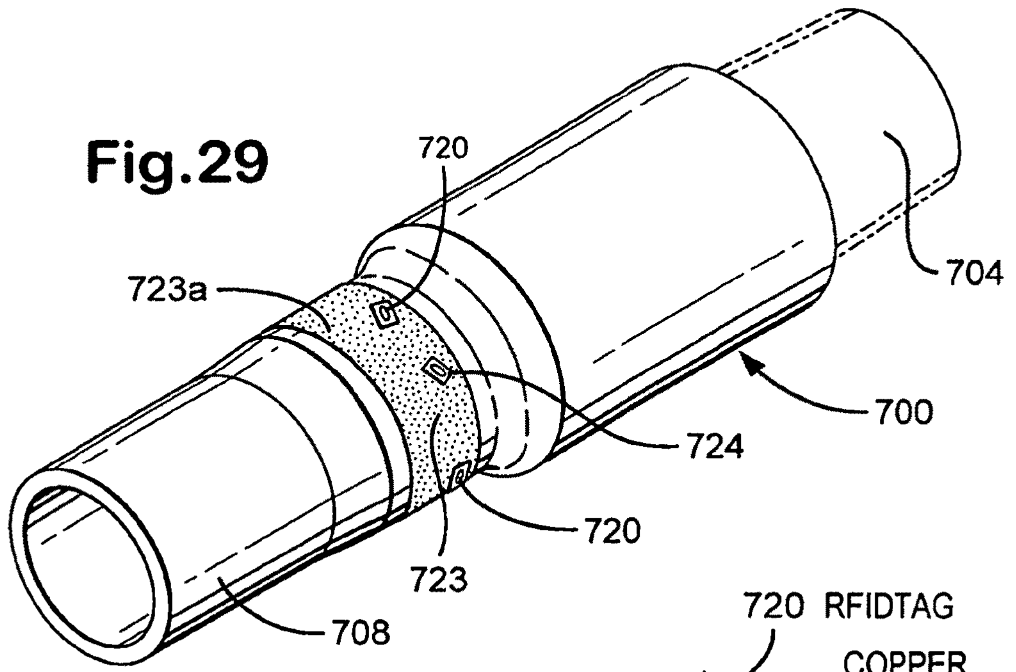
FIG. 29 is a perspective view of a tubular according to the present invention.
Figure 29A:
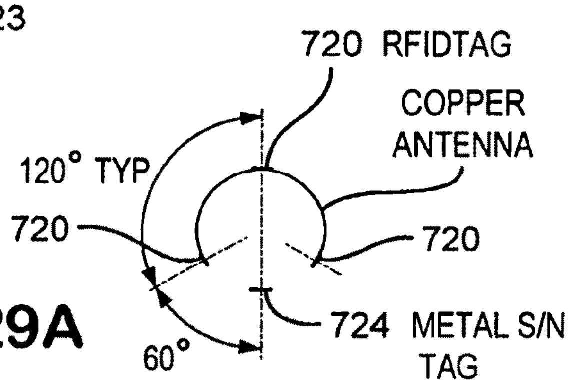
FIG. 29A is a schematic of part of the tubular of FIG. 29.

As shown in FIG. 29, the three RFIDT's 720 are emplaced on the layer 723 and, optionally, the identification tag or tags 724.

Figure 30:
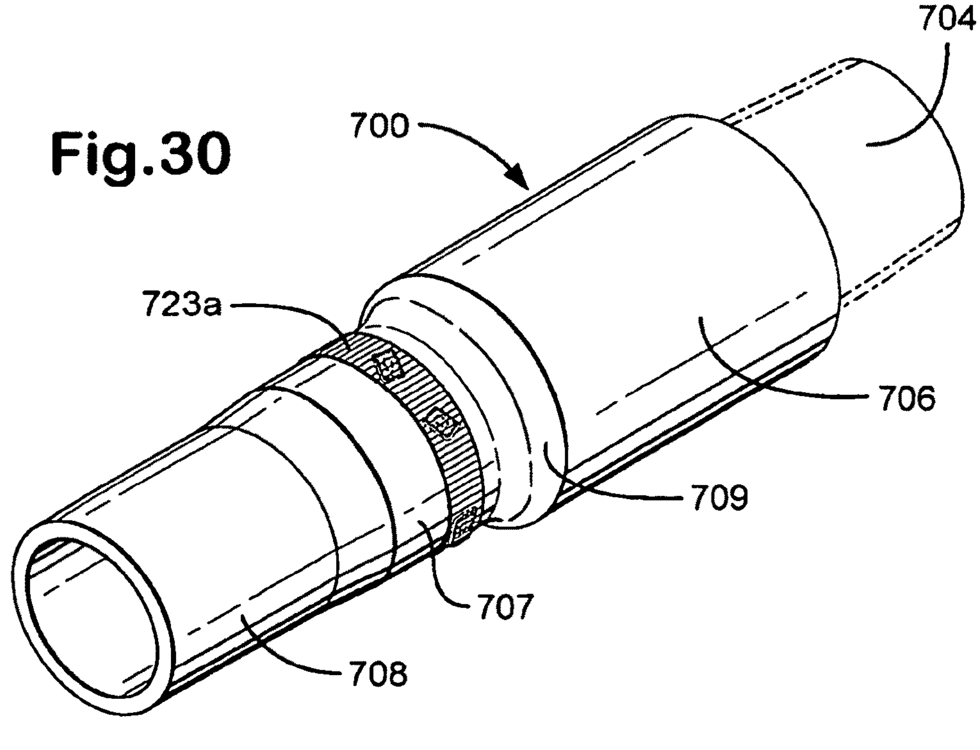
FIG. 30 is a perspective view of a tubular according to the present invention.

Optionally, as shown in FIG. 30, part 723*a* of the layer 723 is folded over to cover the RFIDT's 720 and the tag(s) 724. If this folding is done, no adhesive is applied to the tool joint under the portion of the layer 723 which is to be folded over. Optionally, prior to folding adhesive is applied on top of the portion of the layer 723 to be folded over. Optionally, prior to folding the part 723*a* over on the RFIDT's 720 and the tag(s) 724 an adhesive (e.g. two part epoxy) is applied over the RFIDT's 720 and over the tag(s) 724.

Figure 30A:
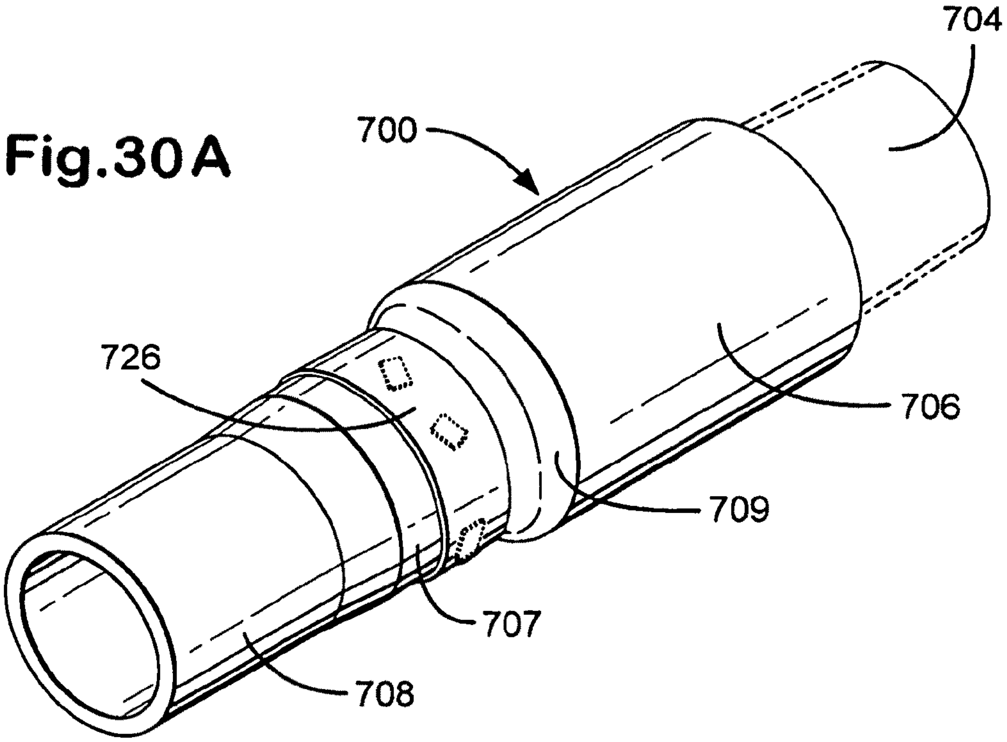
FIG. 30A is a perspective view of a tubular according to the present invention.

After allowing the structure of layer 723*a* as shown in FIG. 30 to dry (e.g., for forty minutes to one hour), as shown in FIG. 30A the folded layer 723 with the RFIDT's 720 and tag(s) 724' is, optionally, wrapped in a layer 726 of heat shrink material and/or impact resistant material (heat resistant material may also be impact resistant). In one particular optional aspect, commercially available RAYCHEM (Trademark) heat shrink material or commercially available RCANUSA (Trademark) heat shrink material is used, centered over the folded layer 723, with, preferably, a small end-to-end overlap to enhance secure bonding as the material is heated.

Figure 30B:
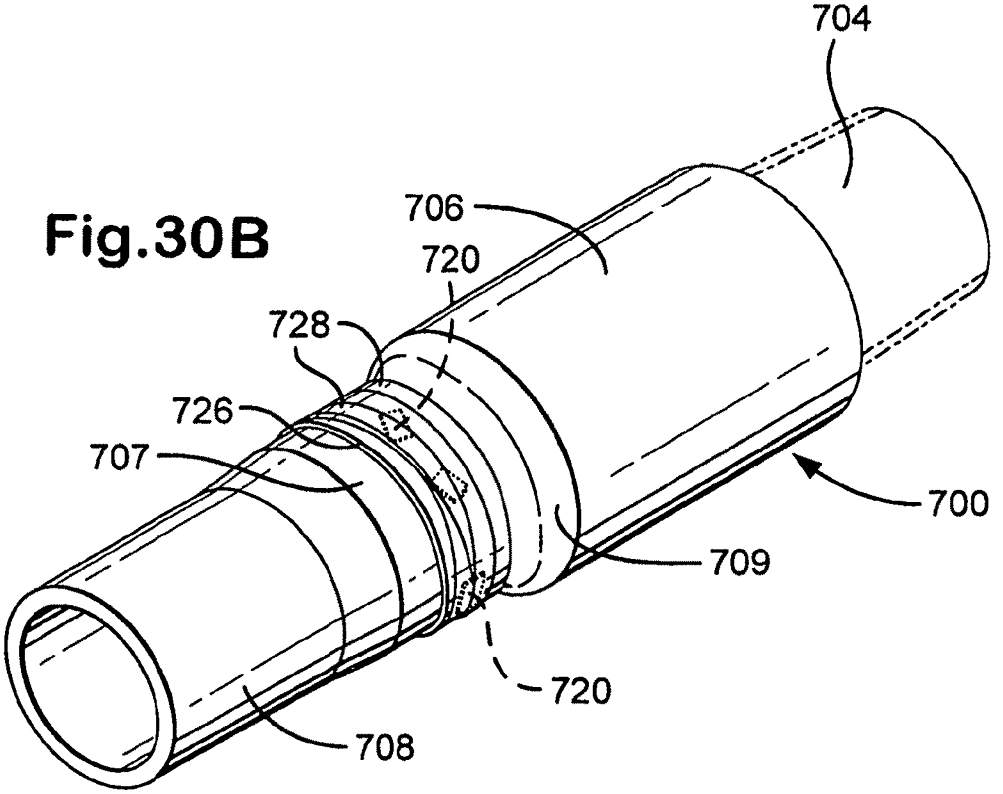
FIG. 30B is a perspective view of a tubular according to the present invention.

As shown in FIG. 30B, optionally, the layer 726 is wrapped with layers 728 of material [e.g. RYT-WRAP (Trademark) material] (e.g. with two to five layers). In one particular aspect the layer(s) 728 completely cover the layer 726 and extend for one-half inch on both extremities of the layer 726. Preferably, the final wrap layer of the layers 728 does not exceed the OD of the joint body portion 706 so that movement of and handling of the tool joint 700 is not impeded.

Curing can be done in ambient temperature and/or with fan-assisted dryers.

Any known wave-energizable apparatus may be substituted for any RFIDT herein.

The present invention, therefore, in at least certain aspects, provides a member having a body, the body having at least a portion thereof with a generally cylindrical portion, the generally cylindrical portion having a circumference, radio frequency identification apparatus with integrated circuit apparatus and antenna apparatus within the generally cylindrical portion of the body, and the antenna apparatus encircling the circumference of the cylindrical portion of the body. Such a member may include one or some (in any possible combination) of the following: the body having a first end spaced-apart from a second end, and the radio frequency identification apparatus positioned within the first end of the body; the first end of the body having a recess in the first end, and the radio frequency identification apparatus is within the recess; a protector in the recess covering the radio frequency identification apparatus; the body comprising a pipe; wherein the first end is a pin end of the pipe; wherein an end of the pipe has an exterior shoulder and the radio frequency identification apparatus is within the shoulder; wherein the second end is a box end of the pipe; wherein the first end is threaded externally and the second end is threaded internally; wherein the member is a piece of drill pipe with an externally threaded pin end spaced-apart from an internally threaded box end, and the body is generally cylindrical and hollow with a flow channel therethrough from the pin end to the box end, the pin end having a pin end portion with a pin end recess therearound, and the radio frequency identification apparatus within the pin end recess and the antenna apparatus encircling the pin end portion; wherein a protector in the pin end recess covers the radio frequency identification apparatus therein; wherein the protector is a cap ring within the pin end recess which covers the radio frequency identification apparatus; wherein the protector is an amount of protective material in the recess which covers the radio frequency identification apparatus; the member having a box end having a box end portion having a box end recess therein, a box end radio frequency identification apparatus within the box end recess, the box end radio frequency identification apparatus having antenna apparatus and integrated circuit apparatus, the antenna encircling the box end portion; wherein a protector in the box end covers the radio frequency identification apparatus therein; wherein the recess has a cross-section shape from the group consisting of square, rectangular, semi-triangular, rhomboidal, triangular, trapezoidal, circular, and semi-circular; wherein the generally cylindrical portion is part of an item from the group consisting of pipe, drill pipe, casing, drill bit, tubing, stabilizer, centralizer, cementing plug, buoyant tubular, thread protector, downhole motor, whipstock, blowout preventer, mill, and torus; a piece of pipe with a pin end, the pin end having a recess therein, and sensible indicia in the recess; wherein the sensible indicia is from the group consisting of raised portions, indented portions, visually sensible indicia, spaced-apart indicia, numeral indicia, letter indicia, and colored indicia; the member including the body having a side wall with an exterior surface and a wall recess in the side wall, the wall recess extending inwardly from the exterior surface, and secondary radio frequency identification apparatus within the wall recess; and/or wherein the radio frequency identification apparatus is a plurality of radio frequency identification tag devices.

The present invention, therefore, in at least certain aspects, provides a tubular member with a body with a first end spaced-apart from a second end, the first end having a pin end having a pin end recess in the first end and identification apparatus in the pin end recess, and a protector in the pin end recess protecting the identification apparatus therein.

The present invention, therefore, in at least certain aspects, provides a method for sensing a radio frequency identification apparatus in a member, the member having a body, the body having at least a portion thereof with a generally cylindrical portion, the generally cylindrical portion having a circumference, wave-energizable identification apparatus with antenna apparatus within the generally cylindrical portion of the body, and the antenna apparatus encircling the circumference of the cylindrical portion of the body, the method including energizing the wave-energizable identification apparatus by directing energizing energy to the antenna apparatus, the wave-energizable identification apparatus upon being energized producing a signal, positioning the member adjacent sensing apparatus, and sensing with the sensing apparatus the signal produced by the wave-energizable identification apparatus. Such a method may include one or some (in any possible combination) of the following: wherein the sensing apparatus is on an item from the group consisting of rig, elevator, spider, derrick, tubular handler, tubular manipulator, tubular rotator, top drive, mouse hole, powered mouse hole, or floor; wherein the sensing apparatus is in communication with and is controlled by computer apparatus [e.g. including but not limited to, computer system(s), programmable logic controller(s) and/or microprocessor system(s)], the method further including controlling the sensing apparatus with the computer apparatus; wherein the energizing is effected by energizing apparatus in communication with and controlled by computer apparatus, the method further including controlling the energizing apparatus with the computer apparatus; wherein the signal is an identification signal identifying the member and the sensing apparatus produces and conveys a corresponding signal to computer apparatus, the computer apparatus including a programmable portion programmed to receive and analyze the corresponding signal, and the computer apparatus for producing an analysis signal indicative of accepting or rejecting the member based on said analysis, the method further including the wave-energizable identification apparatus and producing an identification signal received by the sensing apparatus, the sensing apparatus producing a corresponding signal indicative of identification of the member and conveying the corresponding signal to the computer apparatus, and the computer apparatus analyzing the corresponding signal and producing the analysis signal; wherein the computer apparatus conveys the analysis signal to handling apparatus for handling the member, the handling apparatus operable to accept or reject the member based on the analysis signal; wherein the member is a tubular member for use in well operations and the handling apparatus is a tubular member handling apparatus; wherein the tubular member handling apparatus is from the group consisting of tubular manipulator, tubular rotator, top drive, tong, spinner, downhole motor, elevator, spider, powered mouse hole, and pipe handler; wherein the handling apparatus has handling sensing apparatus thereon for sensing a signal from the wave-energizable identification apparatus, and wherein the handling apparatus includes communication apparatus in communication with computer apparatus, the method further including sending a handling signal from the communication apparatus to the computer apparatus corresponding to the signal produced by the wave-energizable identification apparatus; wherein the computer apparatus controls the handling apparatus; wherein the member is a tubular member and wherein the sensing apparatus is connected to and in communication with a tubular inspection system, the method further including conveying a secondary signal from the sensing apparatus to the tubular inspection system, the secondary signal corresponding to the signal produced by the wave-energizable identification apparatus; and/or wherein the signal produced by the wave-energizable identification apparatus identifies the tubular member.

The present invention, therefore, in at least certain aspects, provides a method for handling drill pipe on a drilling rig, the drill pipe comprising a plurality of pieces of drill pipe, each piece of drill pipe comprising a body with an externally threaded pin end spaced-apart from an internally threaded box end, the body having a flow channel therethrough from the pin end to the box end, radio frequency identification apparatus with integrated circuit apparatus and antenna apparatus within the pin end of the body, and the antenna apparatus encircling the pin end, the method including energizing the radio frequency identification apparatus by directing energizing energy to the antenna apparatus, the radio frequency identification apparatus upon being energized producing a signal, positioning each piece of drill pipe adjacent sensing apparatus, and sensing with the sensing apparatus a signal produced by each piece of drill pipe's radio frequency identification apparatus. Such a method may include one or some (in any possible combination) of the following: wherein the sensing apparatus is in communication and is controlled by computer apparatus and wherein the radio frequency identification apparatus produces an identification signal receivable by the sensing apparatus, and wherein the sensing apparatus produces a corresponding signal indicative of the identification of the particular piece of drill pipe, the corresponding signal conveyable from the sensing apparatus to the computer apparatus, the method further including controlling the sensing apparatus with the computer apparatus; wherein the energizing is effected by energizing apparatus in communication with and controlled by computer apparatus, the method further including controlling the energizing apparatus with the computer apparatus; wherein the signal is an identification signal identifying the particular piece of drill pipe and the sensing apparatus conveys a corresponding signal to computer apparatus, the computer apparatus including a programmable portion programmed to receive and analyze the corresponding signal; and/or the computer apparatus for producing an analysis signal indicative of accepting or rejecting the particular piece of drill pipe based on said analysis, the method further including the computer apparatus analyzing the corresponding signal and producing the analysis signal, and the computer apparatus conveying the analysis signal to handling apparatus for handling the member, the handling apparatus operable to accept or reject the member based on the analysis signal.

The present invention, therefore, in at least certain aspects, provides a system for handling a tubular member, the system including handling apparatus, and a tubular member in contact with the handling apparatus, the tubular member with a body with a first end spaced-apart from a second end, the first end being a pin end having a pin end recess in the first end and identification apparatus in the pin end recess, and a protector in the pin end recess protecting the identification apparatus therein; and such a system wherein the handling apparatus is from the group consisting of tubular manipulator, tubular rotator, top drive, tong, spinner, downhole motor, elevator, spider, powered mouse hole, and pipe handler.

The present invention, therefore, in at least certain aspects, provides a ring with a body with a central hole therethrough, the body having a generally circular shape, the body sized and configured for receipt within a circular recess in an end of a generally cylindrical member having a circumference, wave-energizable identification apparatus within the body, the wave-energizable identification apparatus having antenna apparatus, and the antenna apparatus extending around a portion of the body; and such a ring with sensible indicia on or in the body.

The present invention, therefore, in at least certain aspects, provides a ring with a body with a central hole therethrough, the body having a central hole therethrough the body sized and configured for receipt within a circular recess in an end of a generally cylindrical member having a circumference, identification apparatus within or on the body, and the identification apparatus being sensible indicia.

The present invention, therefore, in at least certain aspects, provides a method for making a tubular member, the method including making a body for a tubular member, the body having a first end spaced-apart from a second end, and forming a recess around the end of the body, the recess sized and shaped for receipt therein of wave-energizable identification apparatus. Such a method may include one or some (in any possible combination) of the following: installing wave-energizable identification apparatus in the recess; installing a protector in the recess over the wave-energizable identification apparatus; and/or wherein the tubular member is a piece of drill pipe with an externally threaded pin end spaced-apart from an internally threaded box end, the recess is a recess encircling the pin end, and the wave-energizable identification apparatus has antenna apparatus, the method further including positioning the antenna apparatus around and within the pin end recess.

The present invention, therefore, in at least certain aspects, provides a method for enhancing a tubular member, the tubular member having a generally cylindrical body with a first end spaced-apart from a second end, the method including forming a circular recess in an end of the tubular member, the recess sized and shaped for receipt therein of wave-energizable identification apparatus, the wave-energizable identification apparatus including antenna apparatus with antenna apparatus positionable around the circular recess.

The present invention, therefore, provides, in at least some embodiments, a member with a body, the body having two spaced-apart ends, wave-energizable identification apparatus on the exterior of the body, and encasement structure encasing the wave-energizable identification apparatus. Such a member may have one or some, in any possible combination, of the following: the encasement structure is at least one layer of heat resistant material; wherein the encasement structure is at least one layer of impact resistant material; wherein the wave-energizable identification apparatus is radio frequency identification apparatus with integrated circuit apparatus and antenna apparatus; the body has a first end spaced-apart from a second end, and at least a portion comprising a generally cylindrical portion, the generally cylindrical portion having a circumference, and the radio frequency identification apparatus positioned exteriorly on the circumference of the body; wherein the body is a pipe; wherein the pipe is a tool joint with an upset portion and the wave-energizable identification apparatus is adjacent said upset portion; wherein the body has a generally cylindrical portion which is part of an item from the group consisting of pipe, drill pipe, casing, drill bit, tubing, stabilizer, centralizer, cementing plug, buoyant tubular, thread protector, downhole motor, whipstock, mill, and torus; and/or wherein the wave-energizable identification apparatus comprises a plurality of radio frequency identification tag devices.

The present invention, therefore, provides in at least some, although not necessarily all, embodiments a method for sensing a wave-energizable identification apparatus of a member, the member as any disclosed herein with a body having two spaced-apart ends and wave-energizable identification apparatus on the body, and encasement structure encasing the wave-energizable identification apparatus, the encasement structure having at least one layer of heat resistant material, the wave-energizable identification apparatus with antenna apparatus on the body, the method including energizing the wave-energizable identification apparatus by directing energizing energy to the antenna apparatus, the wave-energizable identification apparatus upon being energized producing a signal, positioning the member adjacent sensing apparatus, and sensing with the sensing apparatus the signal produced by the wave-energizable identification apparatus. Such a method may have one or some, in any possible combination, of the following: wherein the sensing apparatus is on an item from the group consisting of rig, elevator, spider, derrick, tubular handler, tubular manipulator, tubular rotator, top drive, mouse hole, powered mouse hole, or floor; wherein the sensing apparatus is in communication with and is controlled by computer apparatus, the method including controlling the sensing apparatus with the computer apparatus; wherein the energizing is effected by energizing apparatus in communication with and controlled by computer apparatus, the method including controlling the energizing apparatus with the computer apparatus; wherein the signal is an identification signal identifying the member and the sensing apparatus produces and conveys a corresponding signal to computer apparatus, the computer apparatus including a programmable portion programmed to receive and analyze the corresponding signal, and the computer apparatus for producing an analysis signal indicative of accepting or rejecting the member based on said analysis, the method further including the wave-energizable identification apparatus producing an identification signal received by the sensing apparatus, the sensing apparatus producing a corresponding signal indicative of identification of the member and conveying the corresponding signal to the computer apparatus, and the computer apparatus analyzing the corresponding signal and producing the analysis signal; wherein the computer apparatus conveys the analysis signal to handling apparatus for handling the member, the handling apparatus operable to accept or reject the member based on the analysis signal; wherein the member is a tubular member for use in well operations and the handling apparatus is a tubular member handling apparatus; wherein the tubular member handling apparatus is from the group consisting of tubular manipulator, tubular rotator, top drive, tong, spinner, downhole motor, elevator, spider, powered mouse hole, and pipe handler; wherein the handling apparatus has handling sensing apparatus thereon for sensing a signal from the wave-energizable identification apparatus, and wherein the handling apparatus includes communication apparatus in communication with computer apparatus, the method including sending a handling signal from the communication apparatus to the computer apparatus corresponding to the signal produced by the wave-energizable identification apparatus; wherein the computer apparatus controls the handling apparatus; wherein the member is a tubular member and wherein the sensing apparatus is connected to and in communication with a tubular inspection system, the method including conveying a secondary signal from the sensing apparatus to the tubular inspection system, the secondary signal corresponding to the signal produced by the wave-energizable identification apparatus; and/or wherein the signal produced by the wave-energizable identification apparatus identifies the tubular member.

The present invention, therefore, provides in at least certain, if not all, embodiments a method for handling drill pipe on a drilling rig, the drill pipe comprising a plurality of pieces of drill pipe, each piece of drill pipe being a body with an externally threaded pin end spaced-apart from an internally threaded box end, the body having a flow channel therethrough from the pin end to the box end, radio frequency identification apparatus with integrated circuit apparatus and antenna apparatus on the body, and encased in heat resistant material, the method including energizing the radio frequency identification apparatus by directing energizing energy to the antenna apparatus, the radio frequency identification apparatus upon being energized producing a signal, positioning each piece of drill pipe adjacent sensing apparatus, and sensing with the sensing apparatus a signal produced by each piece of drill pipe's radio frequency identification apparatus. Such a method may include, wherein the sensing apparatus is in communication and is controlled by computer apparatus and wherein the radio frequency identification apparatus produces an identification signal receivable by the sensing apparatus, and wherein the sensing apparatus produces a corresponding signal indicative of the identification of the particular piece of drill pipe, said corresponding signal conveyable from the sensing apparatus to the computer apparatus, controlling the sensing apparatus with the computer apparatus, and wherein the energizing is effected by energizing apparatus in communication with and controlled by computer apparatus, controlling the energizing apparatus with the computer apparatus, and wherein the signal is an identification signal identifying the particular piece of drill pipe and the sensing apparatus conveys a corresponding signal to computer apparatus, the computer apparatus including a programmable portion programmed to receive and analyze the corresponding signal, the computer apparatus for producing an analysis signal indicative of accepting or rejecting the particular piece of drill pipe based on said analysis, the computer apparatus analyzing the corresponding signal and producing the analysis signal, and the computer apparatus conveying the analysis signal to handling apparatus for handling the member, the handling apparatus operable to accept or reject the member based on the analysis signal.

The present invention, therefore, in at least certain aspects, provides a tool joint with a body having a pin end spaced-apart from a tube body, an upset portion, a tool joint portion between the upset portion and the pin end, and wave-energizable identification apparatus on the tube body adjacent the upset portion, the wave-energizable identification apparatus encased in heat resistant material.

FIG. 31A shows a chain 809 with links 801 and with one link 800 having a link body 802. FIGS. 31B and 31C show the link 800. A stud 804 extends across a link opening 805 from one side of the link body 802 to the other.

A wave-energizable apparatus 810 (any disclosed herein) housed in a shield 812 is held against the stud 804 with material 806 wrapped around the stud 804. Optionally a second wave-energizable apparatus 814 in a shield 813 is also held in place by the material 806.

As shown the material 806 covers the entire exterior surface of the stud 804 and a small portion of the exterior surface of the link body 802. As shown, the stud 804 has an hexagonal cross-section, but it may be of any suitable cross-sectional shape. The apparatus 810 may be encased in protective material, e.g. vulcanized rubber 818.

FIGS. 32A-32C show a shield 812 which has a recess 822 for housing a wave-energizable apparatus (any disclosed herein). In one aspect a shield 812 is made of plastic, e.g. polyoxymethylene (e.g., in one particular aspect, Dupont DELRIN (trademark) material). The recess 822 can be machined into the material.

In one aspect, as shown in FIG. 32D, a wave-energizable apparatus 810 is placed in a recess 822 of a shield 812 and then the shield apparatus combination is inserted into or wrapped with a tube 824, e.g. a tube of shrink wrap material. The resulting assembly is then placed on and/or taped to the stud of a chain link. Then the assembly is wrapped with heat shrink material which encompasses the stud. In one aspect any material described herein is used for the tube and for the wrap. In one aspect crosslinked polyethylene shrink wrap material (or "XLPE") is used. Heat is applied to the material which heats and shrinks and the is allowed to cool. One, two or more additional wrap layers can be applied.

In one aspect the shield with the wave-energizable apparatus is set on the stud and material is wrapped around the shield and the stud to connect the shield and its wave-energizable apparatus to the stud (without initially making the assembly previously described).

A shield (like the shield 812) according to the present invention can be of any desired cross-sectional shape and a wave-energizable apparatus can be of any desired cross-sectional shape (or encasing material around such an apparatus can be of any desired shape). FIG. 33 illustrates shields 812*a*, 812*b*, 812*c*, 812*d* and 812*e* of different cross-sectional shapes with wave-energizable apparatuses, respectively, 810*a*, 810*b*, 810*c*, 810*d*, 810*e*, and 810*f* of different cross-sections. On shield may house multiple wave-energizable apparatuses.

FIG. 34 shows shields 812*f*, 812*g*, 812*h* and 812*i* with, respectively, recesses 822*f*, 822*g*, 822*h* and 822*i* for housing a wave-energizable apparatus. A wave-energizable apparatus may be held in a shield recess by a friction-fit and/or with adhesive. Optionally a shield recess may have holding lips like the lips 8221 of the shield 812*h* and the lips 822*m* of the shield 812*i*.

FIG. 35A shows a chain 830 according to the present invention with links 831, 832 and 833 (partial). A stud 834 projects across a link opening 835 of each link. As shown in cross-section, a wave-energizable apparatus 836 is held to a stud 834 of the link 832 with wrap material 838. The wave-energizable apparatus 836 projects into the link opening 835.

Optionally (or instead of the apparatus 836), a wave-energizable apparatus 837 is held on the link 832 with wrap material 839. The wave-energizable apparatus 837 also projects into the opening 835.

FIGS. 36A-36C show a chain link 840 according to the present invention with a body 842 and a stud 844 extending across a link opening 845. A wave-energizable apparatus 846 is held on the stud 844 with wrap material 848. The wrap material 848 does not project beyond outer limits 849*a*, 849*b* of the body 842.

FIGS. 37A-37C show a chain link 850 according to the present invention with a body 852 and a stud 854 extending across a link opening 855. A wave-energizable apparatus 846 is held on the stud 854 with wrap material 858. The wrap material 858 does not project beyond outer limits 859*a*, 859*b* of the body 852.

Figure 38A:
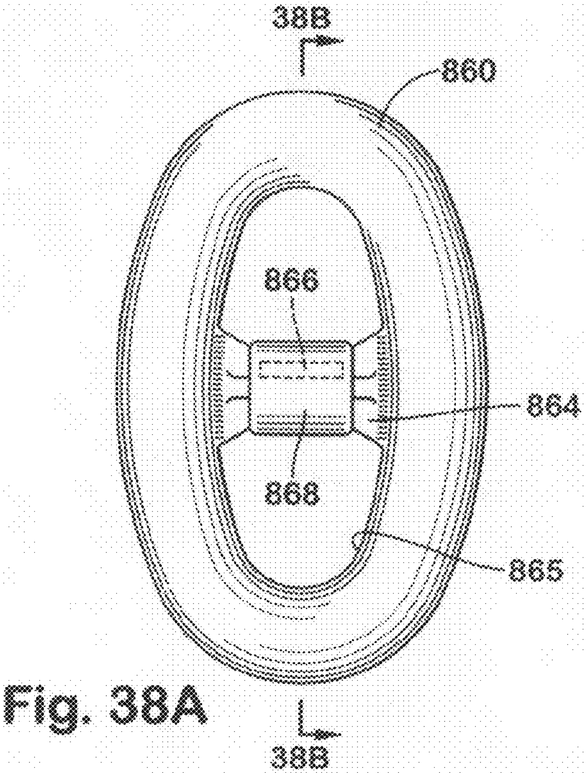
FIG. 38A is a top view of a chain link according to the present invention.
Figure 38B:
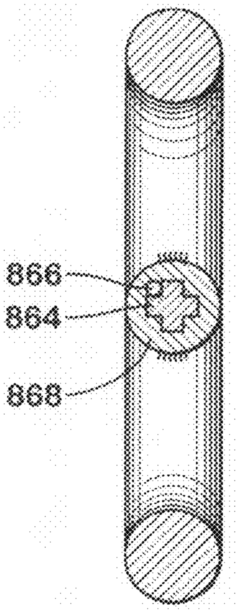
FIG. 38B is a cross-section view along line 38B-38B of FIG. 38A.
Figure 38C:
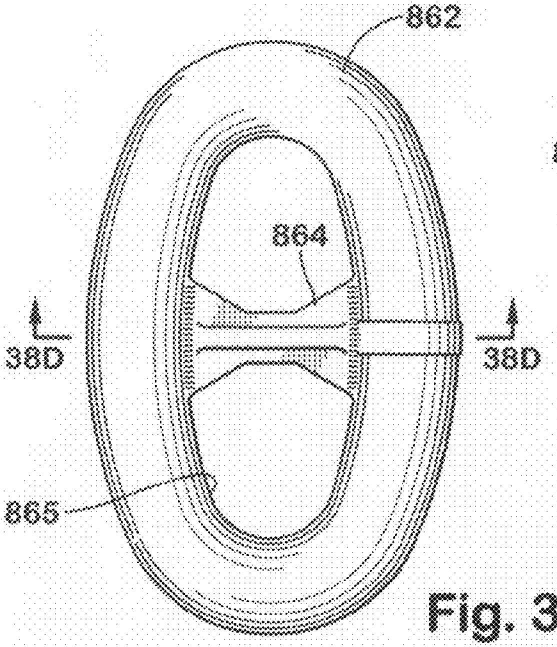
Fig. 38C ( PRIOR ART )
FIG. 38C is a top view of the chain link of FIG. 38C without wrapping and without an identification tag. This is a prior art link.
Figure 38D:
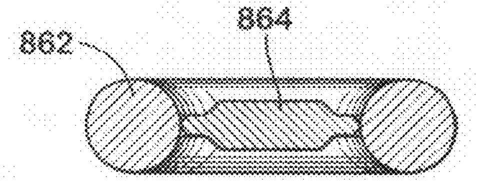
Fig. 38D ( PRIOR ART )
FIG. 38D is a cross-section view along line 38D-38D of FIG. 38C.

FIGS. 38A and 38B show a chain link 860 according to the present invention which has a body 862 and a stud 864 extending across a body opening 865. The link itself, without additions according to the present invention, including its stud, is prior art. The stud 864 is of a cross-shaped cross-section and a wave-energizable apparatus 866 is placed between two arms of the stud 864. Wrap material 868 is then wrapped around the stud 864 and the wave-energizable apparatus 866.

FIG. 39 shows a link 870 with a body 872 having a shaft 878 and two loop or open ends 873, 874. The loop 873 has a body 873*b* with an opening 873*a*. A wrap 879 secures a wave-energizable apparatus 875 to the body 873*b*.

The loop 874 has a body 874*b* with an opening 874*a*.

A wrap 876 secures a wave-energizable apparatus 871 to the shaft 878.

According to the present invention an energizable identification apparatus can be applied to, connected to, or disposed on a member using a solid mass within which is located the energizable identification apparatus. FIG. 40A shows a mass 951 of material within which is an energizable identification apparatus 959. The mass 951 is sized and configured for insertion into a recess, notch, hollow, channel or opening of a member to facilitate installation of the energizable identification apparatus 959. The mass 951 can be held in place with a friction fit and/or adhesive, glue, welding, and/or tape. The material of the mass 951 can be metal, plastic, composite, wood, ceramic, cermet, gel, aerogel, silica aerogel, fiberglass, nonmagnetic metal, or polytetrafluoroethylene. The material can be rigid and relatively unbending or it can be soft and/or flexible. An enlarged end 951*a* of the mass 951 is optional.

FIG. 40B shows a mass 1151 (made, e.g. of any material mentioned for the mass 951) with an energizable identification apparatus 1159 therein. The energizable identification apparatus 1159 has an antenna 1158 extending from the energizable identification apparatus 1159 and disposed within the mass 1551. With a flexible or sufficiently non-rigid mass 1151 (and with the mass 951) a slit or recess 1157 of any desired length within the mass 1151 may be provided for inserting the energizable identification apparatus 1159 and antenna 1158 into the mass 1151 and/or for removable emplacement of the energizable identification apparatus 1159.

FIG. 40C shows a mass 1141 (e.g. like the masses 951, 1151 and made of the materials mentioned above) with an energizable identification apparatus 1142 therein (or it may, according to the present invention, be thereon). The mass 1141 has a recess 1143 sized, located, and configured for receipt therein of a part or a portion of a member so that the mass 1141 is easily installable thereon. A friction fit between the mass 1141 and the part or portion of the member can hold the mass 1141 in place (e.g. on a frame, plate, mount, hook-strip, or support of a screen or screen assembly) and/or connectors, fasteners and/or adhesive may be used to hold the mass 1141 in place.

FIG. 41A shows a link 880 with a body 882 having an opening 884. A stud 881 is located between sides 882*a*, 882*b* of the body 882. A mass 883 housing a wave=energizable apparatus 889 (any disclosed herein) is placed on the stud 881 with a portion 881*a* of the stud 881 in a recess 883*a* of the mass 883. The mass 883 may be any desired shape and, in one aspect, is like the mass of FIG. 40C. Optionally, instead of, or in addition to the mass 883, a mass 885 with a wave-energizable apparatus 887 is placed on the body 882 with a portion 882*a* of the body 882 in a recess 885*a* of the mass 885. The mass 885 may be any desired shape and, in one aspect, is like the mass of FIG. 40C.

FIG. 41B shows a link 890 with a body 892 having end openings 894*a*, 894*b*. A shaft 891 is located between the ends of the body 892. A mass 893 housing a wave-energizable apparatus 899 (any disclosed herein) is placed on the shaft 891 with a portion 891*a* of the shaft 891 in a recess 893*a* of the mass 893. The mass 893 may be any desired shape and, in one aspect, is like the mass of FIG. 40C. Optionally, instead of, or in addition to the mass 893, a mass 895 with a wave-energizable apparatus 897 is placed on the body 892 with a portion 892*a* of the body 892 in a recess 895*a* of the mass 895. The mass 895 may be any desired shape and, in one aspect, is like the mass of FIG. 40C.

Any wave-energizable apparatus and/or shield disclosed herein may be used with any of the embodiments of the present invention, including, but not limited to, those of FIGS. 31A-39. Without limitation a wave-energizable apparatus in a link according to the present invention may contain the following type or types of information: identity; model number; manufacturer identity; date of manufacture; date of service (first, all, last, current); date of inspection(s); next scheduled inspection date; history of rigs and/or vessels used on; and/or stresses applied to the link and/or to a chain of which it is a part. Any chain link or links according to the present invention may be used in any chain. In one aspect links according to the present invention are used several (one, two, three or more) at one or at each end of a chain and several (one, two, three or more) in the middle.

Any structure, item, and/or mass according to the present invention disclosed herein may have a sufficient recess, e.g. but not limited to, the subject matter of FIG. 40C and/or of FIG. 32E (with a sufficiently large recess), can be used as a connector to secure a wave-energizable apparatus to an item, e.g., a link and, when sized and configured appropriately, as a "clip-on" connector.

The present invention, therefore, provides in at least certain, if not all, embodiments a link with a body; the body having an exterior surface and two spaced-apart ends; wave-energizable identification apparatus on the exterior surface of the body; the wave-energizable identification apparatus wrapped in fabric material; the fabric material comprising heat-resistant non-conducting material; and the wave-energizable identification apparatus wrapped and positioned on the body so that the wave-energizable identification apparatus does not contact the body.

The present invention, therefore, provides in at least certain, if not all, embodiments a link with: a link body, the link body having a link body exterior surface, two spaced-apart ends, and a link opening through the link body; and wave-energizable apparatus on the exterior surface of the link body. Such a link may have one or some, in any possible combination, of the following: a wrap over the wave-energizable apparatus wrapping the wave-energizable identification apparatus wrapped to the link body; the link body including a stud extending across the link opening, the stud having a stud exterior surface, and the wave-energizable apparatus on the stud exterior surface; wherein the wave-energizable apparatus is wrapped on the stud and positioned on the stud so that the wave-energizable apparatus does not contact the stud; wherein the wrap is fabric material, the fabric material is at least one layer of material wrapped around the wave-energizable apparatus; the at least one layer of material is a plurality of layers; a layer of body fabric material is on the body, the wave-energizable apparatus located adjacent and exteriorly of the body fabric material, and the fabric material in which the wave-energizable apparatus is wrapped is a folded portion of the body fabric material folded over on the wave-energizable apparatus; the wave-energizable apparatus and the fabric material in which the wave-energizable apparatus are wrapped in heat shrink material; outside the heat shrink material, at least one outer layer of fabric material is placed over the heat shrink material; the at least one outer layer of fabric material is a plurality of outer layers; the wave-energizable apparatus is in a shield; the shield has a curved top and a recess for the wave-energizable apparatus; an amount of adhesive on the wave-energizable apparatus; wherein the wave-energizable apparatus is radio frequency apparatus with integrated circuit apparatus and antenna apparatus; the link body including a shaft, with two spaced-apart shaft ends, each end of the two spaced-apart ends of the link body at a shaft end of the shaft, the two spaced-apart ends including a first end and a second end, the link opening in the first end, and a secondary opening in the second end; the wave-energizable apparatus is on one of the first end and the second end; the wave-energizable apparatus is on the shaft; wherein the wave-energizable apparatus is on one of the first end and the second end and a second wave-energizable apparatus is one the shaft; wherein the wave-energizable apparatus includes a first wave-energizable apparatus and a second wave-energizable apparatus, the link further has both the first wave-energizable apparatus and the second wave-energizable apparatus on the link body; the link body including a stud extending across the link opening, the stud having a stud exterior surface, and the wave-energizable apparatus on the stud exterior surface; the stud having two spaced-apart ends, a wrap securing the wave-energizable apparatus to the stud, and the wrap also on a portion of the link body adjacent each end of the stud; wherein the wave-energizable apparatus is in a mass, the mass has a recess, and the mass is on the link body with a portion of the link body in the recess; wherein the link body includes a stud between sides of the link body and the mass is on the stud; wherein the body includes a shaft between the two spaced-apart ends and the mass is on the shaft; wherein the mass comprises a first mass, the link further has a second mass with a wave-energizable apparatus on the link body; wherein the link body includes a stud between sides thereof and the first mass is on the link body apart from the stud and the second mass is on the stud; and/or wherein the link is one of a chain link and an elevator link.

The present invention, therefore, provides in at least certain, if not all, embodiments a method for sensing a wave-energizable identification apparatus of a member, the member comprising a link with a body, the body having an exterior surface and two spaced-apart ends, wave-energizable identification apparatus on the exterior surface of the body, the wave-energizable identification apparatus wrapped in fabric material, the fabric material comprising heat-resistant non-conducting material, and the wave-energizable identification apparatus wrapped and positioned on the body so that the wave-energizable identification apparatus does not contact the body, the wave-energizable identification apparatus having antenna apparatus, the method including energizing the wave-energizable identification apparatus by directing energizing energy to the antenna apparatus, the wave-energizable identification apparatus upon being energized producing a signal, positioning the member adjacent sensing apparatus, and sensing with the sensing apparatus the signal produced by the wave-energizable identification apparatus.

The present invention, therefore, provides in at least certain, if not all, embodiments a method for sensing a wave-energizable apparatus of a link, the link comprising a link with a body, the body having an exterior surface and two spaced-apart ends, wave-energizable apparatus on an exterior surface of the body, the method including energizing the wave-energizable apparatus by directing energizing energy thereto, the wave-energizable apparatus upon being energized producing a signal, and sensing with a sensing apparatus the signal produced by the wave-energizable apparatus.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A link comprising
a body,
the body having an exterior surface and two spaced-apart ends,
wave-energizable identification apparatus on the exterior surface of the body,
the wave-energizable identification apparatus wrapped in fabric material,
the fabric material comprising heat-resistant non-conducting material, and
the wave-energizable identification apparatus wrapped and positioned on the body so that the wave-energizable identification apparatus does not contact the body.

2. A link comprising
a link body, the link body having a link body exterior surface, two spaced-apart ends, and a link opening through the link body, and
wave-energizable apparatus on the exterior surface of the link body.

3. The link of claim 2 further comprising
a wrap over the wave-energizable apparatus wrapping the wave-energizable identification apparatus wrapped to the link body.

4. The link of claim 2 further comprising
the link body including a stud extending across the link opening, the stud having a stud exterior surface, and
the wave-energizable apparatus on the stud exterior surface.

5. The link of claim 4 wherein the wave-energizable apparatus is wrapped on the stud and positioned on the stud so that the wave-energizable apparatus does not contact the stud.

6. The link of claim 3 wherein the wrap comprises fabric material,
the fabric material comprising at least one layer of material wrapped around the wave-energizable apparatus.

7. The link of claim 6 wherein
the at least one layer of material is a plurality of layers.

8. The link of claim 6 wherein
a layer of body fabric material is on the body,
the wave-energizable apparatus located adjacent and exteriorly of the body fabric material, and
the fabric material in which the wave-energizable apparatus is wrapped is a folded portion of the body fabric material folded over on the wave-energizable apparatus.

9. The link of claim 6 wherein the wave-energizable apparatus and the fabric material in which the wave-energizable apparatus are wrapped in heat shrink material.

10. The link of claim 9 wherein outside the heat shrink material, at least one outer layer of fabric material is placed over the heat shrink material.

11. The link of claim 10 wherein the at least one outer layer of fabric material is a plurality of outer layers.

12. The link of claim 6 wherein the wave-energizable apparatus is in a shield.

13. The link of claim 12 wherein the shield has a curved top and a recess for the wave-energizable apparatus.

14. The link of claim 2 further comprising an amount of adhesive on the wave-energizable apparatus.

15. The link of claim 2 wherein the wave-energizable apparatus is radio frequency apparatus with integrated circuit apparatus and antenna apparatus.

16. The link of claim 2 further comprising the link body including a shaft, with two spaced-apart shaft ends, each end of the two spaced-apart ends of the link body at a shaft end of the shaft, the two spaced-apart ends including a first end and a second end, the link opening in the first end, and a secondary opening in the second end.

17. The link of claim 16 wherein the wave-energizable apparatus is on one of the first end and the second end.

18. The link of claim 16 wherein the wave-energizable apparatus is on the shaft.

19. The link of claim 16 wherein the wave-energizable apparatus is on one of the first end and the second end and a second wave-energizable apparatus is one the shaft.

20. The link of claim 2 wherein the wave-energizable apparatus includes a first wave-energizable apparatus and a second wave-energizable apparatus, the link further comprising both the first wave-energizable apparatus and the second wave-energizable apparatus on the link body.

21. The link of claim 2 further comprising the link body including a stud extending across the link opening, the stud having a stud exterior surface, and the wave-energizable apparatus on the stud exterior surface.

22. The link of claim 21 further comprising the stud having two spaced-apart ends, a wrap securing the wave-energizable apparatus to the stud, and the wrap also on a portion of the link body adjacent each end of the stud.

23. The link of claim 2 wherein the wave-energizable apparatus is in a mass, the mass has a recess, and the mass is on the link body with a portion of the link body in the recess.

24. The link of claim 23 wherein the link body includes a stud between sides of the link body and the mass is on the stud.

25. The link of claim 23 wherein the body includes a shaft between the two spaced-apart ends and the mass is on the shaft.

26. The link of claim 23 wherein the mass comprises a first mass, the link further comprising a second mass with a wave-energizable apparatus on the link body.

27. The link of claim 26 wherein the link body includes a stud between sides thereof and the first mass is on the link body apart from the stud and the second mass is on the stud.

28. The link of claim 2 wherein the link is one of a chain link and an elevator link.

29. A method for sensing a wave-energizable identification apparatus of a member, the member comprising a link with a body, the body having an exterior surface and two spaced-apart ends, wave-energizable identification apparatus on the exterior surface of the body, the wave-energizable identification apparatus wrapped in fabric material, the fabric material comprising heat-resistant non-conducting material, and the wave-energizable identification apparatus wrapped and positioned on the body so that the wave-energizable identification apparatus does not contact the body, the wave-energizable identification apparatus having antenna apparatus, the method including energizing the wave-energizable identification apparatus by directing energizing energy to the antenna apparatus, the wave-energizable identification apparatus upon being energized producing a signal, positioning the member adjacent sensing apparatus, and sensing with the sensing apparatus the signal produced by the wave-energizable identification apparatus.

30. A method for sensing a wave-energizable apparatus of a link, the link comprising a link with a body, the body having an exterior surface and two spaced-apart ends, wave-energizable apparatus on an exterior surface of the body, the method including energizing the wave-energizable apparatus by directing energizing energy thereto, the wave-energizable apparatus upon being energized producing a signal, and sensing with a sensing apparatus the signal produced by the wave-energizable apparatus.

* * * * *